United States Patent
Yasuda et al.

(10) Patent No.: US 10,457,823 B2
(45) Date of Patent: Oct. 29, 2019

(54) AQUEOUS INK COMPOSITION, INK SET, IMAGE FORMING METHOD, AND RESIN MICROPARTICLES

(71) Applicant: FUJIFILM Corporation, Tokyo (JP)

(72) Inventors: Koji Yasuda, Kanagawa (JP); Toshihiro Kariya, Kanagawa (JP); Atsushi Kaeriyama, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/696,188

(22) Filed: Sep. 6, 2017

(65) Prior Publication Data
US 2017/0362452 A1 Dec. 21, 2017

Related U.S. Application Data

(63) Continuation of application No. PCT/JP2016/060344, filed on Mar. 30, 2016.

(30) Foreign Application Priority Data

Mar. 31, 2015 (JP) ................................. 2015-072387
Sep. 30, 2015 (JP) ................................. 2015-193642
Mar. 25, 2016 (JP) ................................. 2016-062741

(51) Int. Cl.
| | | |
|---|---|---|
| B41J 2/01 | (2006.01) | |
| C09D 11/30 | (2014.01) | |
| C08F 12/22 | (2006.01) | |
| C08F 20/28 | (2006.01) | |
| C08F 20/58 | (2006.01) | |
| C09D 11/106 | (2014.01) | |
| B41M 5/00 | (2006.01) | |

(Continued)

(52) U.S. Cl.
CPC ............. *C09D 11/30* (2013.01); *B41J 2/01* (2013.01); *B41M 5/0017* (2013.01); *C08F 12/22* (2013.01); *C08F 12/26* (2013.01); *C08F 20/28* (2013.01); *C08F 20/58* (2013.01); *C08F 212/08* (2013.01); *C08F 220/14* (2013.01); *C08F 220/18* (2013.01); *C08F 220/28* (2013.01); *C09D 11/106* (2013.01); *C09D 11/322* (2013.01); *C09D 11/54* (2013.01); *C08F 2220/1825* (2013.01); *C08F 2220/1858* (2013.01); *C08F 2220/281* (2013.01)

(58) Field of Classification Search
None
See application file for complete search history.

(56) References Cited

U.S. PATENT DOCUMENTS 6,686,104 B1 * 2/2004 Shiba ........................ B41J 2/01
347/106
2004/0147631 A1 7/2004 Helling
(Continued)

FOREIGN PATENT DOCUMENTS

DE 19651689 6/1998
JP H04-335070 11/1992
(Continued)

OTHER PUBLICATIONS

"Search Report of European Counterpart Application", dated Apr. 4, 2018, p. 1-p. 6.
(Continued)

*Primary Examiner* — Erica S Lin
(74) *Attorney, Agent, or Firm* — JCIPRNET

(57) ABSTRACT

An aqueous ink composition includes an aqueous medium and resin microparticles formed from a resin, in which the resin has a structural unit represented by General Formula (1) or (2), and the content of the resin microparticles is 1% to 15% by mass, General Formula (1)

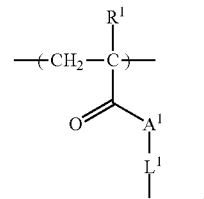

General Formula (2)

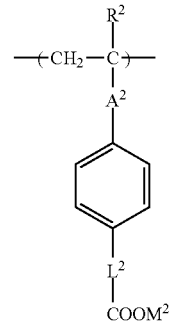

$R^1$, $R^2$, and $R^3$ each represent a hydrogen atom or an alkyl group having 1 to 4 carbon atoms; $A^1$ represents —O— or —$NR^3$—; $L^1$ represents an alkylene group having 6 to 22 carbon atoms; $M^1$ and $M^2$ each represent a hydrogen atom, an alkali metal ion, or an ammonium ion;

$A^2$ represents a single bond, —COO—, or —CONH—; and $L^2$ represents a divalent linking group having 6 to 23 carbon atoms.

20 Claims, No Drawings

(51) Int. Cl.
- *C08F 212/08* (2006.01)
- *C08F 220/14* (2006.01)
- *C08F 220/18* (2006.01)
- *C08F 220/28* (2006.01)
- *C08F 12/26* (2006.01)
- *C09D 11/322* (2014.01)
- *C09D 11/54* (2014.01)

(56) References Cited

U.S. PATENT DOCUMENTS

2009/0041932 A1  2/2009  Ishizuka et al.
2009/0234067 A1* 9/2009  Kariya .................. C09D 11/32
                                                    524/599

FOREIGN PATENT DOCUMENTS

| JP | H11-078226 | 3/1999 |
|---|---|---|
| JP | 2004-534106 | 11/2004 |
| JP | 5213382 | 6/2013 |
| JP | 2014-152204 | 8/2014 |
| JP | 2014-152205 | 8/2014 |
| JP | 2014-152207 | 8/2014 |
| JP | 2015-021023 | 2/2015 |
| JP | 2015-048475 | 3/2015 |

OTHER PUBLICATIONS

"Office Action of Japan Counterpart Application" dated Apr. 17, 2018, with English translation thereof, p. 1-p. 8.

"International Search Report (Form PCT/ISA/210) of PCT/JP2016/060344," dated May 31, 2016, with English translation thereof, pp. 1-5.

"Written Opinion of the International Searching Authority (Form PCT/ISA/237) of PCT/JP2016/060344," dated May 31, 2016, with English translation thereof, pp. 1-9.

* cited by examiner

AQUEOUS INK COMPOSITION, INK SET, IMAGE FORMING METHOD, AND RESIN MICROPARTICLES

CROSS-REFERENCE TO RELATED APPLICATIONS

This application is a Continuation of PCT International Application No. PCT/JP2016/60344, filed on Mar. 30, 2016, which claims priority under 35 U.S.C. § 119(a) to Japanese Patent Application No. 2015-72387, filed on Mar. 31, 2015, Japanese Patent Application No. 2015-193642, filed on Sep. 30, 2015, and Japanese Patent Application No. 2016-62741, filed on Mar. 25, 2016. Each of the above application(s) is hereby expressly incorporated by reference, in its entirety, into the present application.

BACKGROUND OF THE INVENTION

1. Field of the Invention

The present invention relates to an aqueous ink composition, an ink set, an image forming method, and resin microparticles.

2. Description of the Related Art

Regarding image recording methods of forming images on recording media such as paper based on image data signals, there are recording methods such as electrophotographic methods, sublimation-type and fusion-type thermal transfer methods, and inkjet methods.

In inkjet recording methods, since a printing plate is not needed, and image formation is performed directly on a recording medium by jetting ink only on image-forming sections, ink can be used efficiently, while the running costs are low. In regard to inkjet recording methods, the printing apparatuses are relatively less expensive compared to conventional printing machines, and the printing apparatuses can be miniaturized and less noisy. As such, inkjet recording methods have combinations of various advantages compared to other image recording systems.

The ink used for the inkjet recording methods are required to have jetting stability, by which a desired amount of ink can be stably jetted from a nozzle, in order to form a desired image stably with high accuracy.

Furthermore, in regard to inkjet recording methods, there is known a technology of applying in advance a treatment agent for aggregating the components in an ink onto a recording medium, aggregating the ink jetted on the recording medium, and thus accelerating fixation of the ink. In regard to this technology, there has been a demand to expedite the rate of ink aggregation induced by the treatment agent, in order to further increase the throughput of image formation.

Improvement of ink compositions has been in progress so that the demand described above can be fulfilled. For example, JP5213382B describes an aqueous ink composition containing water-insoluble coloring particles; and water-insoluble particles including a carboxylic acid salt-based emulsifier and a water-insoluble polymer, and it is described that this ink composition has a high rate of an aggregation reaction induced by a treatment liquid including an acidic compound, and has excellent temporal stability and jetting stability.

JP2014-152204A describes an inkjet ink that contains a pigment, water, and a water-soluble organic solvent and further contains a water-soluble copolymer as a dispersant for the pigment, and it is described that this ink has excellent jetting stability, enables recording at a high image density, and has enhanced storage stability.

Furthermore, JP1992-335070A (JP-H04-335070A) describes an aqueous printing ink that includes a copolymer including a (meth)acrylic acid ester having a particular structure, and an organic metal chelate compound.

SUMMARY OF THE INVENTION

Inkjet recording methods have been hitherto used mainly in the fields of office printers or domestic printers; however, in recent years, the range of utilization thereof has been extended even to the field of commercial printing, and speed-up of inkjet recording is also in progress. Along with this progress, it is the current situation that the demand for ink aggregating properties and jetting stability is increasing every year.

An object of the invention is to provide an aqueous ink composition that has excellent jetting stability in the case of being applied by an inkjet recording method, allows an increase in the rate of ink aggregation induced by a treatment agent, and enables elevation of the color density of an image formed; an ink set including this ink composition and a treatment agent for aggregating the ink composition; and an image forming method using this ink composition. Another object of the invention is to provide resin microparticles that can impart jetting stability to an ink composition when incorporated into the ink composition, allows an increase in the rate of aggregation of the ink composition induced by a treatment agent, and also enables elevation of the color density of an image formed.

The inventors of the present invention conducted a thorough investigation in view of the problems described above, and as a result, the inventors found that an ink composition obtained by incorporating a particular amount of microparticles of a resin that contains a repeating unit having a structure in which a carboxyl group or a salt thereof and a medium-chain alkylene group having a particular chain length are linked, or a repeating unit having a structure in which a carboxyl group or a salt thereof and phenylene are linked via a linking group having a particular chain length, into an aqueous medium, has excellent jetting stability in a case in which the ink composition is used as an ink for inkjet recording, has a high rate of ink aggregation induced by a treatment agent, and enables elevation of the color density of an image formed by using this ink composition. The invention was completed by repeating further investigations based on these findings.

The above-described problems of the invention were solved by the following means.

[1] An aqueous ink composition at least comprising: an aqueous medium; and resin microparticles composed of a resin, in which the resin has a structural unit represented by General Formula (1) or (2), and the content of the resin microparticles in the aqueous ink composition is 1% to 15% by mass,

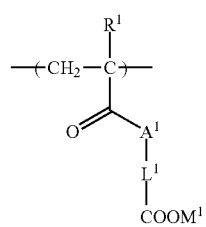

General Formula (1)

General Formula (2)

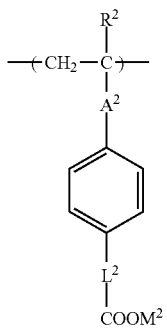

in General Formula (1), $R^1$ represents a hydrogen atom or an alkyl group having 1 to 4 carbon atoms; $A^1$ represents —O— or —$NR^3$—; $R^3$ represents a hydrogen atom or an alkyl group having 1 to 4 carbon atoms; $L^1$ represents an alkylene group having 6 to 22 carbon atoms; and $M^1$ represents a hydrogen atom, an alkali metal ion, or an ammonium ion, and in General Formula (2), $R^2$ has the same meaning as $R^1$; $A^2$ represents a single bond, —COO—, or —CONH—; $L^2$ represents a divalent linking group having 6 to 23 carbon atoms; and $M^2$ has the same meaning as $M^1$.

[2] The aqueous ink composition according to [1], in which the total content of the structural units represented by General Formula (1) or (2) in the resin is 1% to 20% by mass.

[3] The aqueous ink composition according to [1] or [2], in which the resin contains the structural unit represented by General Formula (1).

[4] The aqueous ink composition according to any one of [1] to [3], in which the resin contains a structural unit derived from a vinyl compound or a vinylidene compound, each compound having an aromatic ring or an aliphatic ring.

[5] The aqueous ink composition according to [4], in which the total content of the structural units derived from a vinyl compound or a vinylidene compound, each compound having an aromatic ring or an aliphatic ring in the resin is 5% to 50% by mass.

[6] The aqueous ink composition according to [4] or [5], in which in a case in which the total content of the structural units represented by General Formula (1) or (2) in the resin is designated as X % by mass, and the total content of the structural units derived from a vinyl compound or a vinylidene compound, each compound having an aromatic ring or an aliphatic ring is designated as ZA % by mass, the ratio of X to ZA is such that X:ZA=1:0.5 to 25.

[7] The aqueous ink composition according to any one of [4] to [6], in which the structural unit derived from a vinyl compound or a vinylidene compound, each compound having an aromatic ring or an aliphatic ring is represented by any one of General Formulae (A) to (E), General Formula (A)

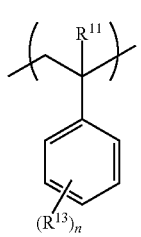

General Formula (B)

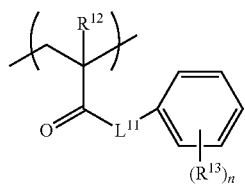

General Formula (C)

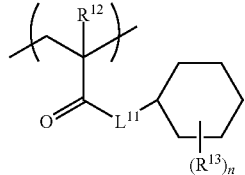

General Formula (D)

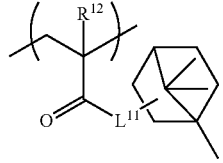

General Formula (E)

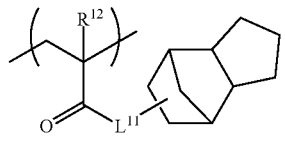

in General Formulae (A) to (E), $R^{11}$ and $R^{12}$ each independently represent a methyl group or a hydrogen atom; $R^{13}$'s each independently represent a chain-like or branched alkyl group having 1 to 10 carbon atoms; n represents an integer of 0 to 5; and $L^{11}$ represents a single bond or a linear, branched or cyclic alkylene group having 1 to 18 carbon atoms, an arylene group having 6 to 18 carbon atoms, —O—, —NH—, —S—, —C(=O)—, or a divalent linking group formed by linking two or more of these.

[8] The aqueous ink composition according to any one of [1] to [7], in which the resin contains a structural unit derived from a monomer having an I/O value in the organic conceptual diagram of 1.0 or more and less than 3.5.

[9] The aqueous ink composition according to [8], in which in the resin, the total content of the structural units derived from a monomer having an I/O value in the organic conceptual diagram of 1.0 or more and less than 3.5 is 1% to 40% by mass.

[10] The aqueous ink composition according to [8] or [9], in which in a case in which the total content of the structural units represented by General Formula (1) or (2) in the resin is designated as X % by mass, and the total content of the structural units derived from a monomer having an I/O value in the organic conceptual diagram of 1.0 or more and less than 3.5 is designated as ZB % by mass, the ratio of X to ZB is such that X:ZB=1:0.4 to 10.

[11] The aqueous ink composition according to any one of [1] to [10], in which the content of a sulfo group or a salt thereof in the resin is 0.13 mmol/g or less.

[12] The aqueous ink composition according to any one of [1] to [11], in which in General Formula (1), $A^1$ represents —$NR^3$—.

[13] The aqueous ink composition according to any one of [1] to [12], in which the resin has a polymerization initiator residue that does not have a sulfo group or a salt thereof at a terminal.

[14] The aqueous ink composition according to any one of [1] to [13], in which the weight-average molecular weight of the resin is 80,000 or more.

[15] The aqueous ink composition according to any one of [1] to [14], which is used in an inkjet recording method.

[16] The aqueous ink composition according to any one of [1] to [15], further comprising: a pigment.

[17] An ink set comprising: the aqueous ink composition according to [16]; and a treatment agent for aggregating the aqueous ink composition.

[18] An image forming method using the aqueous ink composition according to [16].

[19] An image forming method comprising: applying a treatment agent for aggregating the aqueous ink composition according to [16] onto a recording medium; and applying the aqueous ink composition according to [16] onto the recording medium after applying the treatment agent, and thereby forming an image.

[20] Resin microparticles comprising: a resin having a structural unit represented by General Formula (1) or General Formula (2),

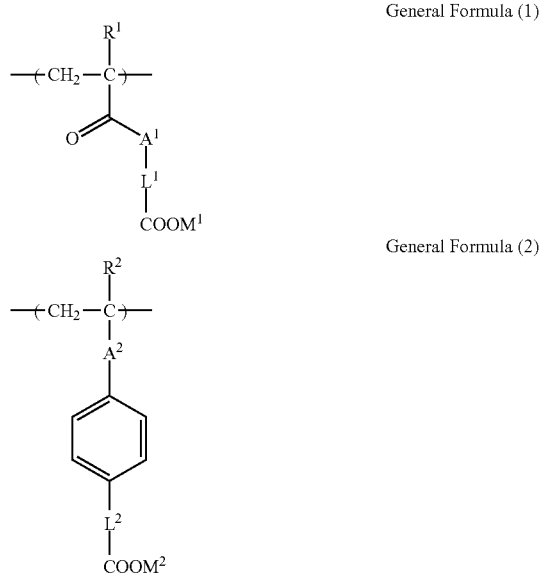

General Formula (1)

General Formula (2)

in General Formula (1), $R^1$ represents a hydrogen atom or an alkyl group having 1 to 4 carbon atoms; $A^1$ represents —O— or —$NR^3$—; $R^3$ represents a hydrogen atom or an alkyl group having 1 to 4 carbon atoms; $L^1$ represents an alkylene group having 6 to 22 carbon atoms; and $M^1$ represents a hydrogen atom, an alkali metal ion, or an ammonium ion, and in General Formula (2), $R^2$ has the same meaning as $R^1$; $A^2$ represents a single bond, —COO—, or —CONH—; $L^2$ represents a divalent linking group having 6 to 23 carbon atoms; and $M^2$ has the same meaning as $M^1$.

According to the present specification, unless particularly stated otherwise, in a case in which there is a plurality of substituents, linking groups, ligands, repeating units, or the like (hereinafter, referred to as substituents or the like), which are indicated by a particular reference symbol, or in a case in which a plurality of substituents or the like is simultaneously or alternatively prescribed, the respective substituents or the like may be identical with or different from each other. The same also applies to the prescription on the number of substituents or the like.

According to the present specification, the term "group" for each of the groups described as examples of each of substituents is used to mean to include both an unsubstituted form and a form having a substituent. For example, the term "alkyl group" means an alkyl group which may have a substituent.

According to the present specification, the term "(meth) acrylate" is used to mean to include both acrylate and methacrylate. The same also applies to "(meth)acrylic acid", "(meth)acrylamide", and "(meth)acryloyl group".

A numerical value range represented using "to" in the present specification means a range including the numerical values described before and after "to" as the lower limit and the upper limit.

The "aggregating properties of ink" according to the invention means a performance by which expansion of the ink composition on a recording medium is suppressed by aggregating the ink composition by a treatment agent, and the ink composition is controlled to an appropriate size.

The aqueous ink composition and ink set of the invention have excellent jetting stability in the case of being applied by an inkjet recording method, give a high rate of ink aggregation induced by a treatment agent, have excellent ink aggregating properties, and enables elevation of the color density of an image formed using these ink composition and ink set.

According to the image forming method of the invention, the aggregation rate of the ink applied on a recording medium can be further increased, and an image having an elevated color density can also be formed.

The resin microparticles of the invention can impart jetting stability to an ink composition, and can adequately increase the rate of an aggregation reaction of the ink composition induced by a treatment agent, when these resin microparticles are incorporated into the ink composition. Furthermore, when the resin microparticles of the invention are incorporated into an ink composition, the color density of an image thus formed can also be elevated.

DESCRIPTION OF THE PREFERRED EMBODIMENTS

Preferred embodiments of the aqueous ink composition, ink set, image forming method, and resin microparticles of the invention will be explained below.

[Ink Composition]

The aqueous ink composition of the invention includes at least an aqueous medium, and resin microparticles formed from a resin having a particular structure. Furthermore, the aqueous ink composition usually includes a pigment. In a case in which the ink composition does not include a pigment, the ink composition can be used as a clear ink, and in a case in which the ink composition includes a pigment, the ink composition can be used for the applications of forming color images.

<Aqueous Medium>

The aqueous medium used in the invention is configured to include at least water, and to include at least one water-soluble organic solvent as necessary.

Regarding the water used for the invention, it is preferable to use water that does not include ionic impurities, such as ion exchange water or distilled water. The percentage content of water in the ink composition is selected as appropriate according to the purpose; however, usually, the percentage content of water is preferably 10% to 95% by mass, more preferably 10% to 80% by mass, and even more preferably 20% to 70% by mass.

—Water-Soluble Organic Solvent—

It is preferable that the aqueous medium according to the invention includes at least one water-soluble organic solvent. As the aqueous medium includes a water-soluble organic solvent, effects of preventing drying and promoting wetting or permeation can be obtained. Prevention of drying as used herein means that ink adhering and drying at the ink jetting port of a spray nozzle, thereby forming aggregates and clogging up the jetting port, is prevented. In view of wetting or prevention of drying, a water-soluble organic solvent having a vapor pressure lower than that of water is preferred. The water-soluble organic solvent can be used as a penetration enhancer that enhances ink permeability into paper.

Examples of the water-soluble organic solvent include, for example, alkanediols (polyhydric alcohols) such as glycerin, 1,2,6-hexanetriol, trimethylolpropane, ethylene glycol, and propylene glycol; sugar alcohols; C1-4 alkyl alcohols such as ethanol, methanol, butanol, propanol, and isopropanol; and glycol ethers such as ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-t-butyl ether, triethylene glycol monoethyl ether, 1-methyl-1-methoxybutanol, propylene glycol monomethyl ether, propylene glycol monoethyl ether, propylene glycol mono-t-butyl ether, propylene glycol mono-n-propyl ether, propylene glycol mono-iso-propyl ether, dipropylene glycol, dipropylene glycol monomethyl ether, dipropylene glycol monoethyl ether, dipropylene glycol mono-n-propyl ether, dipropylene glycol mono-iso-propyl ether, and tripropylene glycol monomethyl ether. These can be used singly or in combination of two or more kinds thereof.

For the purpose of wetting or preventing drying, a polyhydric alcohol is useful, and examples thereof include glycerin, ethylene glycol, diethylene glycol, triethylene glycol, propylene glycol, dipropylene glycol, tripropylene glycol, 1,3-butanediol, and 2,3-butanediol. These may be used singly, or two or more kinds thereof may be used in combination.

For the purpose of promoting permeation, a polyol compound is preferred, and an aliphatic diol is suitable. Examples of the aliphatic diol include 2-ethyl-2-methyl-1,3-propanediol, 3,3-dimethyl-1,2-butanediol, 2,2-diethyl-1,3-propanediol, 2-ethyl-1,3-hexanediol, and 2,2,4-trimethyl-1,3-pentanediol. Among these, preferred examples include 2-ethyl-1,3-hexanediol and 2,2,4-trimethyl-1,3-pentanediol.

Regarding the water-soluble organic solvent according to the invention, it is preferable that at least one compound represented by Structural Formula (S) is included, from the viewpoint of suppressing the occurrence of curling in the recording medium.

Structural Formula (S)

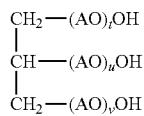

In Structural Formula (S), t, u, and v each independently represent an integer of 1 or greater, and the relation: t+u+v=3 to 15 is satisfied. The value of t+u+v is preferably in the range of 3 to 12, and more preferably in the range of 3 to 10. In a case in which the value of t+u+v is 3 or greater, satisfactory inhibitory potential against curling, and in a case in which the value is 15 or less, satisfactory jettability is obtained. In Structural Formula (S), AO represents at least one of an ethyleneoxy group (EO) or a propyleneoxy group (PO), and above all, a propyleneoxy group is preferred. Various AO's in the moieties $(AO)_t$, $(AO)_u$, and $(AO)_v$ may be identical with or different from each other.

In the following description, examples of a compound represented by Structural Formula (S) are shown. However, the invention is not intended to be limited to these. In the exemplary compounds, the description "POP(3) glyceryl ether" means a glyceryl ether in which three propyleneoxy groups in total are bonded to glycerin, and the same applies to other descriptions.

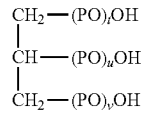

| | | |
|---|---|---|
| t + u + v = 3 | POP (3) | Glyceryl ether |
| t + u + v = 4 | POP (4) | Glyceryl ether |
| t + u + v = 5 | POP (5) | Glyceryl ether |
| t + u + v = 6 | POP (6) | Glyceryl ether |
| t + u + v = 7 | POP (7) | Glyceryl ether |

It is also preferable that the water-soluble organic solvent according to the invention is one of water-soluble organic solvents (i) to (vii) listed below, from the viewpoint of suppressing the occurrence of curling in the recording medium.

(i) n-$C_4H_9O(AO)_4$—H (where AO=DO or PO, the ratio is such that EO:PO=1:1)

(ii) n-$C_4H_9O(AO)_{10}$—H (where AO=EO or PO, the ratio is such that EO:PO=1:1)

(iii) HO$(AO)_{40}$—H (where AO=EO or PO, the ratio is such that EO:PO=1:3)

(iv) HO$(AO)_{55}$—H (where AO=EO or PO, the ratio is such that EO:PO=5:6)

(v) HO$(PO)_3$—H (vi) HO$(PO)_7$—H (vii) 1,2-Hexanediol

Among all the water-soluble organic solvents included in the ink composition of the invention, the total content of the compounds represented by Structural Formula (S) and exemplary compounds (i) to (vii) is preferably 3% by mass or more, more preferably 4% by mass or more, and even more preferably 5% by mass or more. By adjusting the content to the range described above, curling can be suppressed without deteriorating the stability or jettability of the ink, and thus it is preferable.

According to the invention, the water-soluble organic solvents may be used singly, or two or more kinds thereof may be used as a mixture.

The content of the water-soluble organic solvent in the ink composition is preferably from 1% by mass to 60% by mass, more preferably from 5% by mass to 40% by mass, and even more preferably from 7% by mass to 30% by mass.

<Resin Microparticles> i) Structural Unit Represented by General Formula (1) or (2)

The aqueous ink composition of the invention includes, as resin microparticles, at least resin microparticles formed from a resin having a structural unit represented by General Formula (1) or (2) (hereinafter, also simply referred to as "resin microparticles used in the invention"). The resin of the resin microparticles used in the invention (resin that constitutes the resin microparticles of the invention) may have a structure that includes a structural unit represented by General Formula (1) and does not include a structural unit represented by General Formula (2); may have a structure that includes a structural unit represented by General Formula (2) and does not include a structural unit represented by General Formula (1); or may have a structure that has both structural units, namely, the structural unit of General Formula (1) and the structural unit of General Formula (2). It is preferable that the resin of the resin microparticles used in the invention has at least a structural unit represented by General Formula (1).

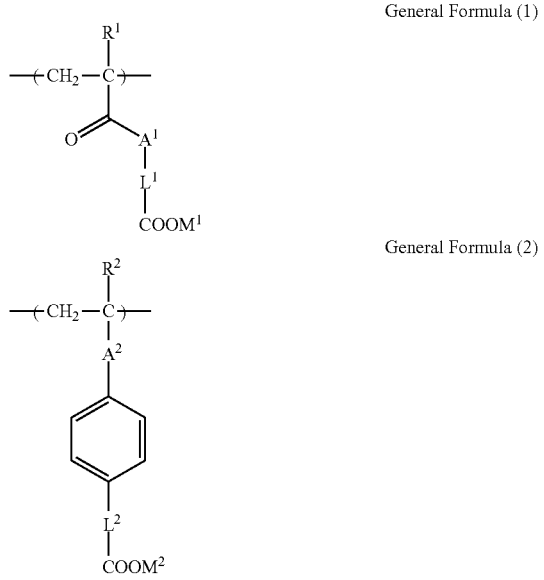

General Formula (1)

General Formula (2)

In General Formula (1), $R^1$ represents a hydrogen atom or an alkyl group having 1 to 4 carbon atoms. $R^1$ is preferably a hydrogen atom or a methyl group, and more preferably a methyl group.

$A^1$ represents —O— or —$NR^3$—. $R^3$ represents a hydrogen atom or an alkyl group having 1 to 4 carbon atoms. $A^1$ is preferably —$NR^3$—, and more preferably —NH—.

$L^1$ represents an alkylene group having 6 to 22 carbon atoms. This alkylene group may be linear or branched, and from the viewpoint of jetting stability and the stability of the resin microparticles, the alkylene group is preferably linear. $L^1$ is preferably an alkylene group having 8 to 22 carbon atoms, more preferably 8 to 18 carbon atoms, even more preferably 8 to 16 carbon atoms, still more preferably 8 to 14 carbon atoms, and still more preferably 10 to 12 carbon atoms, and is still more preferably an alkylene group having 11 carbon atoms.

$M^1$ represents a hydrogen atom, an alkali metal ion, or an ammonium ion. From the viewpoints of jetting stability and the stability of the resin microparticles, $M^1$ is more prefer-ably an alkali metal ion, even more preferably sodium ion or potassium ion, and still more preferably potassium ion.

In General Formula (2), $R^2$ and $M^2$ have the same meanings as $R^1$ and $M^1$, respectively, and preferred embodiments thereof are also the same.

$A^2$ represents a single bond, —COO—, or —CONH—, and a single bond is preferred.

$L^2$ represents a divalent linking group having 6 to 23 carbon atoms. This divalent linking group is not particularly limited, and from the viewpoint of synthesis, —C(=O) $NR^4$—$(CH_2)_n$— or —C(=O)O—$(CH_2)_n$— is preferred, and —C(=O)$NR^4$—$(CH_2)_n$— is more preferred. Here, $R^4$ represents a hydrogen atom or an alkyl group having 1 to 4 carbon atoms, and $R^4$ is preferably a hydrogen atom. Furthermore, n represents an integer of 5 to 22, more preferably 6 to 18, even more preferably 7 to 15, still more preferably 8 to 14, still more preferably 10 to 12, and most preferably 11.

The aqueous ink composition of the invention includes the resin microparticles that are used in the invention, in an amount of 1% to 15% by mass, preferably in an amount of 1% to 10% by mass, and more preferably in an amount of 4% to 10% by mass. As the aqueous ink composition of the invention includes 1% to 15% by mass of the resin microparticles that are used in the invention, aggregating properties and color density of the ink composition can be enhanced, and jetting stability is also satisfactory.

The total content of the structural units represented by General Formula (1) or (2) in the resin of the resin microparticles used in the invention is preferably 0.5% to 30% by mass (that is, in a case in which the resin microparticles used in the invention do not have a structural unit of General Formula (1), the content of the structural unit of General Formula (2); in a case in which the resin microparticles do not have a structural unit of General Formula (2), the content of the structural unit of General Formula (1); and in a case in which the resin microparticles contain both the structural unit of General Formula (1) and the structural unit of General Formula (2), the sum of the contents of the two structural units, is preferably 0.5% to 30% by mass), more preferably 1% to 20% by mass, and even more preferably 2% to 10% by mass, from the viewpoints of aggregating properties, color density, jetting stability, and stability of the resin microparticles.

Specific preferred examples of the structural unit represented by General Formula (1) or (2) are shown below; however, the invention is not intended to be limited to these. Specific preferred examples of the structural unit shown below represent structures in which $M^1$ in General Formula (1) and $M^2$ in General Formula (2) each represent a hydrogen atom; however, embodiments of employing an alkali metal ion or an ammonium ion instead of this hydrogen atom are also preferable as the structural units represented by General Formula (1) or (2). In the following structural units, Et represents an ethyl group; Pr represents a propyl group, and Bt represents a butyl group. The symbol * represents a linking site.

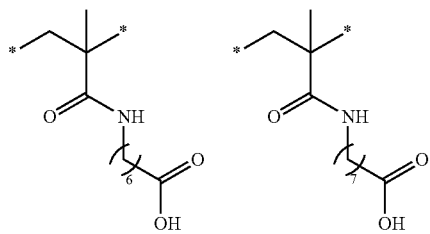

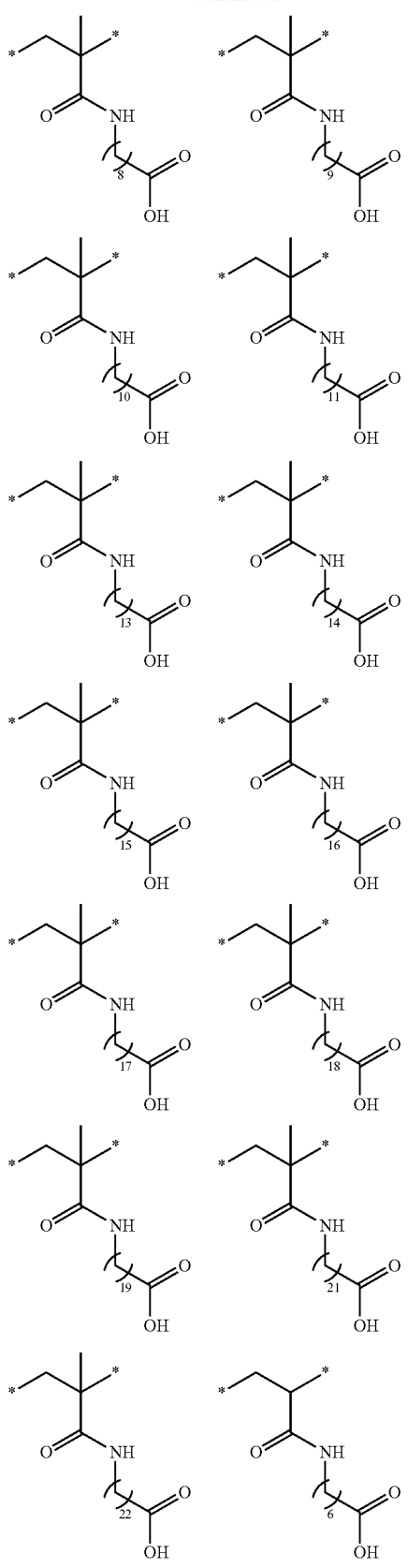
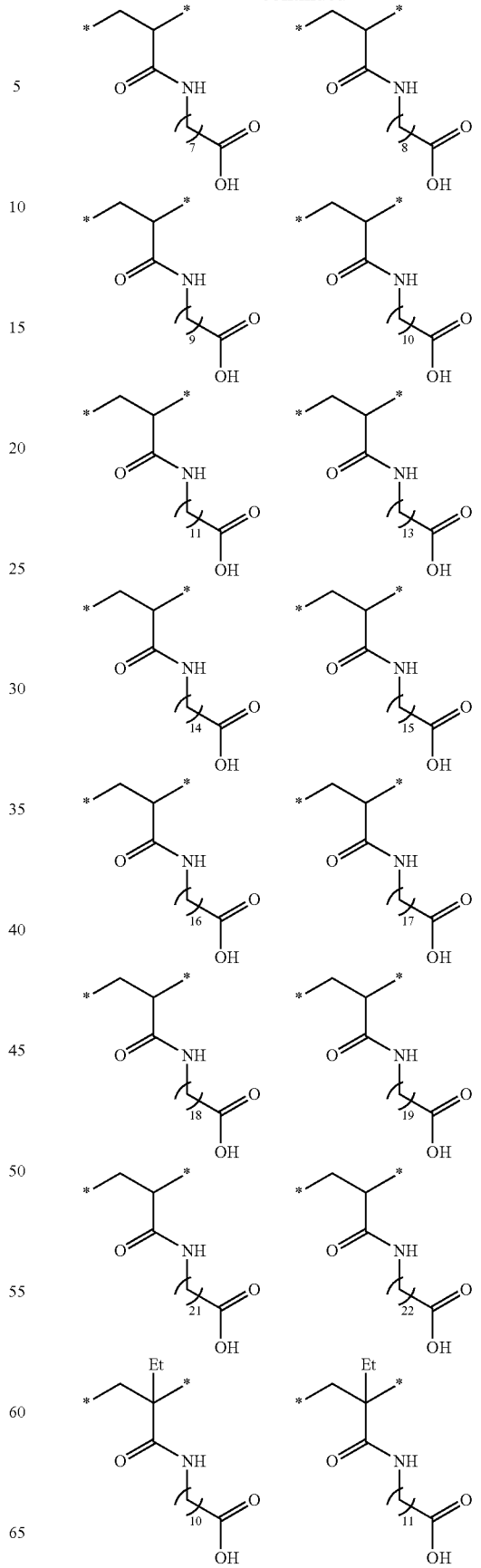

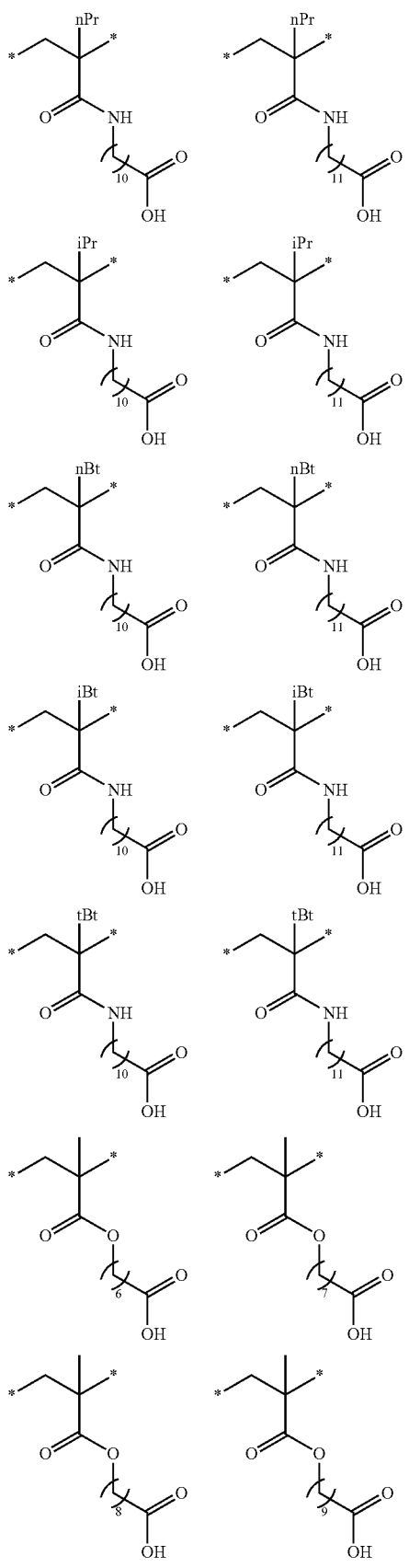
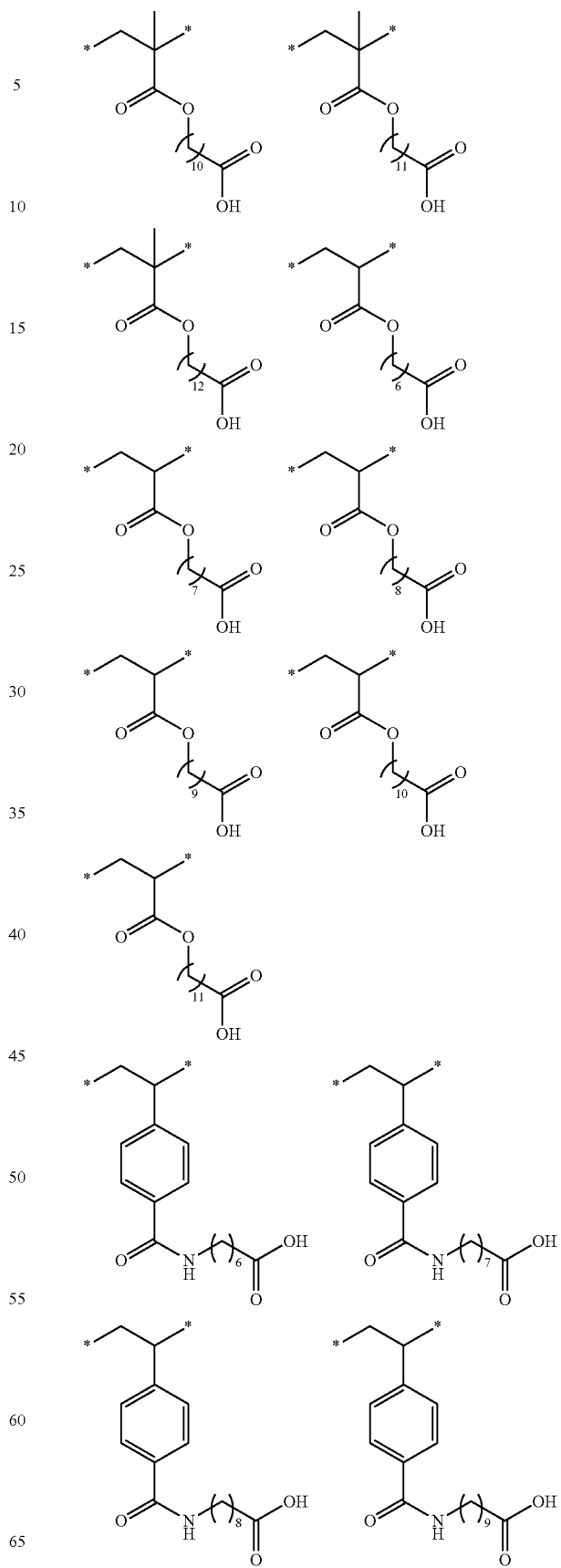

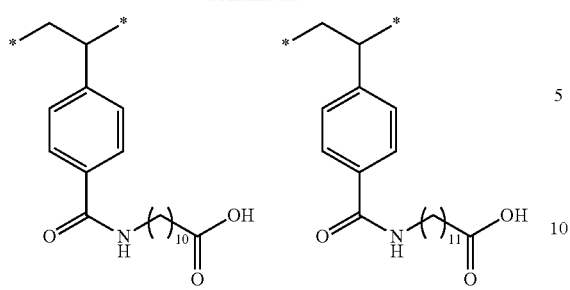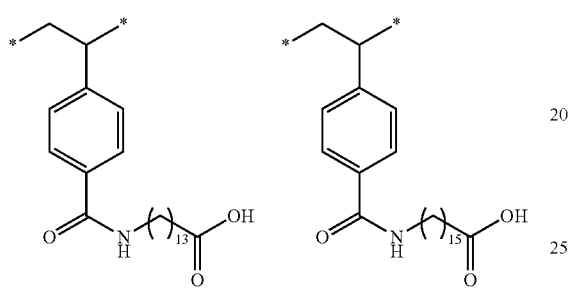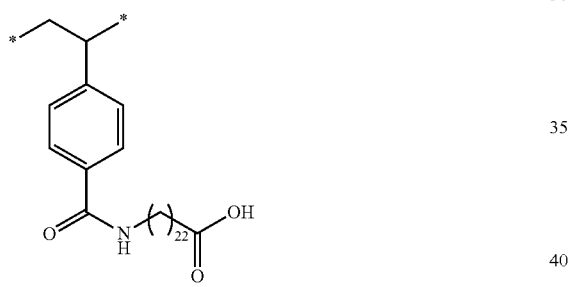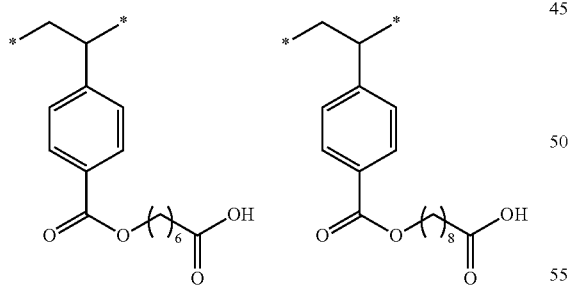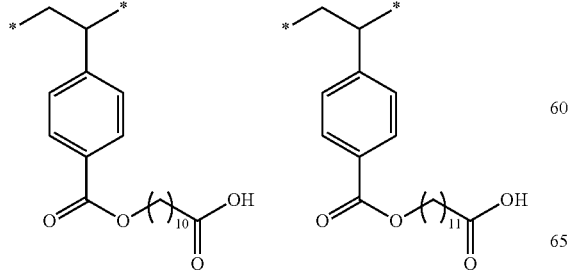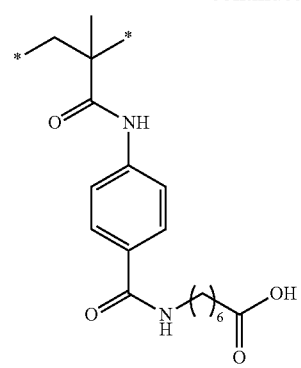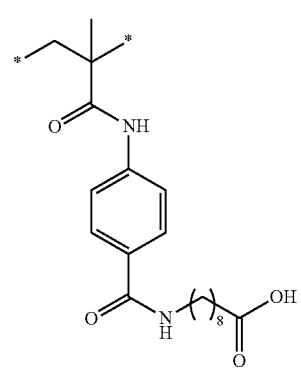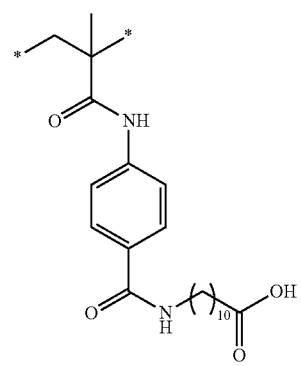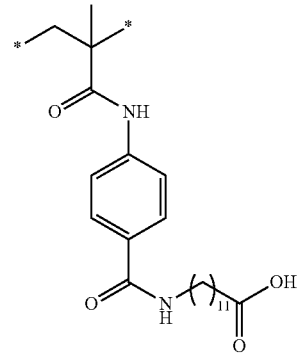

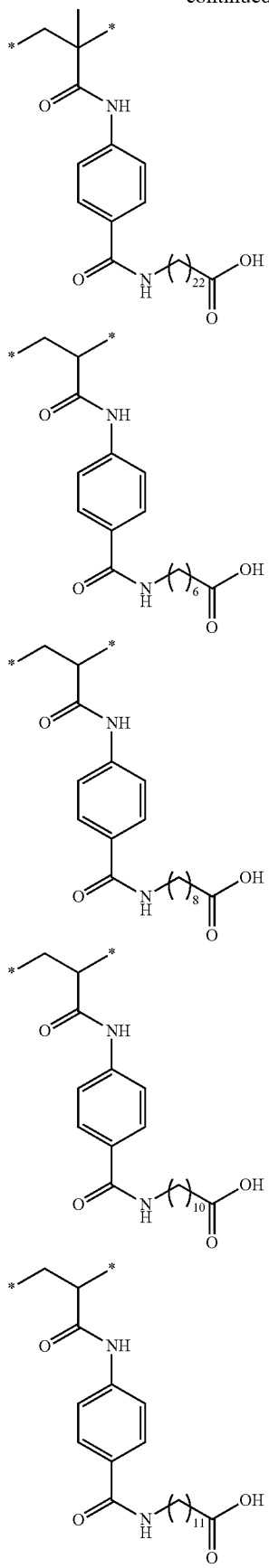
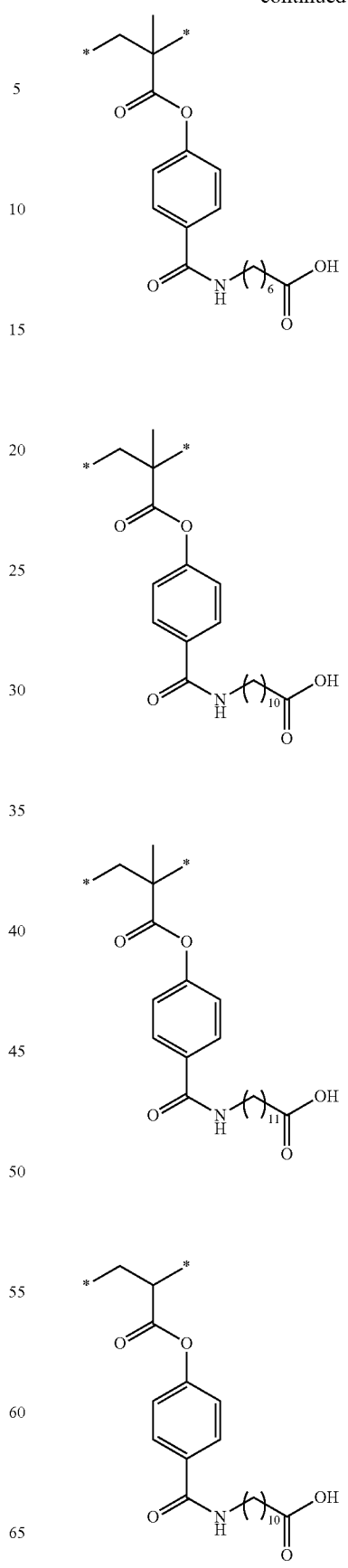

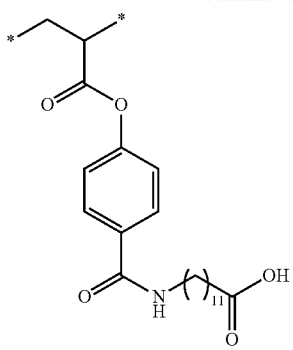

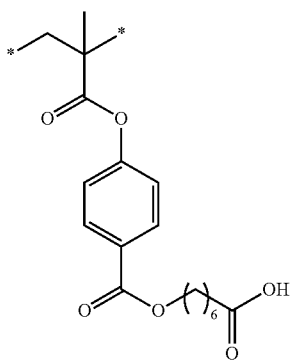

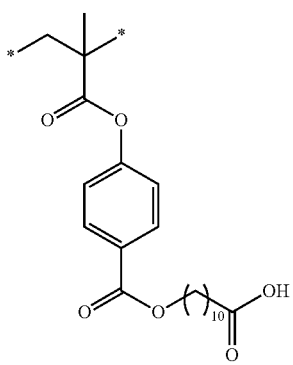

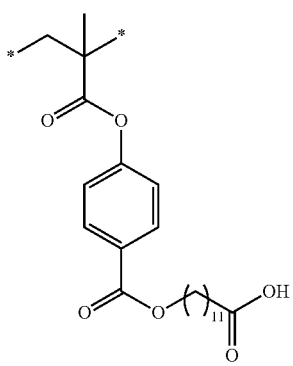

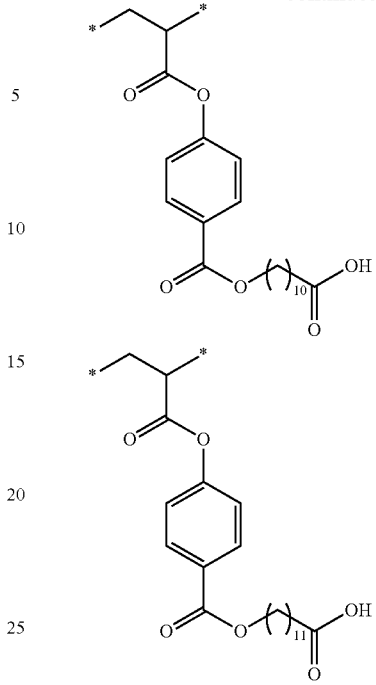

ii) Other Structural Units

There are no particular limitations on the structural units other than the structural unit represented by General Formula (1) or (2) (hereinafter, simply referred to as "other structural unit"), which constitutes the resin of the resin microparticles used in the invention, and suitable examples thereof include the structural units described in JP2001-181549A and JP2002-88294A.

Among them, it is preferable that the resin of the resin microparticles used in the invention contains, as another structural unit, a structural unit derived from an alkyl (meth)acrylate having an alkyl group with 2 to 15 carbon atoms (preferably 4 to 12 carbon atoms, and more preferably 4 to 10 carbon atoms) (hereinafter, referred to as "structural unit (i)"). The total content of the structural units (i) in the resin of the resin microparticles used in the invention (in a case in which one kind of the structural unit (i) is included in the resin, the total content means the content of this one kind, and in a case in which two or more kinds of the structural units (i) are included, the total content means the sum of the contents of these two or more kinds) is preferably 5% to 90% by mass, more preferably 10% to 70% by mass, even more preferably 20% to 55% by mass, still more preferably 25% to 50% by mass, and still more preferably 30% to 45% by mass.

It is also preferable that the resin of the resin microparticles used in the invention contains, as another structural unit, at least one structural unit selected from structural units derived from methyl (meth)acrylate and styrene that will be described below. The total content of the at least one structural unit selected from structural units derived from methyl (meth)acrylate and styrene in the resin of the resin microparticles used in the invention (that is, in a case in which the resin of the resin microparticles used in the invention includes only a structural unit derived from methyl (meth)acrylate from between methyl (meth)acrylate and styrene, the total content means the content of the structural unit derived from methyl (meth)acrylate; in a case in which the resin includes only a structural unit derived from styrene between methyl (meth)acrylate and styrene, the total content means the content of the structural unit derived from styrene; and in a case in which the resin includes both a structural unit derived from methyl (meth)acrylate and a structural unit derived from styrene, the total content means the sum of these contents) is preferably 5% to 90% by mass, more preferably 10% to 85% by mass, even more preferably 20% to 80% by mass, still more preferably 30% to 70% by mass, and still more preferably 40% to 60% by mass.

It is preferable that the resin of the resin microparticles used in the invention has the structural unit (i) as another structural unit, and also has at least one structural unit selected from a structural unit derived from methyl (meth)acrylate and a structural unit derived from styrene. By having at least one structural unit selected from a structural unit derived from methyl (meth)acrylate and a structural unit derived from styrene, the yield increases in a case in which the resin microparticles are prepared. Also, the glass transition temperature (Tg) of the resin microparticles can be adjusted to an appropriate range, and scratch resistance and blocking resistance of the images thus obtainable are enhanced. Scratch resistance is an image strength characteristic that prevents damage or detachment of an image in a case in which force is applied from the outside, and blocking resistance is a performance that prevents a phenomenon in which, in a case where recording media having images formed thereon are stacked or the like, color transfer occurs between the front and the back of the stacked recording media, or recording media adhere to one another by means of images.

It is also preferable that the resin of the resin microparticles used in the invention has, as another structural unit, a structural unit having a moiety: —COOM (where M has the same meaning as $M^1$ in General Formula (1), and preferred embodiments are also the same) as a substituent, in addition to the structural units described above. By having a structural unit having the moiety: —COOM as another structural unit, stability of the resin microparticles can be enhanced. This structural unit having the moiety: —COOM is preferably a structural unit selected from structural units represented by various formulae of General Formulae (a) to (h). In the following formulae, the symbol * represents a linking site.

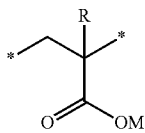

General Formula (a)

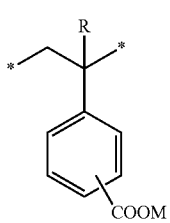

General Formula (b)

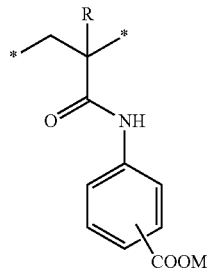

General Formula (c)

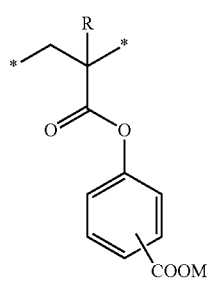

General Formula (d)

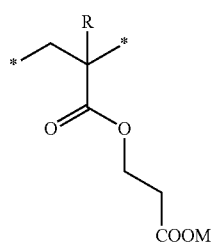

General Formula (e)

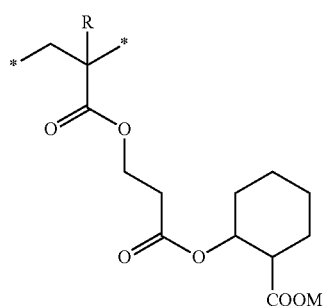

General Formula (f)

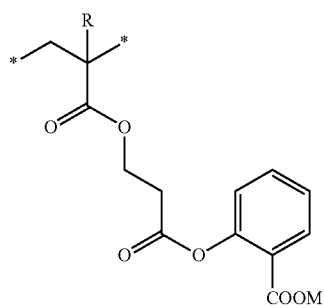

General Formula (g)

-continued

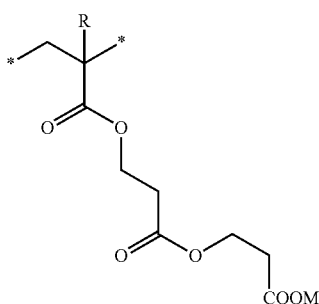

General Formula (h)

In the structural units represented by the various formulae of General Formulae (a) to (h), from the viewpoint of aggregating properties of the ink, it is preferable that the resin of the resin microparticles used in the invention has a structural unit selected from the structural units represented by various formulae of General Formulae (b), (c), (d) and (g), and it is particularly preferable that the resin has a structural unit selected from structural units represented by various formulae of General Formulae (b) and (c). The reason why the aggregating properties can be enhanced by having a structural unit selected from the structural units represented by various formulae of General Formulae (b), (c), (d) and (g) is not clearly known; however, the reason is presumed to be as follows. That is, it is speculated that aggregation of the resin microparticles in water occurs because the charge or the like of the resin microparticles changes as a result of the action of the treatment agent, dispersibility is decreased, and the interaction between hydrophobic parts among the resin microparticles can be enhanced. It is speculated that the aggregating properties are further enhanced by adopting a structure that contains a certain amount of a structural unit having an aromatic group, which is a hydrophobic group.

In a case in which the resin of the resin microparticles used in the invention has a structural unit selected from structural units represented by various formulae of General Formulae (a), (e), (f), and (h), an embodiment in which the resin further has a structural unit derived from styrene as another component is preferred, from the viewpoint of the aggregating properties of the ink.

In the general formulae shown above, R represents a hydrogen atom or a methyl group.

In the resin of the resin microparticles used in the invention, the total content of the structural units represented by various formulae of General Formulae (a) to (h) (in a case in which the resin of the resin microparticles used in the invention contains one kind from among the structural units represented by various formulae of General Formulae (a) to (h), the total content means the content of this one kind of structural unit, and in a case in which the resin has two or more kinds, the total content means the sum of the contents of these two or more kinds of structural units) is preferably 1% to 20% by mass, more preferably 2% to 15% by mass, and even more preferably 3% to 10% by mass.

It is also preferable that the resin of the resin microparticles used in the invention contains, as another structural unit, a structural unit derived from a vinyl compound or a vinylidene compound, each compound having an aromatic ring or an aliphatic ring, in addition to the structural units described above. However, the structural unit derived from a vinyl compound or a vinylidene compound, each compound having an aromatic ring or an aliphatic ring, does not have the moiety: $COOM^a$ (where $M^a$ has the same meaning as $M^2$ in General Formula (2), and preferred embodiments thereof are also the same).

Examples of the aromatic ring include an aromatic hydrocarbon ring (the number of carbon atoms is preferably 6 to 20) and an aromatic heterocyclic ring (a 5-membered or 6-membered aromatic heterocyclic ring having any one of an oxygen atom, a sulfur atom and a nitrogen atom as a ring-constituting atom is more preferred, and the aromatic heterocyclic ring may also be condensed. The number of carbon atoms that constitute the aromatic heterocyclic ring is preferably 2 to 20). An aromatic hydrocarbon ring is preferred, and above all, a benzene ring or a naphthalene ring is more preferred.

The aliphatic ring (that is, a ring that is not an aromatic ring) may be saturated or unsaturated as long as the ring does not exhibit aromaticity, may be bridged, and may be a monocyclic ring or a polycyclic ring. Examples of the aliphatic ring include an aliphatic hydrocarbon ring (a 3-membered to 6-membered ring is preferred, and a 5-membered or 6-membered ring is more preferred. The number of carbon atoms is preferably 3 to 20, more preferably 5 to 16, and even more preferably 6 to 10) and an aliphatic heterocyclic ring (a 5-membered or 6-membered aliphatic heterocyclic ring having any one of an oxygen atom, a sulfur atom and a nitrogen atom as a ring-constituting atom is more preferred. The number of carbon atoms that constitute the aliphatic heterocyclic ring is preferably 2 to 20), and an aliphatic hydrocarbon ring is preferred. Preferred examples of such an aliphatic hydrocarbon ring include a cycloalkane, a cycloalkene, a cycloalkyne, and a cyclic terpene. A cycloalkane and a cyclic terpene are preferred, and specific examples thereof include a cyclopropane ring, a cyclobutane ring, a cyclopentane ring, a cyclohexane ring, a cycloheptane ring, a cyclooctane ring, a cyclononane ring, a cyclodecane ring, a norbornane ring, an adamantane ring, a tricyclo[5.2.1.0$^{2,6}$]-decane ring, and a tricyclo[5.2.1.0$^{2,6}$]-decan-3-ene.

It is preferable that the resin that constitutes the resin microparticles used in the invention has an aromatic ring or an aliphatic ring and has one kind or two or more kinds of structural units derived from a vinyl compound or a vinylidene compound.

The structural unit derived from a vinyl compound or a vinylidene compound, each compound having an aromatic ring or an aliphatic ring, is preferably a structural unit derived from any one selected from styrene, 2-methylstyrene, and a monomer having an aromatic ring or an aliphatic ring and a (meth)acryloyl group. The structural unit is more preferably any one represented by General Formulae (A) to (E).

It is preferable that the resin that constitutes the resin microparticles used in the invention has one kind or two or more kinds of structural units represented by any one of General Formulae (A) to (E).

General Formula (A)

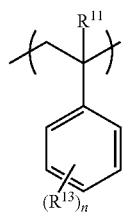

-continued

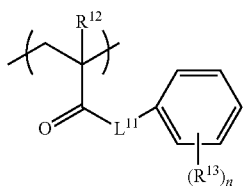

General Formula (B)

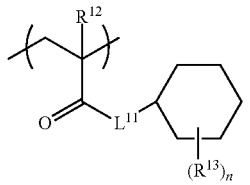

General Formula (C)

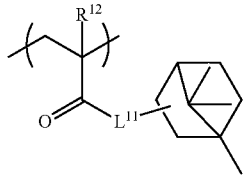

General Formula (D)

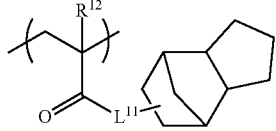

General Formula (E)

In General Formulae (A) to (E), $R^{11}$ and $R^{12}$ each independently represent a methyl group or a hydrogen atom. $R^{11}$ is preferably a hydrogen atom, and $R^{12}$ is preferably a methyl group. $R^{13}$'s each independently represent a chain-like or branched alkyl group having 1 to 10 carbon atoms. $R^{13}$ is preferably an alkyl group having 1 to 6 carbon atoms, and more preferably an alkyl group having 1 to 4 carbon atoms. n represents an integer from 0 to 5. n is preferably an integer from 0 to 3, more preferably an integer from 0 to 2, even more preferably 0 or 1, and most preferably 0. $L^{11}$ represents a single bond, a linear, branched or cyclic alkylene group having 1 to 18 carbon atoms (the number of carbon atoms is preferably 1 to 12, more preferably 1 to 8, even more preferably 1 to 4, particularly preferably 1 or 2, and most preferably 1. Hereinafter, simply referred to as an alkylene group), an arylene group having 6 to 18 carbon atoms, —O—, —NH—, —S—, —C(=O)—, or a divalent linking group formed by linking two or more of these. $L^{11}$ is preferably —O—, *—O-alkylene group- (bonded to a carbonyl bond in the formula at the site: *), or an —O-alkylene group-O—.

The alkyl group for $R^{13}$ may be either unsubstituted or substituted; however, for example, as a substituted alkyl group, an alkyl group having a halogen atom (preferably a chlorine atom) as a substituent may be mentioned.

Among the structural units represented by various formulae of General Formulae (A) to (E), from the viewpoint of the manufacturing suitability (filterability) of the resin microparticles, a structural unit represented by any one of General Formula (A) to (C) is preferred, a structural unit represented by General Formula (A) is more preferred, and a structural unit derived from styrene is even more preferred. As an example of a combination of any two structural units among the structural units represented by various formulae of General Formulae (A) to (E), a combination of a structural unit represented by General Formula (A) and a structural unit represented by General Formula (B), or a combination of a structural unit represented by General Formula (A) and a structural unit represented by General Formula (C) is preferred, and a combination of a structural unit represented by General Formula (A) and a structural unit represented by General Formula (B) is more preferred.

As a specific preferred example of the combination of any two structural units among the structural units represented by various formulae of General Formulae (A) to (E), a combination of a structural unit derived from styrene (structural unit represented by General Formula (A)) and a structural unit derived from benzyl methacrylate (structural unit represented by General Formula (B)), or a combination of a structural unit derived from styrene (structural unit represented by General Formula (A)) and a structural unit derived from cyclohexyl methacrylate (structural unit represented by General Formula (C)) is preferred.

In the case of considering the viewpoints of aggregating properties and scratch resistance as well as the viewpoints of manufacturing suitability (filterability) of the resin microparticles, the total content of the structural units derived from a vinyl compound or a vinylidene compound, each compound having an aromatic ring or an aliphatic ring, in the resin of the resin microparticles used in the invention (in a case in which the resin contains one kind of structural unit derived from a vinyl compound or a vinylidene compound, each compound having an aromatic ring or an aliphatic ring, the total content is the content of this one kind of structural unit, and in a case in which the two or more kinds are included, the total content means the sum of the contents of these two or more kinds of structural units) is preferably 1% to 60% by mass, more preferably 5% to 50% by mass, and even more preferably 10% to 40% by mass. Among the structural units derived from a vinyl compound or a vinylidene compound, each compound having an aromatic ring or an aliphatic ring, the content of a structural unit derived from styrene, which is particularly preferable, is preferably 3% to 30% by mass, more preferably 5% to 25% by mass, and even more preferably 10% to 20% by mass, in the resin of the resin microparticles used in the invention, in the case of considering the viewpoints of jettability, aggregating properties and scratch resistance as well as the viewpoint of the manufacturing suitability (filterability) of the resin microparticles.

Furthermore, in the resin of the resin microparticles used in the invention, the total content of the structural units represented by General Formula (1) or (2) (in a case in which the resin contains one kind of structural unit represented by General Formula (1) or (2), the total content means the content of this one kind, and in a case in which the resin contains two or more kinds, the total content means the sum of the contents of these two or more kinds) is designated as X % by mass, and the total content of the structural units derived from a vinyl compound or a vinylidene compound, each compound having an aromatic ring or an aliphatic ring, is designated as ZA % by mass (in a case in which the resin contains one structural unit derived from a vinyl compound or a vinylidene compound, each compound having an aromatic ring or an aliphatic ring, the total content means the content of this one kind, and in a case in which the resin contains two or more kinds, the total content means the content of these two or more kinds. Furthermore, for example, in a case in which the resin contains two kinds of structural units derived from a vinyl compound or a vinylidene compound, each compound having an aromatic ring or an aliphatic ring, the content of one structural unit derived from a vinyl compound or a vinylidene compound, each compound having an aromatic ring or an aliphatic ring, is designated as ZA1% by mass, and the content of the other structural unit is designated as ZA2% by mass. ZA=ZA1+ZA2). The ratio of ZA with respect to X at this time is such that, from the viewpoints of the aggregating properties, color density, jettability, scratch resistance, and the manufacturing suitability (filterability) of the resin microparticles, the ratio is preferably X:ZA=1:0.10 to 30, more preferably 1:0.5 to 25, even more preferably 1:1 to 20, and most preferably 1:4 to 13. In the resin of the resin microparticles used in the invention, in a case in which the content of the particularly preferred structural unit derived from styrene among the structural units derived from a vinyl compound or a vinylidene compound, each compound having an aromatic ring or an aliphatic ring, is designated as ST % by mass, the ratio of ST with respect to X is such that, from the viewpoints of the aggregating properties, scratch resistance, and the manufacturing suitability (filterability) of the resin microparticles, the ratio is preferably X:ST=1:0.30 to 15, more preferably 1:0.5 to 13, and even more preferably 1:1 to 10.

Specific preferred examples of the structural unit derived from a vinyl compound or a vinylidene compound, each compound having an aromatic ring or an aliphatic ring, will be shown below; however, the invention is not intended to be limited to these. In the structural units described below, Bu represents a butyl group. The symbol * represents a linking site.

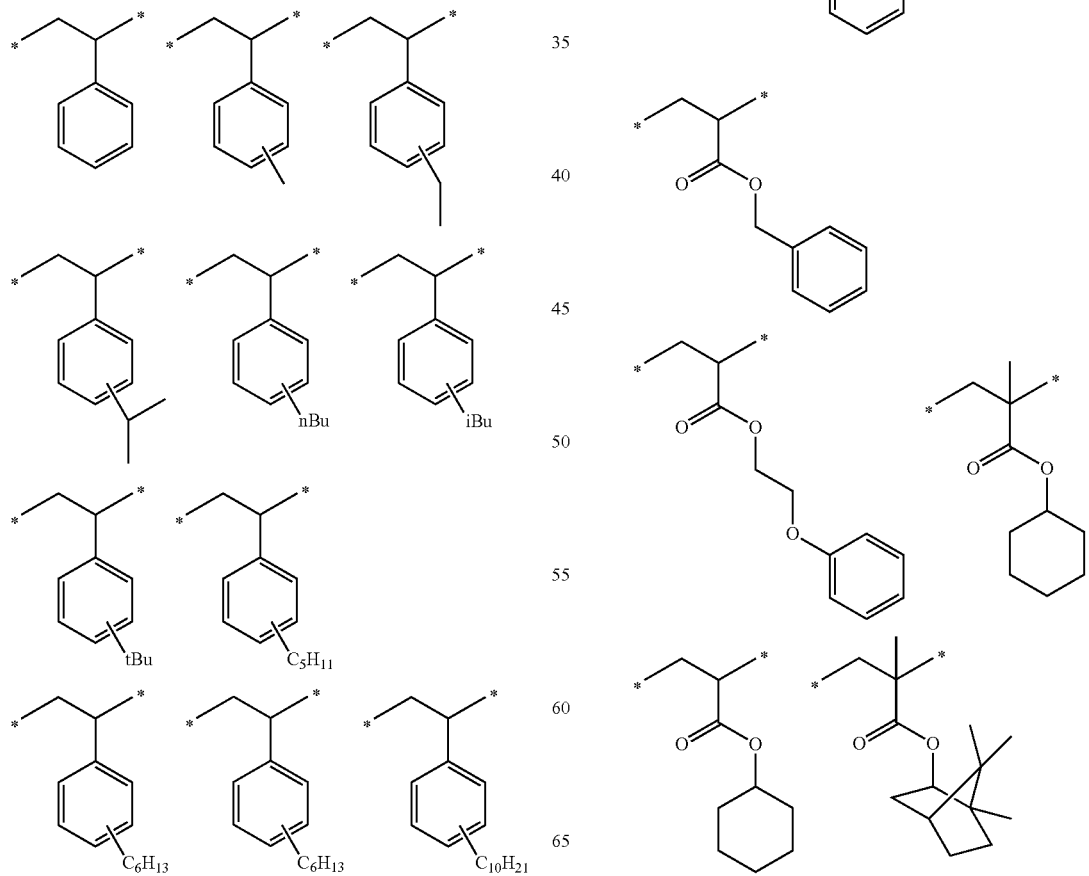

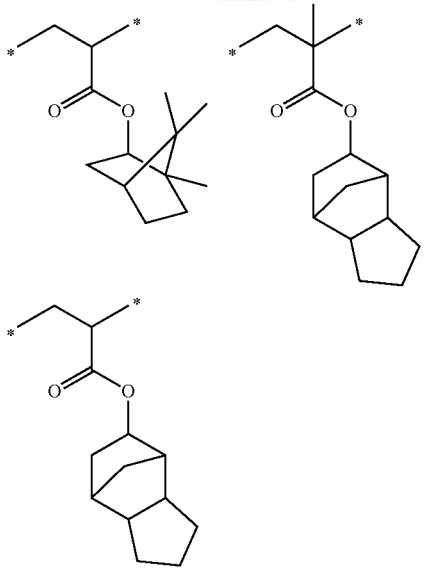

It is also preferable that the resin of the resin microparticles used in the invention contains, as another structural unit, a structural unit derived from a monomer having an I/O value in the organic conceptual diagram of 1.0 or more and less than 3.5. The "I/O value" according to the present specification is the ratio of the inorganic value (I) with respect to the organic value (O) in the organic conceptual diagram (hereinafter, simply referred to as I/O value). Specifically, the I/O value can be calculated based on the various reference documents of Atsushi Fujita, "Keitoteki Yuuki Teisei Bunseki—Kongoubutsu hen (Systemic Organic Qualitative Analysis—Mixtures)", "published in 1974 by Kazama Shobo Publishing Co., Ltd.; Nobuhiko Kuroki, "Senshoku Riron Kagaku (Theoretical Chemistry of Dyeing)", published in 1966 by Maki Shoten Co.; and Hiroo Inoue, "Yuuki Kagobutsu Bunri Ho (Organic Compound Separation Method)", published in 1990 by Shokabo Publishing Co., Ltd.

Regarding the other structural unit of the resin, the I/O value in the organic conceptual diagram is preferably 1.0 or more and less than 3.5, and more preferably 1.0 or more and less than 1.7.

In the resin of the resin microparticles used in the invention, the total content of the structural units derived from a monomer having an I/O value of 1.0 or more and less than 3.5 (in a case in which the resin contains one kind of the structural unit derived from a monomer having an I/O value of 1.0 or more and less than 3.5, the total content means the content of this one kind, and in a case in which the resin contains two or more kinds, the total content means the sum of the contents of these two or more kinds) is preferably 1% to 40% by mass, more preferably 3% to 30% by mass, and even more preferably 5% to 20% by mass, from the viewpoints of the manufacturing suitability (filterability) of the resin microparticles, and the scratch resistance of the ink film.

In the resin of the resin microparticles used in the invention, the total content of the structural units derived from a monomer having an I/O value of 1.0 or more and less than 3.5 is designated as ZB % by mass. At this time, the ratio of ZB % by mass with respect to the total content X % by mass of the structural units represented by General Formula (1) or (2) is such that the ratio is preferably X:ZB=1:0.25 to 15, more preferably 1:0.4 to 10, and even more preferably 1:0.6 to 7.5, from the viewpoint of further enhancing the aggregating properties, the color density, and the scratch resistance.

Specific examples of the structural unit derived from a monomer having an I/O value in the organic conceptual diagram of 1.0 or more and less than 3.5 include hydroxyalkyl (meth)acrylates such as hydroxymethyl (meth)acrylate, 2-hydroxyethyl (meth)acrylate, 2-hydroxypropyl (meth)acrylate, 4-hydroxybutyl (meth)acrylate, hydroxypentyl (meth)acrylate, and hydroxyhexyl (meth)acrylate; N-hydroxyalkyl (meth)acrylamides such as N-hydroxymethyl (meth)acrylamide, N-hydroxyethyl (meth)acrylamide, and N-hydroxybutyl (meth)acrylamide; N-alkoxyalkyl (meth)acrylamides such as N-methoxymethyl (meth)acrylamide, N-ethoxymethyl (meth)acrylamide, N-(n-, iso-)butoxymethyl (meth)acrylamide, N-methoxyethyl (meth)acrylamide, N-ethoxyethyl (meth)acrylamide, and N-(n-, iso-) butoxyethyl (meth)acrylamide; N-alkyl (meth)acrylamides such as N-isopropyl (meth)acrylamide, N,N'-dimethyl (meth)acrylamide, N,N'-diethyl (meth)acrylamide, and diacetone acrylamide; and carboxyl group-containing monomers having 3 to 15 carbon atoms, such as (meth)acrylic acid and β-carboxyethyl acrylate.

Furthermore, it is preferable that the resin of the resin microparticles used in the invention contains the structural unit derived from a vinyl compound or a vinylidene compound, each compound having an aromatic ring or an aliphatic ring, and the structural unit derived from a monomer having an I/O value in the organic conceptual diagram of 1.0 or more and less than 3.5, in addition to the structural unit represented by General Formula (1) or (2), from the viewpoint of further enhancing the aggregating properties, color density, scratch resistance, and the manufacturing suitability (filterability) of the resin microparticles.

It is also preferable that the resin of the resin microparticles used in the invention contains, as another structural unit, a structural unit having an amino group and/or a structural unit having a polyoxyethylene group. The structural unit having an amino group is preferably represented by any one of General Formulae (3) to (5), and the structural unit having a polyoxyethylene group is preferably represented by General Formula (6).

It is preferable that the resin that constitutes the resin microparticles used in the invention has one kind or two or more kinds of structural units among the structural units represented by General Formulae (3) to (6). Examples include a resin having a structural unit of General Formula (3), or a resin having a structural unit of General Formula (3) and a structural unit of General Formula (6).

General Formula (3)

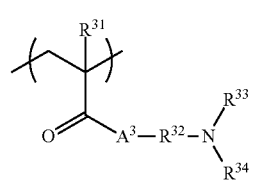

General Formula (4)

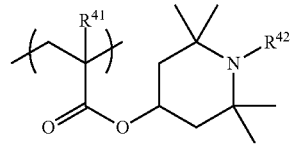

-continued

General Formula (5)

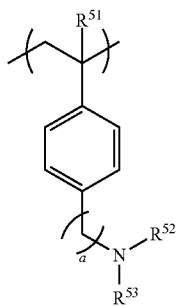

General Formula (6)

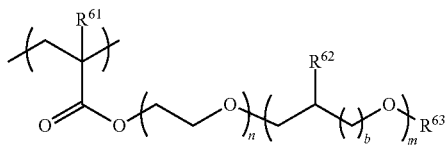

In General Formula (3), $A^3$ represents —O— or —$NR^{35}$—, and $A^3$ is preferably —O—. $R^{35}$ represents a hydrogen atom or an alkyl group having 1 to 4 carbon atoms, and $R^{35}$ is preferably a hydrogen atom, a methyl group, or an ethyl group, and is more preferably a hydrogen atom.

$R^{31}$ represents a hydrogen atom or a methyl group, and a methyl group is preferred. $R^{32}$ represents a divalent linking group. $R^{32}$ is preferably an alkylene group having 1 to 10 carbon atoms, more preferably an alkylene group having 2 to 8 carbon atoms, even more preferably an alkylene group having 2 to 5 carbon atoms, and still more preferably an alkylene group having 2 to 3 carbon atoms. Some of the carbon atoms that constitute this alkylene group may be each substituted with any one selected from —O—, —S—, —C(=O), and —$NR^A$—, or a combination thereof. $R^A$ has the same meaning as $R^{35}$ in connection with the explanation of $A^3$ given above, and preferred embodiments are also the same.

$R^{33}$ and $R^{34}$ each independently represent a hydrogen atom or an alkyl group having 1 to 6 carbon atoms, which may form a ring. $R^{33}$ and $R^{34}$ are each independently more preferably an alkyl group having 1 to 4 carbon atoms, and even more preferably a methyl group or an ethyl group. Some of the carbon atoms that constitute the alkyl group that may be adopted as $R^{33}$ and $R^{34}$ may be each substituted with any one selected from —O—, —S—, and —$NR^A$—. $R^A$ has the same meaning as $R^{35}$ in connection with the explanation of $A^3$ given above, and preferred embodiments are also the same.

There are no particular limitations on the ring that is formed by $R^{33}$ and $R^{34}$ linked to each other; however, the ring is preferably a morpholine ring, a piperidine ring, a piperazine ring, an imidazole ring, an indole ring, or a carbazole ring, and particularly preferably a morpholine ring, a piperidine ring, or a piperazine ring.

In a case in which $R^{33}$ and $R^{34}$ are not linked to each other and do not form a ring, it is preferable that $R^{33}$ and $R^{34}$ are the same.

In General Formula (4), $R^{41}$ represents a hydrogen atom or a methyl group, and $R^{41}$ is preferably a methyl group.

$R^{42}$ represents a hydrogen atom or an alkyl group having 1 to 4 carbon atoms. The alkyl group for $R^{42}$ is preferably a methyl group or an ethyl group, and is more preferably a methyl group.

In General Formula (5), $R^{51}$ represents a hydrogen atom or a methyl group, and $R^{51}$ is preferably a hydrogen atom.

$R^{52}$ and $R^{53}$ each independently represent an alkyl group having 1 to 4 carbon atoms. $R^{52}$ and $R^{53}$ are each independently preferably a hydrogen atom or a methyl group.

a represents an integer from 0 to 2, and a is preferably 0.

In General Formula (6), $R^{61}$ represents a hydrogen atom or a methyl group, and $R^{61}$ is preferably a methyl group.

$R^{62}$ represents a hydrogen atom or a methyl group, and $R^{62}$ is preferably a methyl group.

$R^{63}$ represents a hydrogen atom, an alkyl group having 1 to 22 carbon atoms, or a phenyl group. $R^{63}$ is preferably a hydrogen atom, an alkyl group having 1 to 6 carbon atoms, or a phenyl group; more preferably a hydrogen atom or an alkyl group having 1 to 4 carbon atoms; and even more preferably a hydrogen atom or a methyl group.

b represents an integer from 0 to 2, and b is preferably 0 or 2. In a case in which b is 0, $R^{62}$ is a methyl group.

n represents 2 to 100, and n is preferably 2 to 50, more preferably 2 to 23, and even more preferably 9 to 23.

m represents 0 to 50, and m is preferably 0 to 10, and more preferably 0.

n and m represent the averages of the numbers of repetitions of a polyoxyethylene group and a polyoxyalkylene group, respectively.

In the resin of the resin microparticles used in the invention, the total content of the structural units represented by any one of General Formulae (3) to (6) (in a case in which the resin contains one kind of structural unit represented by any one of General Formulae (3) to (6), the total content means the content of this one kind, and in a case in which the resin contains two or more kinds, the total content means the sum of the contents of these two or more kinds) is preferably 1% to 30% by mass, more preferably 2% to 30% by mass, even more preferably 2% to 20% by mass, and most preferably 5% to 15% by mass, as a sum total, from the viewpoints of the aggregating properties, restorability upon standing, and scratch resistance.

In the resin of the resin microparticles used in the invention, the ratio of the total content, Y % by mass, of the structural units represented by any one of General Formulae (3) to (6) with respect to the total content, X % by mass, of the structural units represented by General Formula (1) or (2) is such that from the viewpoints of the aggregating properties, color density, restorability upon standing, and scratch resistance, the ratio is preferably X:Y=1:0.25 to 15, more preferably 1:0.4 to 10, and even more preferably 1:0.6 to 7.5.

In a case in which the resin of the resin microparticles used in the invention has a structural unit represented by any one of General Formulae (3) to (5) in addition to the structural unit represented by General Formula (1) or (2), it is speculated that since the resin is hydrophilic in the ink (inside the inkjet head), dispersion stability is enhanced, and thereby excellent restorability upon standing is obtained. After jetting, the resin reacts with an acid, thereby hydrophilicity is further enhanced, fusion weldablity is enhanced, and thereby excellent scratch resistance is obtained. Therefore, it is believed that a balance between restorability upon standing and scratch resistance can be achieved. From this point of view, the total content of the structural units represented by any one of General Formula (3) to (5) (in a case in which the resin contains one kind of structural unit represented by any one of General Formulae (3) to (5), the total content means the content of this one kind, and in a case in which the resin contains two or more kinds, the total content means the sum of the contents of these two or more kinds) is preferably 1% to 30% by mass, more preferably 2% to 30% by mass, and even more preferably 2% to 10% by mass. The ratio of the total content, Ya % by mass, of the structural units represented by any one of General Formulae (3) to (5) with respect to the total content, X % by mass, of the structural units represented by General Formula (1) or (2) is such that the ratio is preferably X:Ya=1:0.25 to 15, and more preferably 1:0.4 to 5.

In a case in which the resin of the resin microparticles used in the invention has a structural unit represented by General Formula (6) in addition to the structural unit represented by General Formula (1) or (2), it is speculated that the resin has enhanced dispersion stability in the ink (inside the inkjet head) due to a hydrophilic steric repulsion group (polyoxyethylene group), thereby excellent restorability upon standing is obtained. After jetting, fusion weldability is enhanced due to a hydrophilic low-Tg component (polyoxyethylene group), thereby excellent scratch resistance is obtained, and therefore, it is believed that a balance between restorability upon standing and scratch resistance can be achieved. From this point of view, the total content of the structural unit represented by General Formula (6) (in a case in which the resin contains one kind of the structural unit represented by General Formula (6), the total content means the content of this one kind, and in a case in which the resin contains two or more kinds, the total content means the sum of the contents of these two or more kinds) is preferably 5% to 30% by mass, more preferably 5% to 20% by mass, and even more preferably 5% to 15% by mass. The ratio of the total content, Yb % by mass, of the structural units represented by General Formula (6) with respect to the total content, X % by mass, of the structural units represented by General Formula (1) or (2) is such that the ratio is preferably X:Yb=1:0.3 to 20, more preferably 1:0.5 to 15, even more preferably 1:0.6 to 10, and most preferably 1:0.6 to 7.5.

From the reasons described above, as the resin of the resin microparticles used in the invention has a structural unit represented by any one of General Formulae (3) to (5) or a structural unit represented by General Formula (6), the aqueous ink composition of the invention can exhibit satisfactory jettability (deflection), restorability upon standing, and scratch resistance (condition B), and thus it is preferable. Particularly, by having a structural unit represented by any one of General Formulae (3) to (5) and a structural unit represented by General Formula (6), the aqueous ink composition of the invention can realize more satisfactory jettability (deflection), restorability upon standing, and scratch resistance.

Specific preferred examples of the structural units represented by General Formulae (3) to (5) and the structural unit represented by General Formula (6) are shown below; however, the invention is not intended to be limited to these. In the structural units described below, Me represents a methyl group, Et represents an ethyl group, Pr represents a propyl group, Bu represents a butyl group, and Ph represents a phenyl group. The symbol * represents a linking site. n and m have the same meanings as n and m in General Formula (6), respectively, and preferred ranges are also the same.

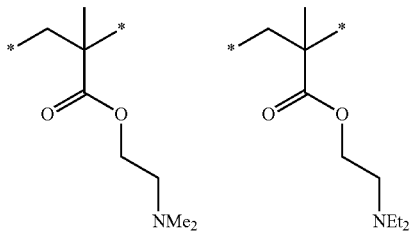

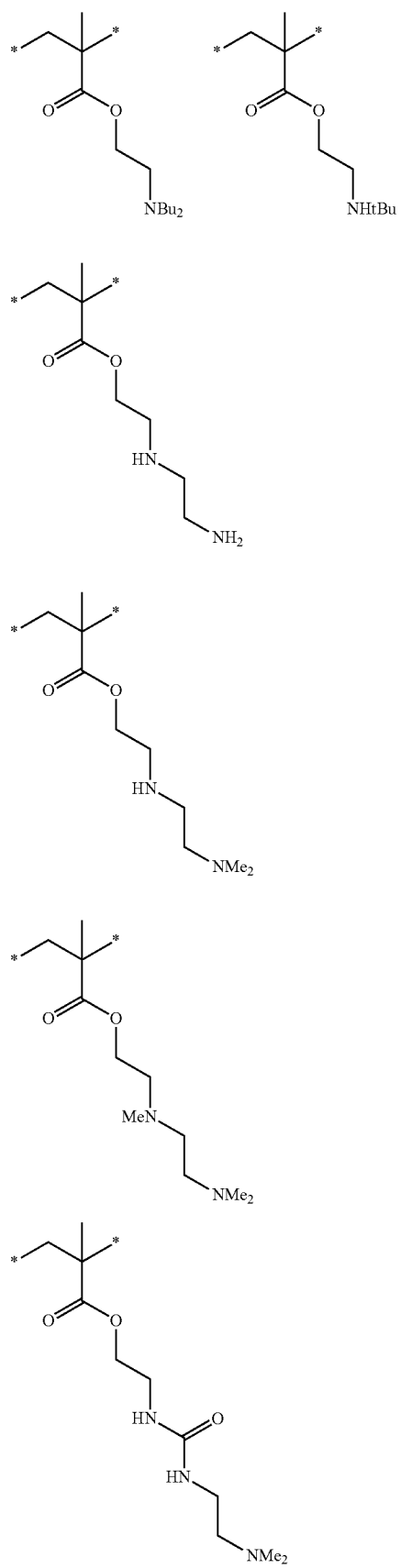

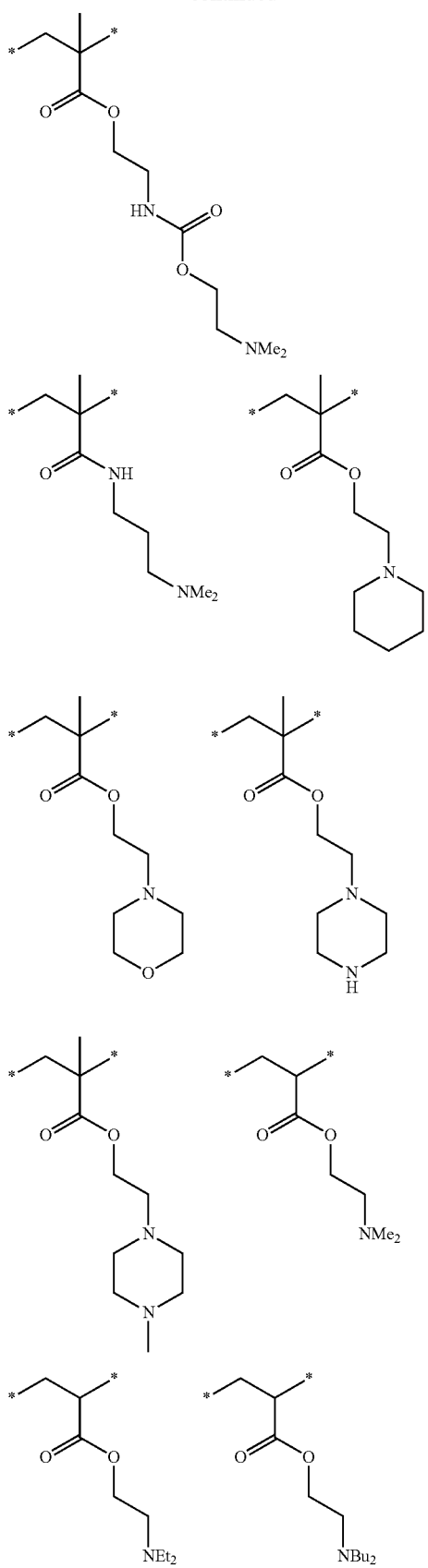
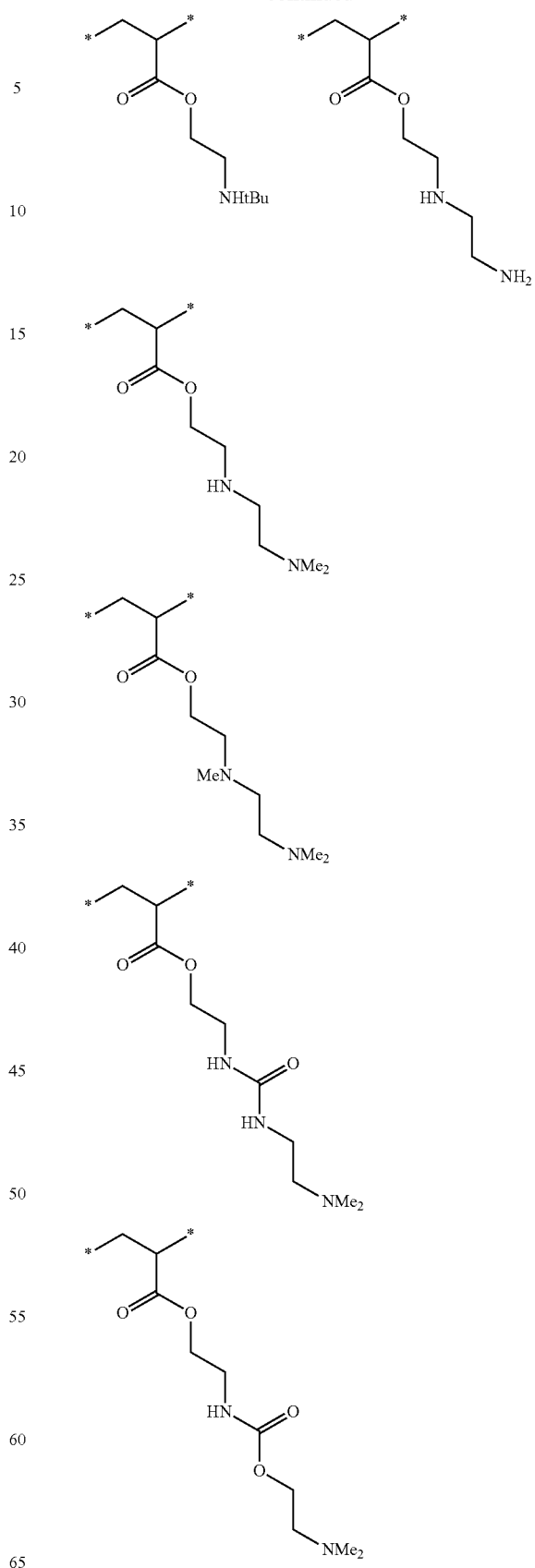

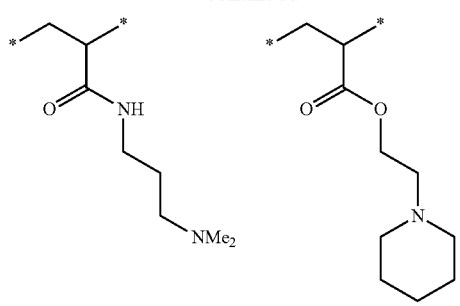
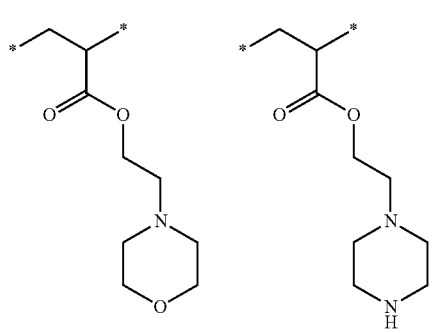
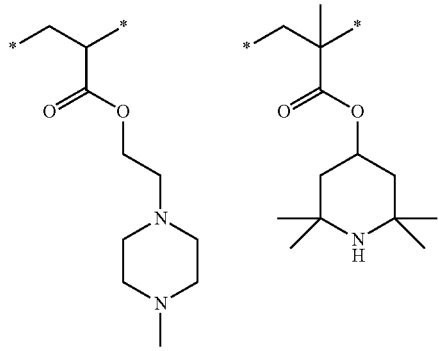
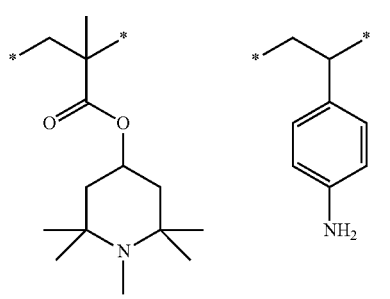
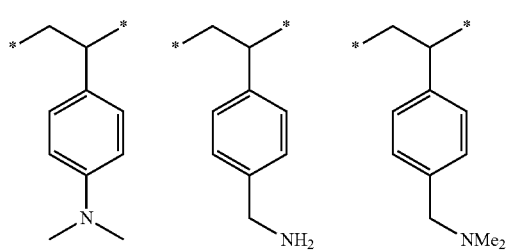
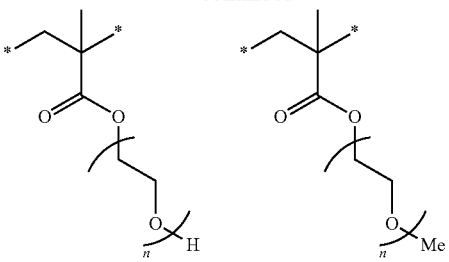
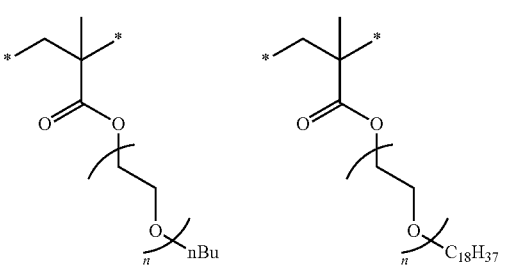
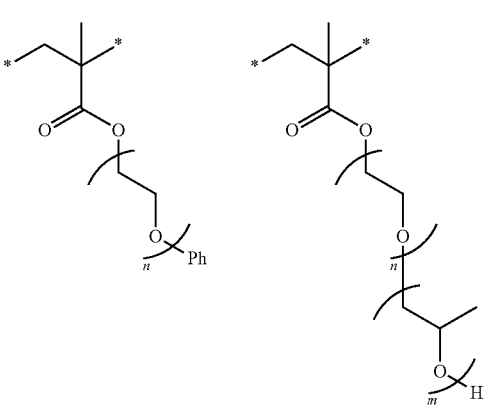
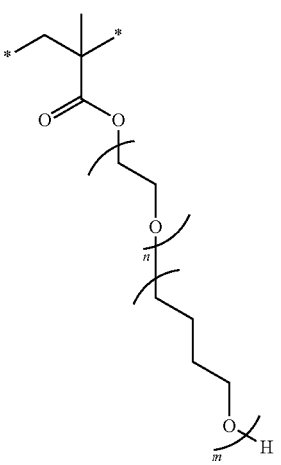
The resin of the resin microparticles used in the invention may also contain a structural unit represented by any one of General Formulae (7) to (10) as another structural unit, from the viewpoint of synthesis.

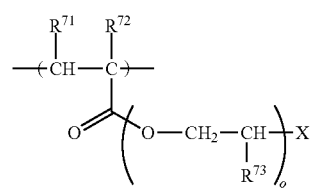
General Formula (7)

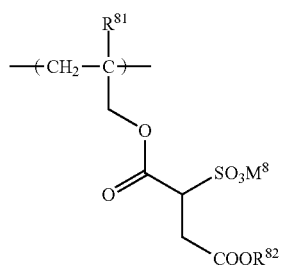
General Formula (8)

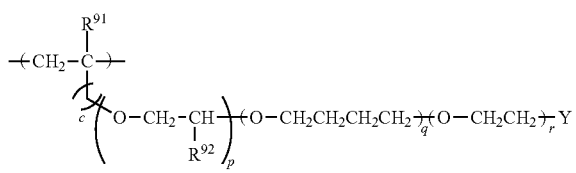
General Formula (9)

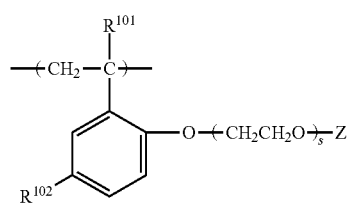
General Formula (10)

In General Formula (7), $R^{71}$ represents a hydrogen atom or —$COOR^{74}$; $R^{74}$ represents a hydrogen atom or an alkyl group having 1 to 4 carbon atoms; $R^{72}$ represents a hydrogen atom or an alkyl group having 1 to 4 carbon atoms; and $R^{73}$ represents a hydrogen atom or a methyl group. In a case in which $R^{71}$ represents a hydrogen atom, X represents any one of —$SO_3M^7$ and —$OSO_3M^7$; and in a case in which $R^{71}$ represents —$COOR^{74}$, X represents a hydroxyl group or any one of —$OR^{75}$, —$SO_3M^7$, and —$OSO_3M^7$. $R^{75}$ represents an alkyl group having 8 to 22 carbon atoms, which may be branched. $M^7$ represents a hydrogen atom, an alkali metal atom, or an ammonium salt. o represents 1 to 100.

In General Formula (8), $R^{81}$ represents a hydrogen atom or a methyl group; $R^{82}$ represents an alkyl group having 8 to 22 carbon atoms, which may be branched; and $M^8$ represents a hydrogen atom, an alkali metal atom, or an ammonium salt.

In General Formula (9), $R^{91}$ represents a hydrogen atom or a methyl group; $R^{92}$ represents an alkyl group having 8 to 22 carbon atoms, which may be branched; Y represents a hydroxyl group, or any one of —$OR^{93}$, and —$OSO_3M^9$; $R^{93}$ represents an alkyl group having 8 to 22 carbon atoms, which may be branched; and $M^9$ represents a hydrogen atom, an alkali metal atom, or an ammonium salt. c and p each independently represent 0 or 1; q represents 0 to 40; and r represents 1 to 100.

In General Formula (10), $R^{101}$ represents a hydrogen atom or a methyl group; $R^{102}$ represents an alkyl group having 4 to 18 carbon atoms, which may be branched; Z represents a hydrogen atom, or any one of an alkyl group having 8 to 22 carbon atoms, which may be branched, and —$SO_3M^{10}$; and $M^{10}$ represents a hydrogen atom, an alkali metal atom, or an ammonium salt. s represents 1 to 100.

o, p, q, r, and s each represent the average of the number of repetitions of the structure enclosed in the parentheses.

In the resin of the resin microparticles used in the invention, the content of the structural unit represented by any one of General Formulae (7) to (10) is preferably 0.1% to 30% by mass, more preferably 0.5% to 20% by mass, and even more preferably 1% to 10% by mass, in total from the viewpoint of synthesis.

Specific examples of the monomer from which the structural unit represented by any one of General Formula (7) to (10) is derived include the commercially available products described below; however, the invention is not intended to be limited to these.

In the following description, the trade name is described under each structural formula. Here, ELEMINOL is a product of Sanyo Chemical Industries, Ltd.; ANTOX is a product of Nippon Nyukazai Co., Ltd.; LATEMUL is a product of Kao Corporation; and AQUALON is a product of Dai-ichi Kogyo Seiyaku Co., Ltd. The structure enclosed in the parentheses in each structural formula means a repeating structure, and the structure has a particular number of repetitions in each manufactured product.

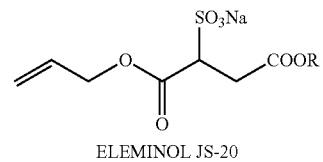
ELEMINOL JS-20

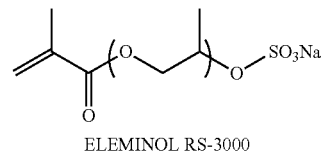
ELEMINOL RS-3000

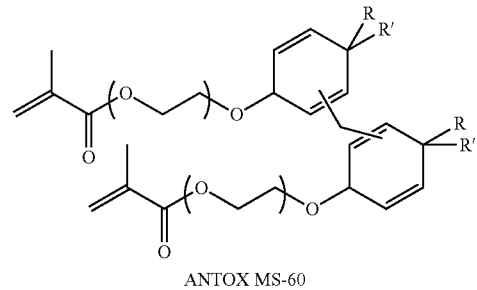
ANTOX MS-60

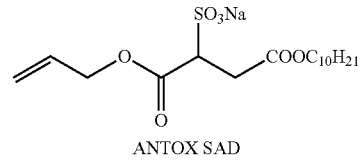
ANTOX SAD

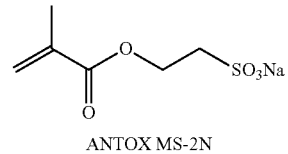
ANTOX MS-2N

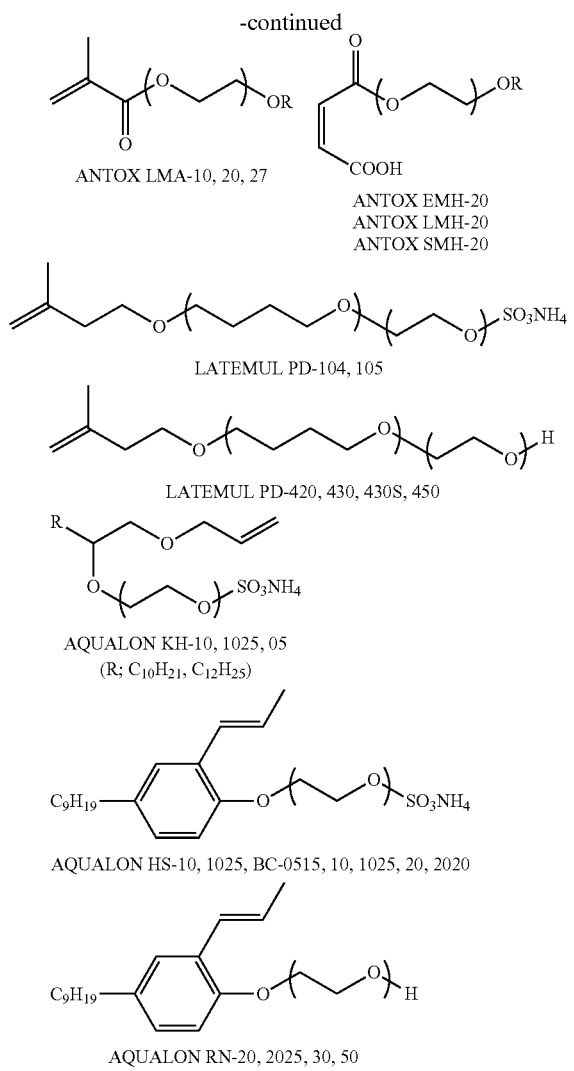

The resin of the resin microparticles used in the invention may also include a structural unit other than those described above, as another structural unit. Examples of such a structural unit include structural units derived from monomers selected from (meth)acrylonitrile and the like.

In regard to the resin of the resin microparticles used in the invention, it is preferable to adjust the content of a sulfo group or a salt thereof to be 0.13 mmol/g or less, from the viewpoint of the aggregating properties of the ink. In a case in which the resin contains a sulfo group or a salt thereof, stability of the resin microparticles is enhanced. Therefore, it is speculated that aggregation of the resin microparticles does not easily occur even under environmental changes such as pH changes and temperature changes, and the aggregating properties of the ink are deteriorated.

The glass transition temperature (Tg) of the resin microparticles used in the invention is preferably 20° C. to 150° C., more preferably 40° C. to 130° C., and even more preferably 50° C. to 120° C., from the viewpoints of scratch resistance and blocking resistance of the images thus obtainable.

The glass transition temperature of the resin microparticles can be controlled as appropriate, according to a conventionally known method. For example, the glass transition temperature of the resin microparticles can be controlled to a desired range by adjusting the type or the composition ratio of the monomers used for the synthesis of the resin that constitutes the resin microparticles, the molecular weight of the polymer that constitutes the resin microparticles, and the like as appropriate.

According to the invention, regarding the glass transition temperature of the resin microparticles, the measured Tg that is obtained by actual measurement is applied.

The measured Tg is measured by performing an analysis using a differential scanning calorimeter (DSC), EXSTAR6220, manufactured by SII NanoTechnology, Inc. at a rate of temperature increase of 10° C./min, and calculating the average of the temperature at which the baseline begins to change along with glass transition of the resin microparticles, and the temperature at which the baseline returns to the original position.

However, in a case in which measurement is difficult due to decomposition of the resin, sensitivity, or the like, the calculated Tg that is calculated by the following calculation formula is applied. The calculated Tg is calculated by the following formula:

$$1/Tg = \Sigma(X_i/Tg_i)$$

Here, the resin that is the object of calculation is considered that n kinds of monomer components from i=1 to i=n are copolymerized. $X_i$ is the weight fraction of the i-th monomer ($\Sigma X_i = 1$), and $Tg_i$ is the glass transition temperature (absolute temperature) of a homopolymer of the i-th monomer, provided that $\Sigma$ adopts the sum of values from i=1 to i=n. Regarding the values of the glass transition temperature ($Tg_i$) of the homopolymers of various monomers, the values disclosed in Polymer Handbook ($3^{rd}$ Edition) (written by J. Brandrup and E. H. Immergut (Wiley Interscience, 1989)) are employed.

The weight-average molecular weight (Mw) of the resin (polymer) that constitutes the resin microparticles used in the invention is preferably 80,000 or more, more preferably 100,000 to 1,000,000, and even more preferably 120,000 to 800,000. By adjusting the weight-average molecular weight to a value of 80,000 or more, the aggregating properties, the color density of images, and the mechanical properties of the film thus obtainable can be further enhanced. The weight-average molecular weight is measured by the method described in the Examples given below, using gel permeation chromatography (GPC).

The resin that constitutes the resin microparticles used in the invention may be a block copolymer, or may be a random copolymer.

In the aqueous ink composition of the invention, the particle size of the resin microparticles used in the invention is preferably 1 to 400 nm, more preferably 5 to 300 nm, even more preferably 20 to 200 nm, still more preferably 20 to 100 nm, and still more preferably 20 to 50 nm, from the viewpoint of ink jettability.

The aforementioned particle size of the resin microparticles means the volume average particle diameter. This volume average particle diameter can be measured by the method described in the Examples given below.

The resin microparticles can be produced by an emulsion polymerization method. The emulsion polymerization method is a method of producing resin microparticles by polymerizing an emulsion prepared by adding monomers, a polymerization initiator, an emulsifier, and a chain transfer agent or the like as necessary to an aqueous medium (for example, water). In a case in which this emulsion polymerization method is applied to the production of the resin microparticles used in the invention, the monomer from which the structural unit represented by General Formula (1) is derived and the monomer from which the structural unit represented by General Formula (2) is derived, also function as emulsifiers. Therefore, it is not necessary to separately incorporate an emulsifier in addition to these monomers; however, existing emulsifiers may also be separately added, to the extent that jettability and aggregating properties are not deteriorated.

The polymerization initiator is not particularly limited, and an inorganic persulfate (for example, potassium persulfate, sodium persulfate, or ammonium persulfate), an azo-based initiator (for example, 2,2'-azobis(2-amidinopropane) dihydrochloride, 2,2'-azobis[2-methyl-N-(2-hydroxyethyl)-propionamide], or 4,4'-azobis(4-cyanovaleric acid)), an organic peroxide (for example, t-butyl peroxypivalate, t-butyl hydroxyperoxide, or 2-succinic acid peroxide), and salts thereof can be used. These can be used singly or in combination of two or more kinds thereof. Among them, it is preferable to use an azo-based initiator or an organic peroxide.

The amount of use of the polymerization initiator according to the invention is usually 0.01 to 5 parts by mass, and preferably 0.2 to 2 parts by mass, with respect to 100 parts by mass of all the monomers.

The resin of the resin microparticles used in the invention may have a polymerization initiator residue on at least one of the two terminals. It is preferable that this polymerization initiator residue does not have a sulfo group or a salt thereof, from the viewpoint of the aggregating properties. That is, it is preferable that the polymerization initiator used in the case of producing the resin microparticles that are used in the invention does not have a sulfo group or a salt thereof.

It is preferable that this polymerization initiator residue has a carboxyl group or a salt thereof or a nonionic group, and it is particularly preferable that the polymerization initiator residue has a carboxyl group or a salt thereof. That is, it is preferable that the polymerization initiator used in the case of producing the resin microparticles that are used in the invention has a carboxyl group or a salt thereof or a nonionic group, without having a sulfo group or a salt thereof, and it is particularly preferable that the polymerization initiator has a carboxyl group or a salt thereof.

As the chain transfer agent, a known compound such as carbon tetrahalide, a dimer of a styrene, a dimer of a (meth)acrylic acid ester, a mercaptan, or a sulfide, can be used. Among them, the dimer of a styrene, or the mercaptan described in JP1993-17510A (JP-H05-17510A) can be suitably used.

It is preferable that the resin microparticles used in the invention are dispersed in an aqueous medium such as described above. It is more preferable that the resin microparticles used in the invention are self-dispersing resin microparticles. Here, self-dispersing resin microparticles refer to microparticles formed from a water-insoluble resin, which can be brought to a dispersed state in an aqueous medium by means of the functional group (particularly an acidic group or a salt thereof) carried by the resin itself.

Here, the dispersed state includes both an emulsified state (emulsion) in which a water-insoluble resin is dispersed in a liquid state in an aqueous medium, and a dispersed state (suspension) in which a water-insoluble resin is dispersed in a solid state in an aqueous medium.

The term "water-insoluble" means that the dissolved amount in 100 parts by mass of water (25° C.) is 5.0 parts by mass or less.

The resin microparticles used in the invention do not function as a dispersant of a pigment, and therefore, the resin microparticles do not include a pigment in the inside of the particles.

<Pigment>

The aqueous ink composition of the invention preferably has a form in which one kind or two or more kinds of pigments are dispersed.

There are no particular limitations on the type of the pigment that is used in the aqueous ink composition of the invention, and any conventional organic or inorganic pigment can be used.

Examples of the organic pigment include an azo pigment, a polycyclic pigment, a chelate dye, a nitro pigment, a nitroso pigment, and aniline black. Among these, an azo pigment or a polycyclic pigment is preferred.

Examples of the azo pigment include an azo lake, an insoluble azo pigment, a condensed azo pigment, and a chelated azo pigment.

Examples of the polycyclic pigment include a phthalocyanine pigment, a perylene pigment, a perinone pigment, an anthraquinone pigment, a quinacridone pigment, a dioxazine pigment, an indigo pigment, a thioindigo pigment, an isoindolinone pigment, and a quinophthalone pigment.

Examples of the chelate dye include a basic dye-type chelate, and an acid dye-type chelate.

Examples of the inorganic pigment include titanium oxide, iron oxide, calcium carbonate, barium sulfate, aluminum hydroxide, Barium Yellow, Cadmium Red, Chrome Yellow, and carbon black.

Specific examples of the pigment that can be used in the invention include the pigments described in paragraphs 0142 to 0145 of JP2007-100071A.

The volume average particle diameter of the pigment in the aqueous ink composition of the invention is preferably 10 to 200 nm, more preferably 10 to 150 nm, and even more preferably 10 to 100 nm. As the volume average particle diameter is 200 nm or less, satisfactory color reproducibility is obtained, and in the case of an inkjet method, satisfactory jetting properties are obtained. As the volume average particle diameter is 10 nm or more, satisfactory light resistance is obtained. The volume average particle diameter of the pigment in the aqueous ink composition can be measured by a known measurement method. Specifically, the volume average particle diameter can be measured by a centrifugal sedimentation light transmission method, an X-ray transmission method, a laser diffraction/light scattering method, or a dynamic light scattering method.

There are no particular limitations on the particle size distribution of the pigment in the aqueous ink composition of the invention, and the particle size distribution may be any one of a wide particle size distribution and a monodisperse particle size distribution. Also, two or more kinds of colorants each having a monodisperse particle size distribution may be used as a mixture.

The volume average particle diameter of the pigment can be measured by a method similar to the measurement of the volume average particle diameter of the resin microparticles described above.

In a case in which the aqueous ink composition of the invention includes a pigment, from the viewpoints of colorability and storage stability, the content of the pigment in the aqueous ink composition is preferably 1% to 20% by mass, and more preferably 1% to 10% by mass.

—Dispersant—

In a case in which the aqueous ink composition of the invention includes a pigment, as the pigment, it is preferable to produce coloring particles in which a pigment is dispersed in an aqueous medium by a dispersant (hereinafter, simply referred to as "coloring particles"), and use this as a raw material of the aqueous ink composition.

The dispersant may be a polymeric dispersant, or may be a low-molecular-weight surfactant-type dispersant. Furthermore, the polymeric dispersant may be any of a water-soluble polymeric dispersant and a water-insoluble polymeric dispersant.

In regard to the low-molecular-weight surfactant-type dispersant, for example, the known low-molecular-weight surfactant-type dispersants described in paragraphs 0047 to 0052 of JP2011-178029A can be used.

Among the polymeric dispersants, a hydrophilic polymer compound may be mentioned as the water-soluble dispersant. Examples include, as naturally occurring hydrophilic polymer compounds, plant polymers such as gum arabic, gum tragacanth, guar gum, karaya gum, locust bean gum, arabinogalactone, pectin, and quince seed starch; seaweed-based polymers such as alginic acid, carrageenan, and agar; animal-based polymers such as gelatin, casein, albumin, and collagen; and microorganism-based polymers such as xanthan gum and dextran.

Examples of a modified hydrophilic polymer compound obtained by using a natural product as a raw material, include cellulose-based polymers such as methyl cellulose, ethyl cellulose, hydroxyethyl cellulose, hydroxypropyl cellulose, and carboxymethyl cellulose; starch-based polymers such as sodium starch glycolate and starch phosphoric acid ester sodium; and seaweed-based polymers such as sodium alginate and alginic acid propylene glycol ester.

Furthermore, examples of a synthetic hydrophilic polymer compound include vinylic polymers such as polyvinyl alcohol, polyvinylpyrrolidone, and polyvinyl methyl ether; acrylic resins such as non-crosslinked polyacrylamide, polyacrylic acid or an alkali metal salt thereof, and a water-soluble styrene-acrylic resin; a water-soluble styrene-maleic acid resin, a water-soluble vinylnaphthalene-acrylic resin, a water-soluble vinylnaphthalene-maleic acid resin, a polymer compound having an alkali metal salt of polyvinylpyrrolidone, polyvinyl alcohol or a β-naphthalenesulfonic acid-formalin condensate, or a salt of a cationic functional group such s a quaternary ammonium or an amino group in a side chain; and a naturally occurring polymer compound such as shellac.

Among these, a hydrophilic polymer compound having a carboxyl group introduced therein, such as a homopolymer of acrylic acid or methacrylic acid, or a copolymer of acrylic acid or methacrylic acid with another monomer, is preferred.

The water-insoluble polymer dispersant is not particularly limited as long as it is a water-insoluble polymer and is capable of dispersing a pigment, and any conventionally known water-insoluble polymer dispersant can be used. A water-insoluble polymer dispersant can be configured to include, for example, both a hydrophobic structural unit and a hydrophilic structural unit.

Here, examples of the monomer component that constitutes a hydrophobic structural unit include a styrene-based monomer component, an alkyl (meth)acrylate component, and an aromatic group-containing (meth)acrylate component.

Regarding the monomer component that constitutes a hydrophilic structural unit is not particularly limited as long as it is a monomer component containing a hydrophilic group. Examples of this hydrophilic group include a non-ionic group, a carboxyl group, a sulfonic acid group, and a phosphoric acid group. Examples of the nonionic group include a hydroxyl group, an amide group (having an unsubstituted nitrogen atom), a group derived from an alkylene oxide polymer (for example, polyethylene oxide or polypropylene oxide), and a group derived from a sugar alcohol.

It is preferable that the hydrophilic structural unit includes at least a carboxyl group from the viewpoint of dispersion stability, and an embodiment in which the hydrophilic structural unit includes both a nonionic group and a carboxyl group is also preferred.

Specific examples of the water-insoluble polymer dispersant include a styrene-(meth)acrylic acid copolymer, a styrene-(meth)acrylic acid-(meth)acrylic acid ester copolymer, a (meth)acrylic acid ester-(meth)acrylic acid copolymer, a polyethylene glycol (meth)acrylate-(meth)acrylic acid copolymer, and a styrene-maleic acid copolymer.

It is preferable that the water-insoluble polymer dispersant is a vinyl polymer containing a carboxyl group, from the viewpoint of the dispersion stability of the pigment. Furthermore, it is more preferable that the water-insoluble polymer dispersant is a vinyl polymer having at least a structural unit derived from an aromatic group-containing monomer as a hydrophobic structural unit and having a structural unit including a carboxyl group as a hydrophilic structural unit.

The weight-average molecular weight of the water-insoluble polymer dispersant is preferably 3,000 to 200,000, more preferably 5,000 to 100,000, even more preferably 5,000 to 80,000, and particularly preferably 10,000 to 60,000, from the viewpoint of the dispersion stability of the pigment.

The content of the dispersant in the coloring particles is preferably 10 to 90 parts by mass, more preferably 20 to 70 parts by mass, and particularly preferably 30 to 50 parts by mass, with respect to 100 parts by mass of the pigment, from the viewpoints of the dispersibility of the pigment, ink colorability, and dispersion stability.

As the content of the dispersant in the coloring particles is in the range described above, the pigment is covered with an appropriate amount of a dispersant, and coloring particles having a small particle size and excellent temporal stability tend to be easily obtained, which is preferable.

The coloring particles are obtained by, for example, dispersing a mixture including a pigment, a dispersant, and a solvent as necessary (preferably an organic solvent), by means of a dispersing machine.

More specifically, for example, a dispersion can be produced by providing a step of adding an aqueous solution including a basic substance to a mixture of a pigment, a dispersant, and an organic solvent for dissolving or dispersing this dispersant (mixing and hydration step), followed by a step of removing the organic solvent (solvent removal step). Thereby, the pigment is finely dispersed, and a dispersion of coloring particles having excellent storage stability can be produced.

The organic solvent needs to be capable of dissolving or dispersing a dispersant; however, in addition to this, it is preferable that the organic solvent has an affinity to water to some extent. Specifically, an organic solvent having a solubility in water at 20° C. of 10% to 50% by mass is preferred.

Preferred examples of the organic solvent include water-soluble organic solvents. Among them, isopropanol, acetone, and methyl ethyl ketone are preferred, and particularly, methyl ethyl ketone is preferred. The organic solvents may be used singly, or a plurality of solvents may be used together.

The basic substance is used for the neutralization of the anionic group (preferably, carboxyl group) that may be carried by the polymer. The degree of neutralization of the anionic group is not particularly limited. Usually, it is preferable that the acidity or alkalinity of the dispersion of the colorant particles that are finally obtained is, for example, pH 4.5 to 10. The pH may be determined by the desired degree of neutralization of the polymer.

Regarding the removal of the organic solvent in the process for producing a dispersion of coloring particles, the method is not particularly limited, and the organic solvent can be removed by any known method such as distillation under reduced pressure.

In the aqueous ink composition of the invention, the coloring particles may be used singly or in combination of two or more kinds.

<Surfactant>

The aqueous ink composition of the invention may include a surfactant as a surface tension adjuster.

As the surfactant, any one of an anionic surfactant, a cationic surfactant, an amphoteric surfactant, a nonionic surfactant, and a betaine-based surfactant can be used.

Specific examples of the anionic surfactant include, for example, sodium dodecyl benzenesulfonate, sodium lauryl sulfate, sodium alkyldiphenyl ether disulfonate, sodium alkyl naphthalanesulfonate, sodium dialkyl sulfosucciniate, sodium stearate, potassium oleate, sodium dioctyl sulfosuccinate, sodium polyoxyethylene alkyl ether sulfate, sodium polyoxyethylene alkyl phenyl ether sulfate, sodium dialkyl sulfosuccinate, sodium oleate, and sodium t-octylphenoxy ethoxy polyethoxy ethyl sulfate. One kind or two or more kinds thereof can be selected.

Specific example of the nonionic surfactant include, for example, an acetylene diol derivative such as an ethylene oxide adduct of acetylene diol, polyoxyethylene lauryl ether, polyoxyethylene octyl phenyl ether, polyoxyethylene oleyl phenyl ether, polyoxyethylene nonyl phenyl ether, an oxyethylene-oxypropylene block copolymer, t-octylphenoxyethyl polyethoxyethanol, and nonylphenoxyethyl polyethoxyethanol. One kind or two or more kinds of these can be selected.

Examples of the cationic surfactant include a tetraalkylammonium salt, an alkylamine salt, a benzalkonium salt, an alkylpyridium salt, and an imidazolium salt. Specific examples include dihydroxyethylstearylamine, 2-heptadecenylhydroxyethylimidazoline, lauryldimethylbenzylammonium chloride, cetylpyridinium chloride, and stearamidomethylpyridium chloride.

Among these surfactants, nonionic surfactants are preferred in view of stability, and an acetylene diol derivative is more preferred.

In the case of using the aqueous ink composition of the invention in an inkjet recording method, from the viewpoint of ink jettability, it is preferable to adjust the amount of the surfactant so as to obtain a surface tension of the aqueous ink composition of 20 to 60 mN/m, more preferably 20 to 45 mN/m, and even more preferably 25 to 40 mN/m.

The surface tension of the aqueous ink composition is measured using an automatic surface tensiometer, CBVP-Z (manufactured by Kyowa Interface Science Co., Ltd.), at a temperature of 25° C.

The content of the surfactant in the aqueous ink composition is preferably an amount with which the surface tension of the aqueous ink composition can be adjusted to the range described above. More specifically, the content of the surfactant in the aqueous ink composition is preferably 0.1% by mass or more, more preferably 0.1% to 10% by mass, and even more preferably 0.2% to 3% by mass.

<Other Components>

The aqueous ink composition of the invention may further have incorporated therein, if necessary, additives such as an anti-drying agent (swelling agent), a coloration preventing agent, a penetration enhancer, an ultraviolet absorber, a preservative, a rust inhibitor, an anti-foaming agent, a viscosity modifier, a pH adjusting agent, and a chelating agent. The mixing method is not particularly limited, and the aqueous ink composition of the invention can be obtained by selecting any conventionally used mixing method as appropriate.

<Physical Properties of Aqueous Ink Composition>

The viscosity at 30° C. of the aqueous ink composition of the invention is preferably from 1.2 mPa·s to 15.0 mPa·s, more preferably 2 mPa·s or more and less than 13 mPa·s, and even more preferably 2.5 mPa·s or more and less than 10 mPa·s.

The viscosity of the aqueous ink composition is measured using a VISCOMETER TV-22 (manufactured by Toki Sangyo Co., Ltd.) at a temperature of 30° C.

The pH of the aqueous ink composition of the invention is preferably such that the pH at 25° C. is 6 to 11, from the viewpoint of dispersion stability. In a case in which the ink set that will be described below is prepared, since it is preferable that the ink composition aggregates rapidly as a result of contact with a treatment agent, a pH of 7 to 10 at 25° C. is more preferred, and a pH of 7 to 9 is even more preferred.

[Ink Set]

The ink set of the invention includes at least a part including the aqueous ink composition (containing a pigment) of the invention, and a treatment agent that aggregates the ink composition when brought into contact with the ink composition. The ink set of the invention may also include a maintenance liquid that is used to remove any aqueous ink composition adhered to an inkjet recording head (for example, solid ink residue that has been solidified by drying).

By forming an image using the aqueous ink composition of the invention and the treatment agent, an image having satisfactory image quality, high curing sensitivity, and excellent blocking resistance can be formed.

In the following description, the treatment agent that constitutes the ink set will be explained.

<Treatment Agent>

The treatment agent that constitutes the ink set of the invention contains an aggregation-inducing component (also briefly referred to as "aggregation component") that causes aggregation of the ink composition of the invention when brought into contact with the ink composition. This aggregation component may be a component selected from an acidic compound, a polyvalent metal salt, and a cationic polymer, and it is preferable that the aggregation component is an acidic compound. The treatment agent may also include other components as necessary, in addition to the aggregation component.

The treatment agent that constitutes the ink set of the invention is usually in the form of an aqueous solution.

—Acidic Compound—

An acidic compound is capable of aggregating (immobilizing) the aqueous ink composition by being brought into contact with the aqueous ink composition on a recording medium, and thus functions as an immobilizing agent. For example, as the aqueous ink composition is jetted onto a recording medium (preferably, coated paper) in a state in which a treatment agent including an acidic compound has been applied onto this recording medium, the aqueous ink composition can be caused to aggregate, and thus the aqueous ink composition can be immobilized on the recording medium.

Examples of the acidic compound include sulfuric acid, hydrochloric acid, nitric acid, phosphoric acid, polyacrylic acid, acetic acid, glycolic acid, malonic acid, malic acid, maleic acid, ascorbic acid, succinic acid, glutaric acid, fumaric acid, citric acid, tartaric acid, lactic acid, sulfonic acid, orthophosphoric acid, metaphosphoric acid, pyrrolidone carboxylic acid, pyrone carboxylic acid, pyrrole carboxylic acid, furan carboxylic acid, pyridine carboxylic acid, coumaric acid, thiophene carboxylic acid, nicotinic acid, oxalic acid, and benzoic acid. From the viewpoint of achieving a balance between the suppression of volatilization and the solubility in a solvent, the acidic compound is preferably an acid having a molecular weight of from 35 to 1,000, more preferably an acid having a molecular weight of from 50 to 500, and particularly preferably an acid having a molecular weight of from 50 to 200. Also, regarding pKa (in $H_2O$, 25° C.), from the viewpoint of achieving a balance between the prevention of ink bleeding and the photocuring properties, an acid having a pKa of from −10 to 7 is preferred, an acid having a pKa of from 1 to 7 is more preferred, and an acid having a pKa of from 1 to 5 is particularly preferred.

Regarding the pKa, the calculated values obtained based on Advanced Chemistry Development (ACD/Labs) Software V11.02 (1994-2014 ACD/Labs), or the values described in the literature (for example, J. Phys. Chem. A, 2011, 115, 6641-6645) can be used.

Among these, an acidic compound having high water-solubility is preferred. From the viewpoint of reacting with the ink composition and immobilizing the entire ink, a trivalent or lower-valent acidic compound is preferred, and a divalent or trivalent acidic compound is particularly preferred.

Regarding the treatment agent, the acidic compounds may be used singly, or two or more kinds thereof may be used in combination.

In a case in which the treatment agent is an aqueous solution including an acidic compound, the pH (25° C.) of the treatment agent is preferably 0.1 to 6.8, more preferably 0.1 to 6.0, and even more preferably 0.1 to 5.0.

In a case in which the treatment agent includes an acidic compound as an aggregation component, the content of the acidic compound in the treatment agent is preferably 40% by mass or less, more preferably 15% to 40% by mass, even more preferably 15% to 35% by mass, and particularly preferably 20% to 30% by mass. By adjusting the content of the acidic compound in the treatment agent to be 15% to 40% by mass, the components in the ink composition can be immobilized more efficiently.

In a case in which the treatment agent includes an acidic compound as an aggregation component, the amount of application of the treatment agent to the recording medium is not particularly limited as long as it is an amount sufficient for aggregating the ink composition; however, from the viewpoint that the ink composition can be easily immobilized, it is preferable to apply the treatment agent such that the amount of application of the acidic compound will be 0.5 $g/m^2$ to 4.0 $g/m^2$, and it is more preferable to apply the treatment agent such that the amount of application will be 0.9 $g/m^2$ to 3.75 $g/m^2$.

—Polyvalent Metal Salt—

Regarding the treatment agent, an embodiment of including one kind or two or more kinds of polyvalent metal salts as the aggregation component is also preferable. By incorporating a polyvalent metal salt as an aggregation component, high-speed aggregating properties can be enhanced. Examples of the polyvalent metal salt include salts of the Group 2 alkaline earth metals in the Periodic Table (for example, magnesium and calcium), salts of the Group 3 transition metals in the Periodic Table (for example, lanthanum), salts of the Group 13 cations in the Periodic Table (for example, aluminum), and salts of lanthanides (for example, neodymium). As the salts of a metal, carboxylate (formate, acetate, benzoate, or the like), nitrate, chloride, and thiocyanate are suitable. Among them, preferred examples include calcium salt or magnesium salt of a carboxylic acid (formic acid, acetic acid, benzoic acid, or the like), calcium salt or magnesium salt of nitric acid, calcium chloride, magnesium chloride, and calcium salt or magnesium salt of thiocyanic acid.

In a case in which the treatment agent includes a polyvalent metal salt as the aggregation component, the content of the polyvalent metal salt in the treatment agent is preferably 1% to 10% by mass, more preferably 1.5% to 7% by mass, and even more preferably in the range of 2% to 6% by mass, from the viewpoint of the aggregating effect.

—Cationic Polymer—

It is also preferable that the treatment agent includes one kind or two or more kinds of cationic polymers as the aggregation component. Regarding the cationic polymer, a homopolymer of a cationic monomer having a primary to tertiary amino group or a quaternary ammonium salt group as a cationic group, or a product obtainable as a copolymer or a polycondensation reaction product of this cationic monomer and a non-cationic monomer is preferred. The cationic polymer may be used in the form of any one of a water-soluble polymer and water-dispersible latex particles.

Specific preferred examples of the cationic polymer include cationic polymers such as poly(vinylpyrridine) salt, polyalkylaminoethyl acrylate, polyalkylaminoethyl methacrylate, poly(vinylimidazole), polyethyleneimine, polybiguanide, polyguanide, and polyallylamine and derivatives thereof.

Regarding the weight-average molecular weight of the cationic polymer, a polymer having a small molecular weight is preferred from the viewpoint of the viscosity of the treatment agent. In a case in which the treatment agent is applied onto a recording medium by an inkjet method, the weight-average molecular weight is preferably in the range of 1,000 to 500,000, more preferably in the range of 1,500 to 200,000, and even more preferably in the range of 2,000 to 100,000. In a case in which the weight-average molecular weight is 1,000 or more, it is advantageous from the viewpoint of the rate of aggregation, and in a case in which the weight-average molecular weight is 500,000 or less, it is advantageous in view of jetting reliability. However, exceptions are made in a case in which the treatment agent is applied onto a recording medium by a method other than an inkjet method.

In a case in which the treatment agent includes a cationic polymer as the aggregation component, the content of the cationic polymer in the treatment agent is preferably 1% to 50% by mass, more preferably 2% to 30% by mass, and even more preferably in the range of 2% to 20% by mass, from the viewpoint of the aggregating effect.

[Image Forming Method]

The image forming method of the invention is a method of forming an image using the aqueous ink composition of the invention that contains a pigment.

The image forming method of the invention preferably includes a treatment agent applying step of applying the treatment agent onto a recording medium; and an ink applying step of applying the aqueous ink composition of the invention containing a pigment onto the recording medium received after the treatment agent applying step, and thus forming an image.

<Recording Medium>

There are no particular limitations on the recording medium that is used for the image forming method of the invention; however, a paper medium is preferred. That is, general printing paper containing cellulose as a main ingredient, such as so-called high-quality paper, coated paper, or art paper, which is used for general offset printing or the like, can be used.

Regarding the recording medium, recording media that are generally sold in the market can be used, and examples thereof include high-quality paper (A) such as "OK PRINCE HIGH-QUALITY" manufactured by Oji Paper Co., Ltd.; "SHIRAOI" manufactured by Nippon Paper Industries Co., Ltd., and "NEW NPI HIGH-QUALITY" manufactured by Nippon Paper Industries Co., Ltd.; high-quality coated paper such as "SILVER DIA" manufactured by Nippon Paper Industries Co., Ltd.; lightly-coated paper such as "OK EVERLIGHT COAT" manufactured by Oji Paper Co., Ltd., and "AURORA S" manufactured by Nippon Paper Industries Co., Ltd.; lightweight coated paper (A3) such as "OK COAT L" manufactured by Oji Paper Co., Ltd., and "AURORA L" manufactured by Nippon Paper Industries Co., Ltd.; coated paper (A2, B2) such as "OK TOPCOAT+" manufactured by Oji Paper Co., Ltd., and "AURORA COAT" manufactured by Nippon Paper Industries Co., Ltd.; and art paper (A1) such as "OK KINFUJI+" manufactured by Oji Paper Co., Ltd., and "TOKUBISHI ART" manufactured by Mitsubishi Paper Mills, Ltd. Various papers exclusive for use in photography for inkjet recording can also be used.

Among the recording media, so-called coated paper used for general offset printing or the like is preferred. Coated paper is a product obtained by providing a coating layer by applying a coating material on the surface of high-quality paper or alkaline paper, which contains cellulose as a main ingredient and generally has not been surface-treated. On the occasion of forming an image by conventional aqueous inkjetting, coated paper is likely to cause a problem with the image quality, such as gloss and abrasion resistance; however, in a case in which the ink composition or ink set described above is used, gloss unevenness is suppressed, and an image having satisfactory glossiness and scratch resistance can be obtained. It is particularly preferable to use coated paper having base paper and a coating layer containing kaolin and/or heavy calcium bicarbonate. More specifically, art paper, coated paper, lightweight coated paper, or lightly-coated paper is more preferred.

Above all, from the viewpoint of obtaining a superior effect of suppressing the migration of coloring materials, and obtaining high-quality images having color density and color that are superior to the conventional cases, the water absorption coefficient Ka of the recording medium is preferably 0.05 to 0.5 $mL/m^2 \cdot ms^{1/2}$, more preferably 0.1 to 0.4 $mL/m^2 \cdot ms^{1/2}$, and even more preferably 0.2 to 0.3 $mL/m^2 \cdot ms^{1/2}$.

The water absorption coefficient Ka has the same meaning as described in JAPAN TAPPI paper pulp test method No. 51:2000 (published by the Technical Association of the Pulp and Paper Industry), and specifically, the coefficient of water absorption Ka is calculated from the transfer amount of water under the conditions of a contact time of 100 ms and a contact time of 900 ms measured using an automatic scanning liquid absorptometer, KM500Win (manufactured by Kumagai Riki Kogyo Co., Ltd.).

<Treatment Agent Applying Step>

In the treatment agent applying step, the treatment agent included in the ink set is applied onto a recording medium. The treatment agent is usually applied onto the recording medium in the form of an aqueous solution. Regarding the application of the treatment agent onto the recording medium, any known liquid applying method can be used without any particular limitations, and any arbitrary method such as spray coating, coating with a coating roller or the like, application by an inkjet method, or immersion can be selected.

Specific examples include size press methods represented by a horizontal size press method, a roll coater method, and a calender size press method; size press methods represented by an air knife coater method; knife coater methods represented by an air knife coater method; roll coater methods represented by a transfer roll coater method such as a gate roll coater method, a direct roll coater method, a reverse roll coater method, and a squeeze roll coater method; a building blade coater method, a short dwell coater method; blade coater methods represented by a two stream coater method; bar coater methods represented by a rod bar coater method; bar coater methods represented by a rod bar coater method; a cast coater method; a gravure coater method; a curtain coater method; a die coater method; a brush coater method; and a transfer method.

A method of applying the treatment agent by controlling the amount of application by using a coating apparatus equipped with a liquid amount restriction member, such as the coating apparatus described in JP1998-230201A (JP-H10-230201A), may also be employed.

The region onto which the treatment agent is applied may be entire surface application of applying the treatment agent over the entire recording medium, or may be partial application of partially applying the treatment agent onto regions where ink will be applied in the ink applying step. According to the invention, from the viewpoint of uniformly adjusting the amount of application of the treatment liquid, homogeneously recording fine lines or fine image areas, and suppressing density unevenness such as image unevenness, entire surface application of applying the treatment agent over the entire image forming surface of the recording medium through coating using a coating roller or the like, is preferred.

Regarding a method of coating by controlling the amount of application of the treatment agent to the range described above, for example, a method of using an anilox roller may be used. An anilox roller is a roller in which the roller surface is coated with ceramic by thermal spraying and processed with a laser, such that shapes such as pyramidal shapes, diagonal lines, tortoiseshell shapes are formed thereon. In a case in which the treatment liquid infiltrates into the recess portions formed on this roller surface and is brought into contact with the paper surface, the treatment liquid is transferred and is applied in a coating amount that has been controlled by the recesses of the anilox roller.

<Ink Applying Step>

In the ink applying step, the aqueous ink composition included in the ink set is applied onto the recording medium. Regarding the method of applying the aqueous ink composition, there are no particular limitations as long as it is a method capable of applying the aqueous ink composition onto an image, and any known ink applying method can be used. For example, a method of applying an aqueous ink composition onto a recording medium using means such as an inkjet method, a mimeographic method, or a transfer printing method, may be mentioned. Above all, from the viewpoints of compactization of the recording apparatus and high-speed recording properties, a step of applying the aqueous ink composition by an inkjet method is preferred.

In regard to image formation by an inkjet method, the aqueous ink composition is jetted onto the recording medium by supplying energy, and thus a colored image is formed. As an inkjet recording method that is preferable for the invention, the method described in paragraphs 0093 to 0105 of JP2003-306623A is applicable.

There are no particular limitations on the inkjet method, and the inkjet method may be any known method, for example, an electric charge control method in which ink is jetted by utilizing the electrostatic attraction force; a drop-on-demand method (pressure pulse method) in which the vibration pressure of a piezoelectric element is utilized; an acoustic inkjet method in which electric signals are converted into acoustic beams and irradiated onto ink, and the ink is jetted by utilizing the radiation pressure; or a thermal inkjet method in which air bubbles are formed by heating ink, and the pressure thus generated is utilized.

The inkjet head used in the inkjet method may be an on-demand method, or may be a continuous method. The ink nozzles and the like that are used in the case of performing recording by the inkjet method, are also not particularly limited and can be selected as appropriate according to the purpose.

The inkjet method includes a method of ejecting a large number of small-volume droplets of an ink having low density, which is so-called photo ink; a method of improving the image quality by using a plurality of inks that have substantially the same color but different densities; and a method of using a colorless and transparent ink.

The inkjet method also includes a shuttle method of using a short serial head, and performing recording while the head is caused to scan in the width direction of the recording medium; and a line method of using a line head in which recording elements are arranged correspondingly to the entire range of one side of a recording medium. In the line method, image recording can be carried out over the entire surface of a recording medium by scanning the recording medium in a direction orthogonally intersecting the direction of arrangement of the recording elements, and thus a transport system such as a carriage scanning a short head is not needed. Also, complicated control of scanning between the movement of the carriage and the recording medium is not needed, and since only the recording medium is moved, an increase in the recording speed can be realized compared to a shuttle method.

According to the invention, there are no particular limitations on the order of implementation of the treatment agent applying step and the ink applying step; however, from the viewpoint of image quality, an embodiment in which the ink applying step follows the acid treatment agent applying step is preferred. That is, it is preferable that the ink applying step is a step of applying the aqueous ink composition of the invention onto a recording medium onto which the treatment agent has been applied.

In a case in which the ink applying step is carried out by an inkjet method, from the viewpoint of forming a high-definition print, the amount of liquid droplets of the aqueous ink composition jetted by the inkjet method is preferably 1.5 to 3.0 pL, and more preferably 1.5 to 2.5 pL. The amount of liquid droplets of the aqueous ink composition that is jetted can be regulated by appropriately adjusting the jetting conditions.

<Ink Drying Step>

If necessary, the image forming method of the invention may comprise an ink drying step of drying and removing the solvent (for example, water or the aqueous medium described above) in the aqueous ink composition that has been applied onto the recording medium. The ink drying step is not particularly limited as long as at least a portion of the solvent in the aqueous ink composition can be removed, and any generally used method is applicable.

<Thermal Fixing Step>

If necessary, it is preferable that the image forming method of the invention comprises a thermal fixing step after the ink drying step. Fixation of the image on the recording medium is achieved by applying a thermal fixing treatment, and the resistance of the image to abrasion can be further enhanced. As the thermal fixing step, for example, the thermal fixing step described in paragraphs <0112> to <0120> of JP2010-221415A can be employed.

<Ink Removing Step>

If necessary, the inkjet recording method of the invention may include an ink removing step of removing the aqueous ink composition adhering to the inkjet recording head (for example, solid ink residue that has been solidified by drying) using a maintenance liquid. Regarding the details of the maintenance liquid and the ink removing step, the maintenance liquid and the ink removing step described in WO2013/180074A can be preferably applied.

[Resin Microparticles]

The resin microparticles of the invention are resin microparticles that are used for the invention as described above. The resin microparticles of the invention can be typically obtained in the form of a reaction liquid obtainable in a case in which resin microparticles are prepared by the emulsion polymerization method described above; however, there are no particular limitations on the form. The resin microparticles of the invention can be suitably used in the aqueous ink composition of the invention.

In regard to the resin microparticles of the invention, Mw, Tg, and the particle size of the resin microparticles are the same as the Mw, Tg, and the particle size of the resin microparticles included in the aqueous ink composition of the invention, respectively.

It is preferable that the resin microparticles of the invention exist in a state of being dispersed in an aqueous medium, namely, water or a mixed liquid of water and a water-soluble organic solvent. Preferred embodiments of this aqueous medium are the same as the aqueous medium described above used in the aqueous ink composition of the invention.

In a case in which the resin microparticles of the invention exist in a state of being dispersed in an aqueous medium (in the case of existing as a resin microparticle dispersion), the content of the resin microparticles in this dispersion is preferably 1% to 50% by mass, and more preferably 20% to 40% by mass.

EXAMPLES

Hereinafter, the present invention will be specifically described by way of Examples; however, the invention is not intended to be limited to these Examples. Unless particularly stated otherwise, the units "parts" and "percent (%)" that indicate composition are on a mass basis.

[Production of Resin Microparticles]
<Production of Resin Microparticles B-01>

Into a 1-liter three-neck flask equipped with a stirrer, a thermometer, a reflux cooling pipe and a nitrogen gas inlet tube, water (250 g), 12-methacrylamidododecanoic acid (0.46 g), potassium hydrogen carbonate (0.17 g), and isopropanol (20 g) were introduced, and the temperature was increased to 85° C. under a nitrogen stream. A mixed solution including V-501 (radical polymerization initiator, manufactured by Wako Pure Chemical Industries, Ltd.) (0.11 g), potassium hydrogen carbonate (0.08 g), and water (9 g) was added thereto, and the mixture was stirred for 10 minutes. Next, a monomer solution including methyl methacrylate (60 g) and 2-ethylhexyl methacrylate (40 g) was added dropwise to the three-neck flask at a constant speed such that dropwise addition would be completed in 3 hours. A mixed solution including V-501 (0.06 g), potassium hydrogen carbonate (0.04 g), and water (6 g) was further added thereto in two divided portions, namely, immediately after the initiation of dropwise addition of the monomer solution, and 1.5 hours after the initiation of dropwise addition of the monomer solution. After completion of the dropwise addition of the monomer solution, the resulting mixture was stirred for one hour. Subsequently, a mixed solution including V-501 (0.06 g), potassium hydrogen carbonate (0.04 g), and water (6 g) was added to the reaction mixture thus obtained, and the resulting mixture was stirred for another 3 hours. The reaction mixture thus obtained was filtered through a mesh having a mesh size of 50 µm, and thus an aqueous dispersion of resin microparticles B-01 was obtained. The aqueous dispersion of resin microparticles B-01 thus obtained had a pH of 8.5, a concentration of solid contents of 25%, a volume average particle diameter of 120 nm (volume average particle diameter was measured with a MICROTRAC UPA EX-150 (manufactured by Nikkiso Co., Ltd.)), a weight-average molecular weight (Mw) of 300,000, and a Tg of 72° C. The resin microparticles B-01 thus obtained had a residue of V-501 (a polymerization initiator residue having a potassium salt of a carboxyl group, that is, a polymerization initiator residue that does not have a sulfo group) at the terminals of the resin. The physical properties of resin microparticles B-01 thus obtained are presented in the following tables.

The weight-average molecular weight was measured by GPC. More specifically, HLC-8220GPC (manufactured by Tosoh Corporation.) was used, and as columns, three columns of TSKGEL SUPER HZ2000, TSKGEL SUPER HZ4000, and TSKGEL SUPER HZ-H (all manufactured by Tosoh Corporation, 4.6 mm×15 cm) were connected in series, and THF (tetrahydrofuran) was used as an eluent. The sample concentration was 0.3% by mass, the flow rate was 0.35 ml/min, the sample injection amount was 10 µL, the measurement temperature was 40° C., and an IR detector was used as the detector. A calibration curve was produced from 6 samples of "Standard Sample TSK STANDARD, POLYSTYRENE": "F-80", "F-20", "F-4", "F-2", "A-5000", and "A-1000" manufactured by Tosoh Corporation.

The Tg was measured using a sample obtained by adding methanol and a 0.2 M aqueous solution of hydrochloric acid to the aqueous dispersion of resin microparticles, stirring the mixture, and filtering and drying a solid thus obtained, and using a differential scanning calorimeter (DSC), EXSTAR6220, manufactured by SII NanoTechnology, Inc., at a rate of temperature increase of 10° C./min.

The volume average particle diameter, the weight-average molecular weight, and Tg of the resin microparticles produced in the following Examples were also measured using the measuring devices and measuring methods described above.

The number for each constitutional unit of the resin that constitutes the resin microparticles B-01 shown below represents the mass ratio. The symbol "*" presented in each constitutional unit represents a linking site for being incorporated into the resin. The same also applies to the various structural formulae described below.

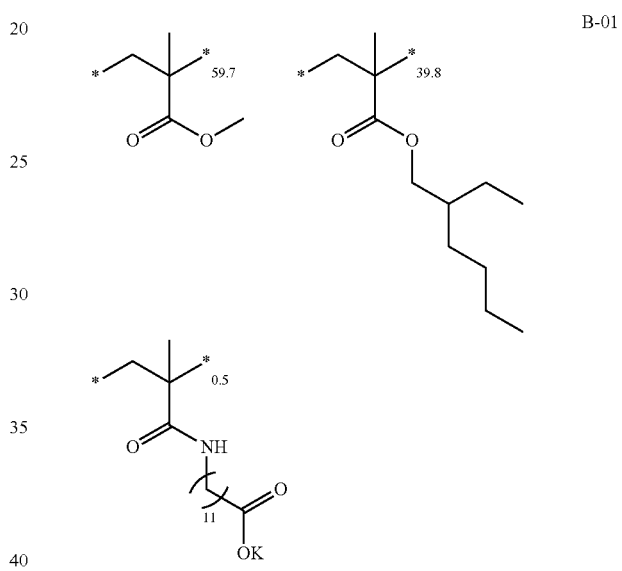

<Production of Resin Microparticles B-02 to B-32>

Aqueous dispersions of resin microparticles B-02 to B-32 were obtained in the same manner as in the production of resin microparticles B-01, except that the types and amounts of the monomers used in the production of the resin microparticles B-01 were changed to the types and amounts of the monomers from which the following structural units were derived. The physical properties of resin microparticles B-02 to B-32 thus obtained are presented in the following tables.

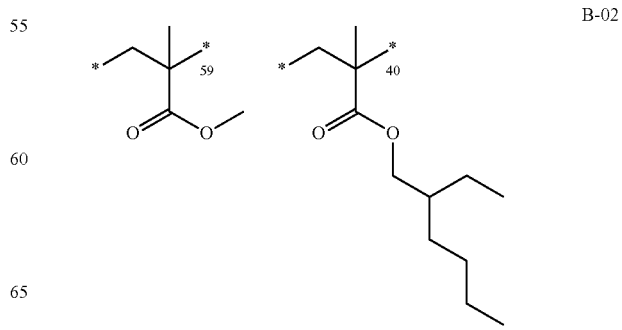

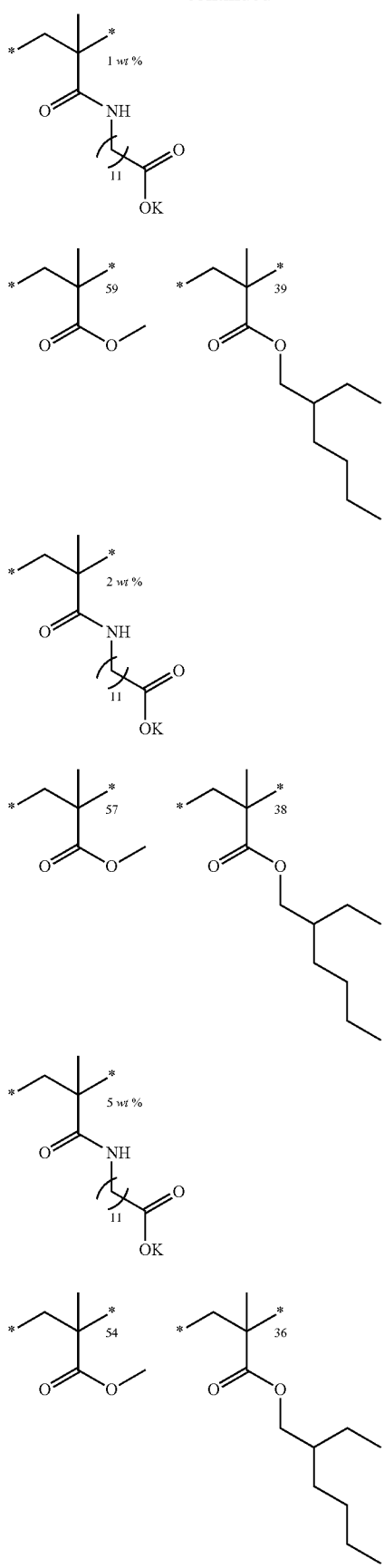
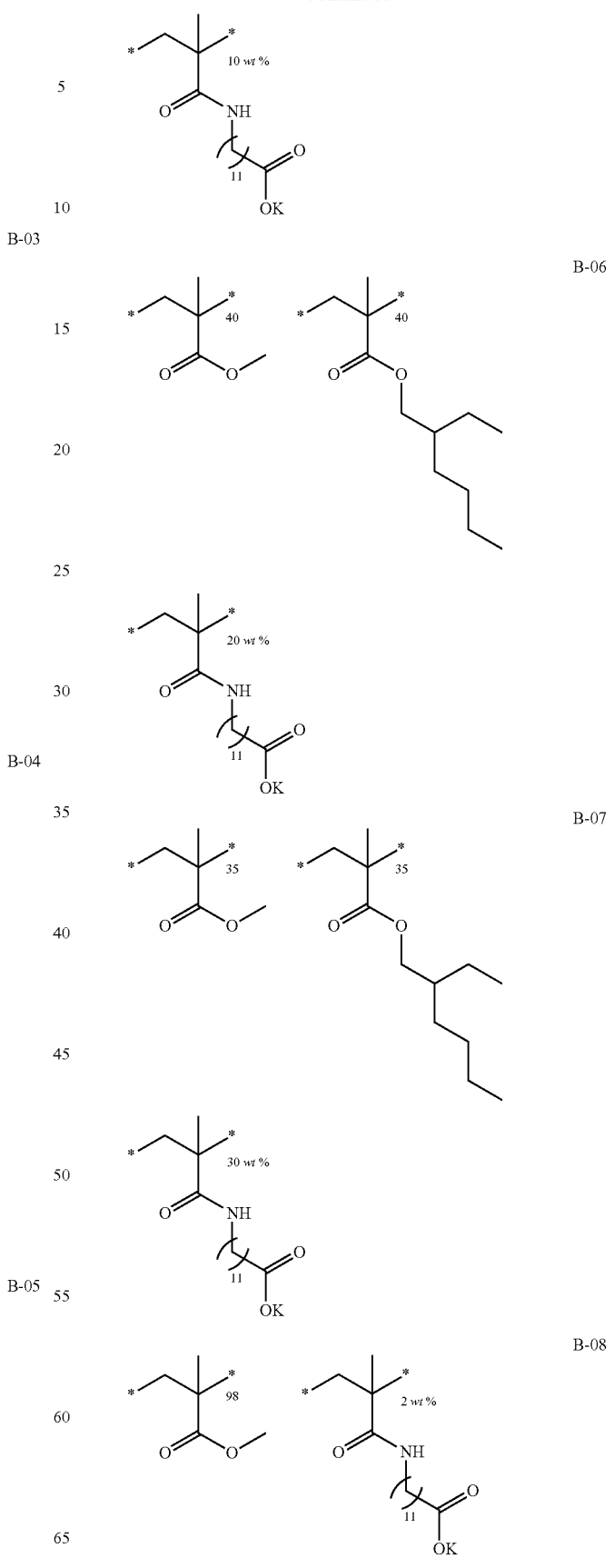

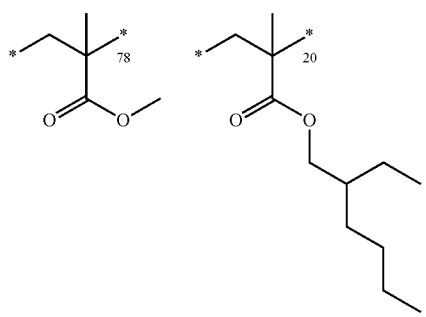
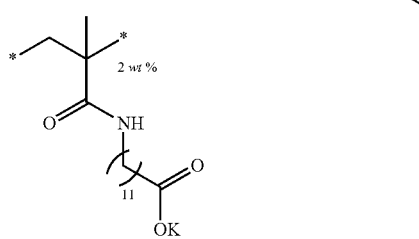
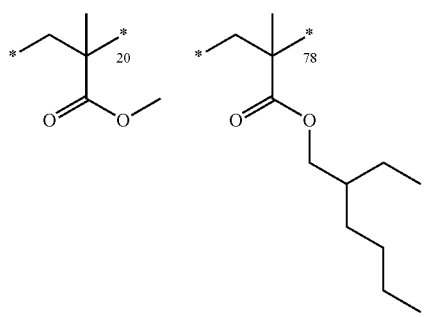
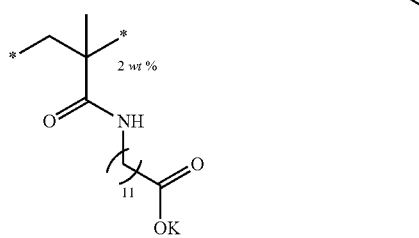
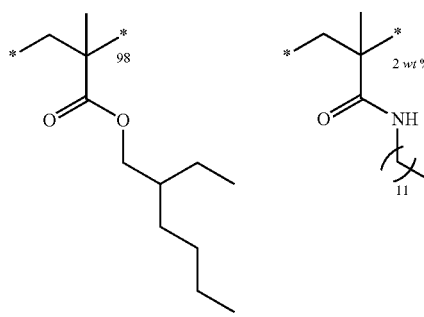
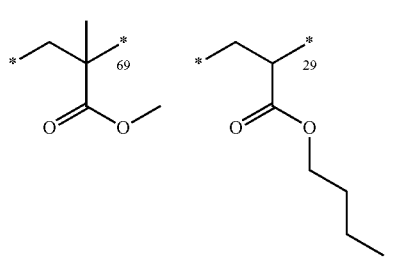
B-09
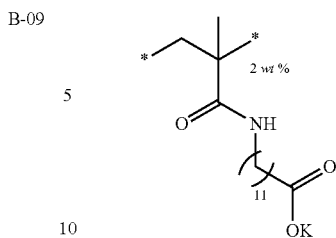
B-10
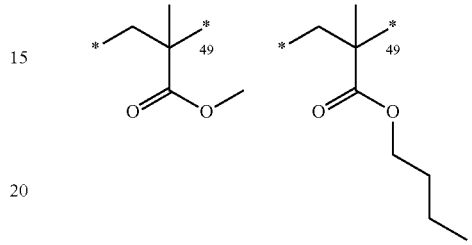
B-11
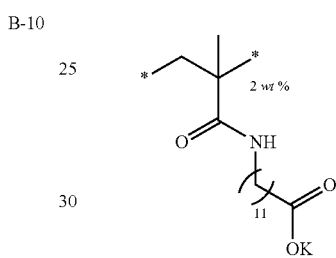
B-12
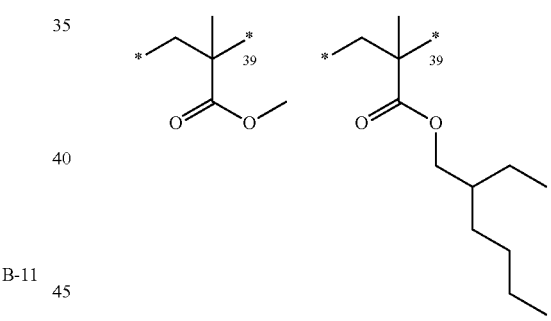
B-13
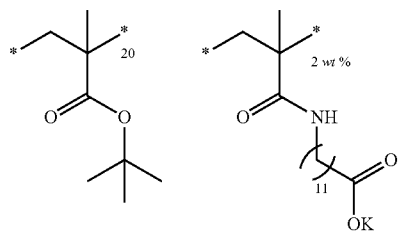
B-14
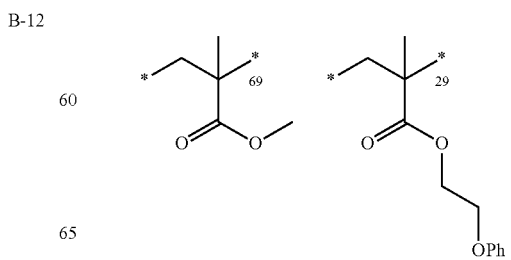
B-15

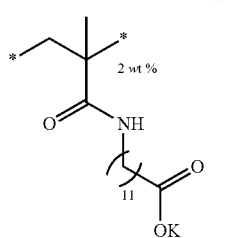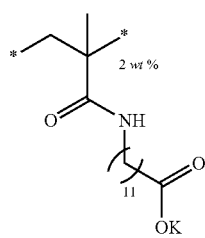
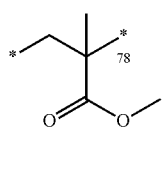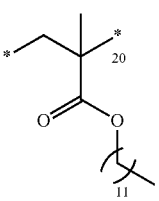
B-16
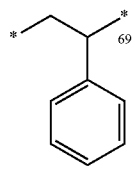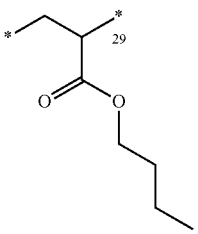
B-19
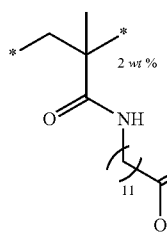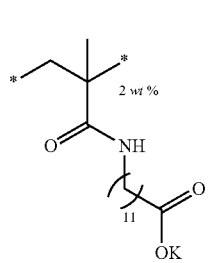
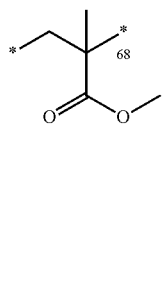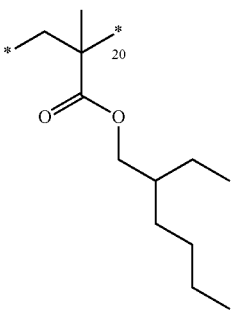
B-17
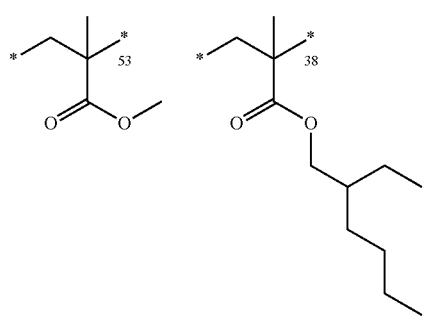
B-20
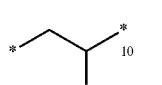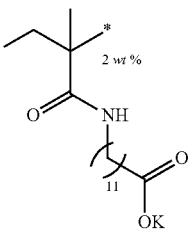
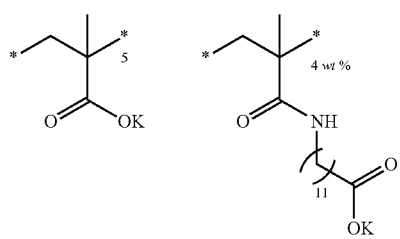
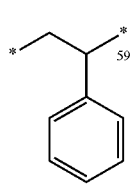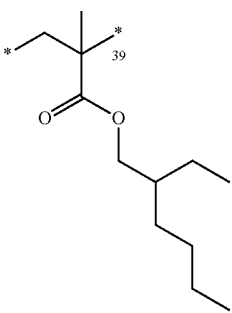
B-18
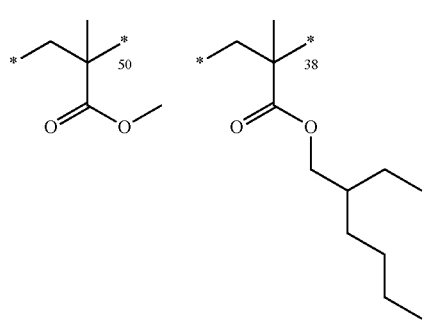
B-21

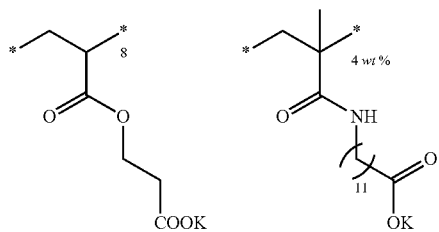
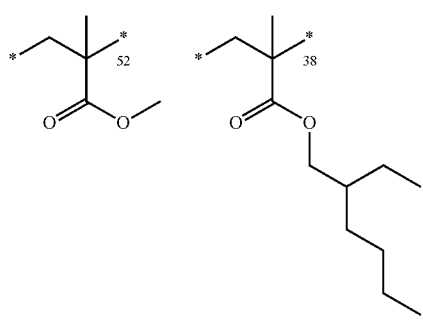
B-22
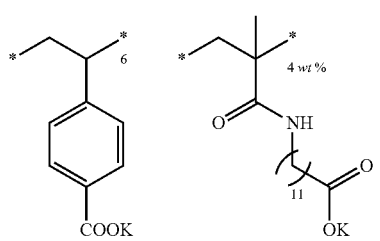
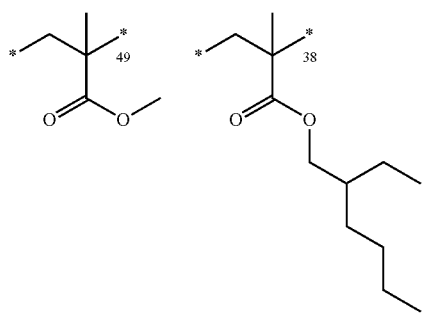
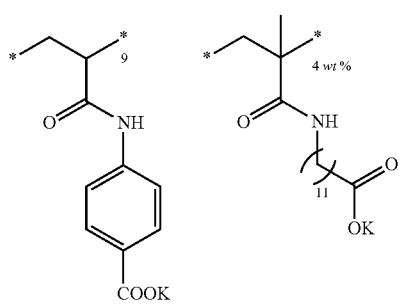
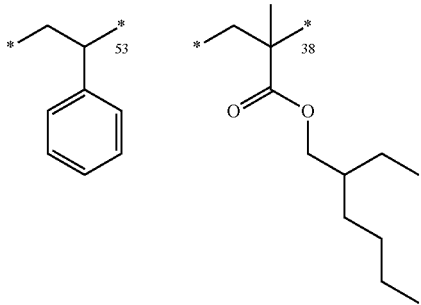
B-24
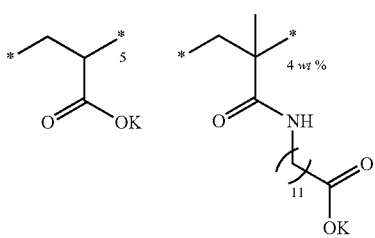
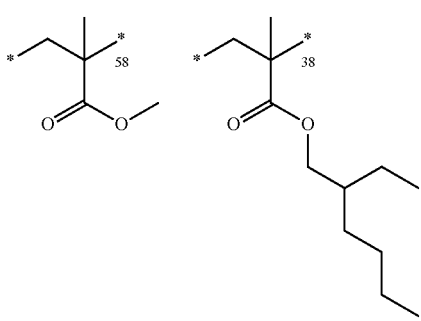
B-25
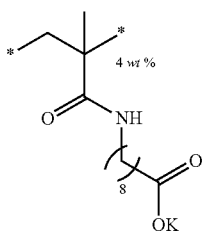
B-23
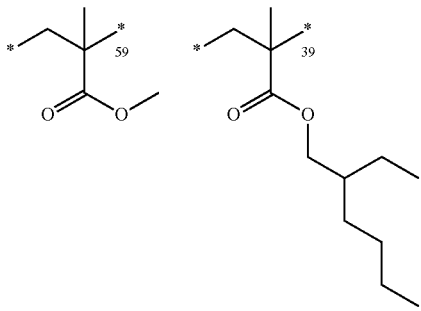
B-26
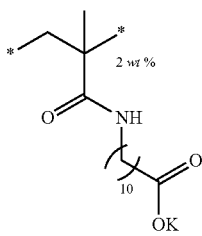

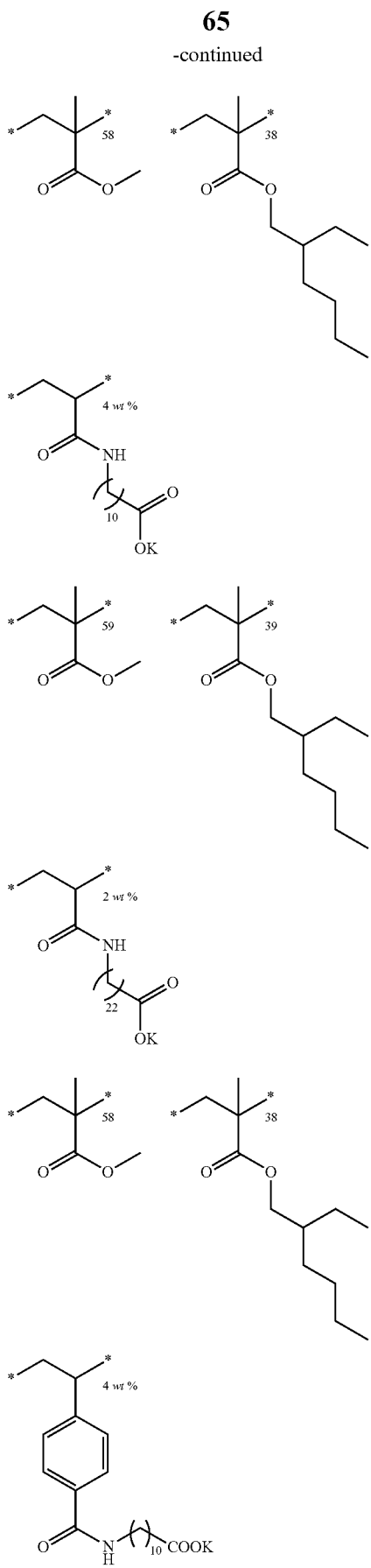
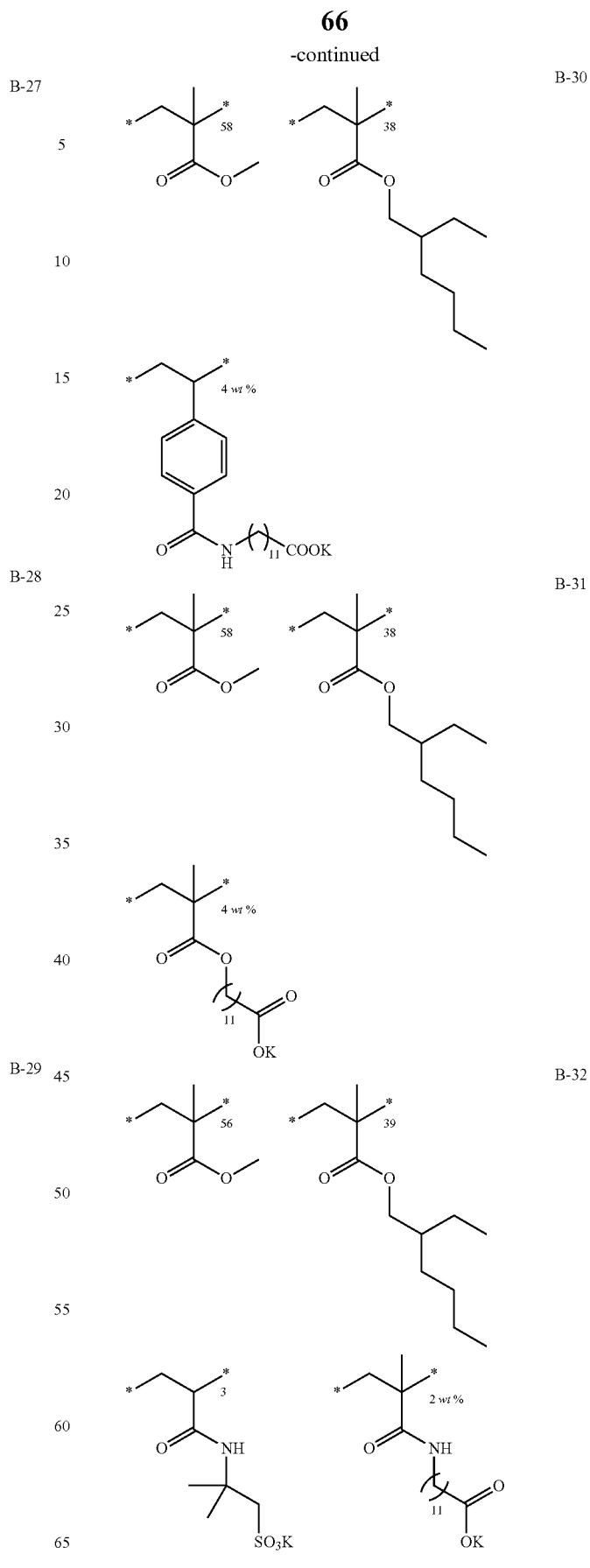

<Production of Resin Microparticles B-33>

An aqueous dispersion of resin microparticles B-33 was obtained in the same manner as in the production of resin microparticles B-01, except that the amounts of the monomers used in the production of the resin microparticles B-01 were changed to the amounts of the monomers from which the following structural units were derived, the polymerization initiator was changed from V-501 to KPS (potassium persulfate), and the amount of the polymerization initiator was adjusted. The resin microparticles B-33 thus obtained has a residue of KPS (polymerization initiator residue having a sulfo group) at the terminals of the resin. The physical properties of the resin microparticles B-33 thus obtained are presented in the following tables.

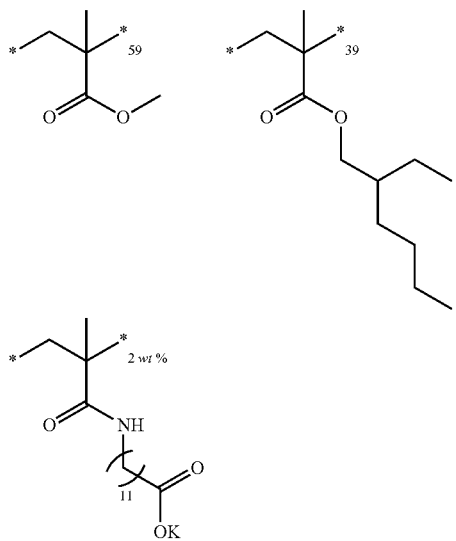

B-33

<Production of Resin Microparticles B-34 and B-35>

Aqueous dispersions of resin microparticles B-34 and B-35 were obtained in the same manner as in the production of resin microparticles B-01, except that the amounts of the monomers used in the production of the resin microparticles B-01 were changed to the amounts of the monomers from which the following structural units were derived, the amounts of the polymerization initiator V-501 and potassium hydrogen carbonate were adjusted as appropriate, and the molecular weight was controlled using mercaptopropionic acid. The physical properties of the resin microparticles B-34 and B-35 thus obtained are presented in the following tables.

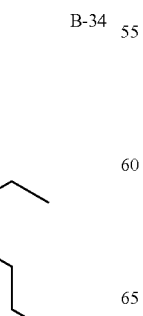

B-34

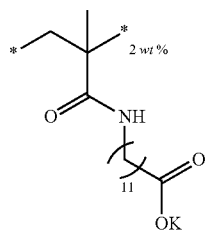

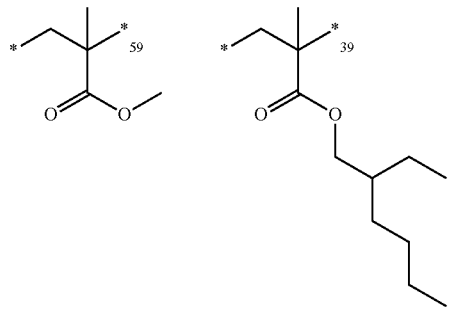

B-35

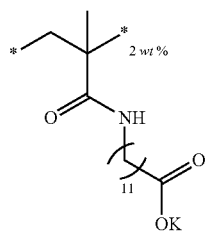

<Production of Resin Microparticles B-36 to B-39>

Aqueous dispersions of resin microparticles B-36 to B-39 were obtained in the same manner as in the production of the resin microparticles B-01, except that the amounts of the monomers used in the production of the resin microparticles B-01 were changed to the amounts of the monomers from which the following structural units were derived, and potassium hydrogen carbonate was changed to lithium hydroxide, sodium hydrogen carbonate, ammonia, or triethylamine in an amount equimolar to that of potassium hydrogen carbonate. The physical properties of the resin microparticles B-36 to B-39 thus obtained are presented in the following tables.

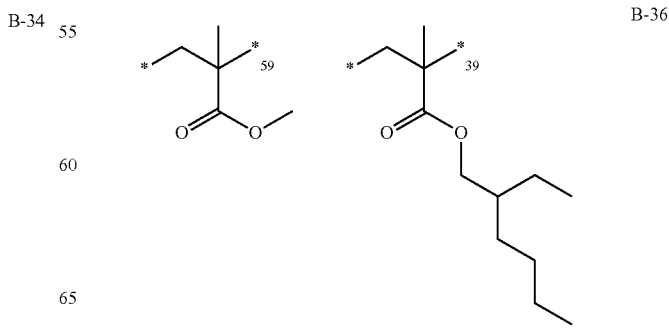

B-36

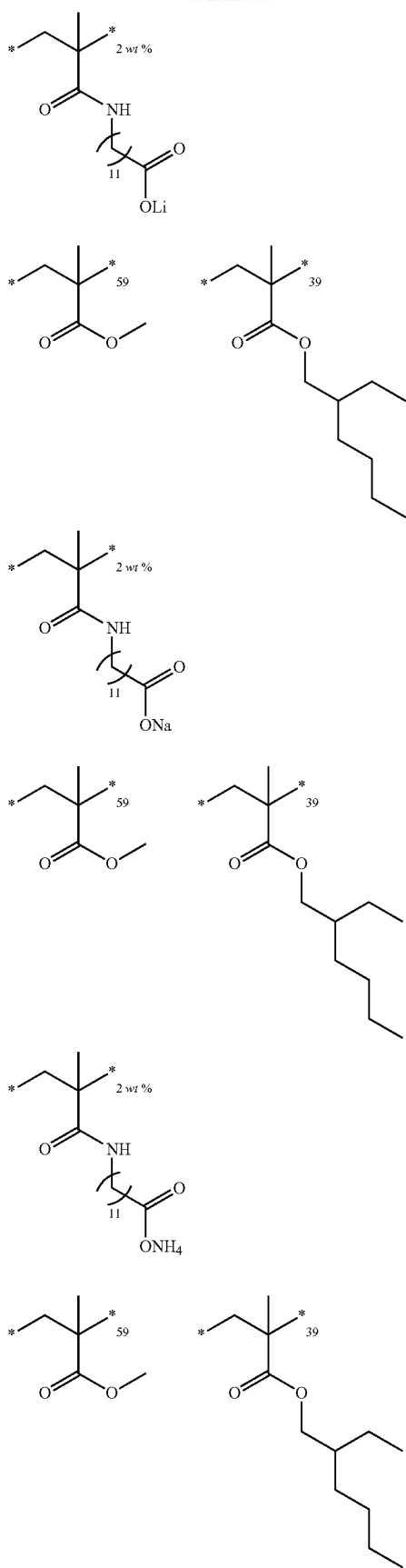

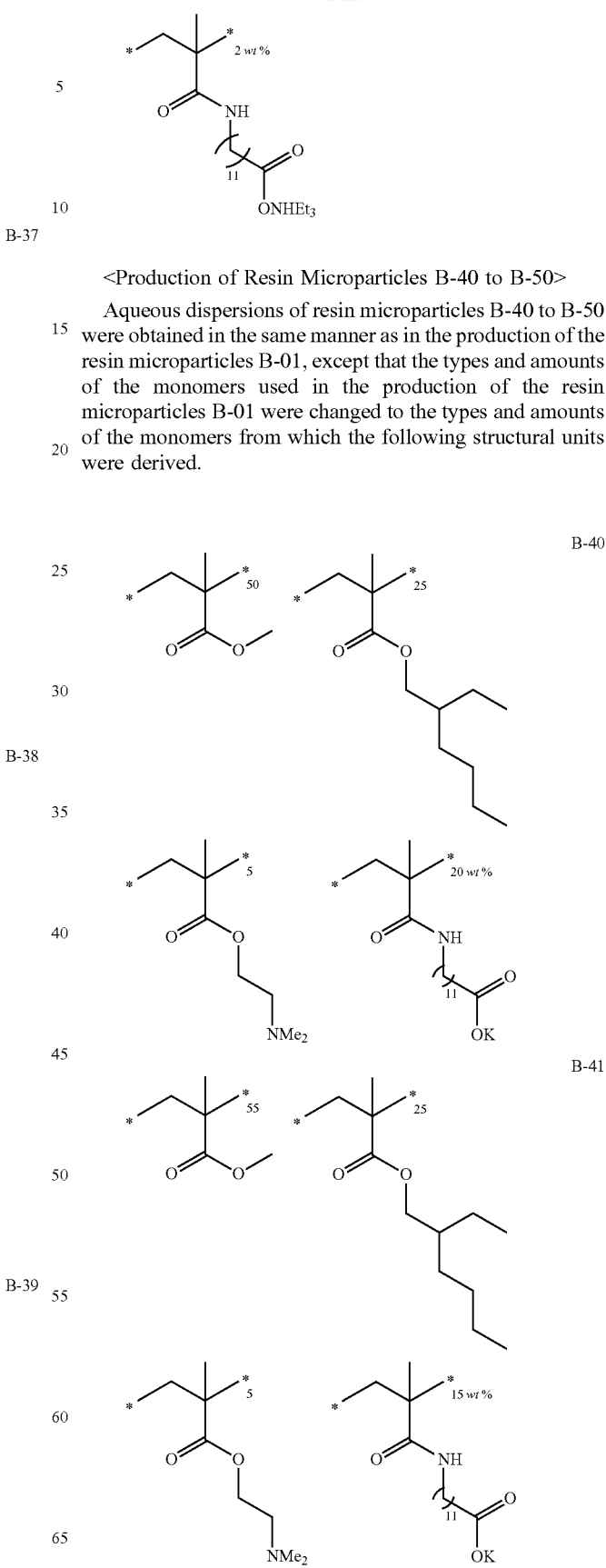

<Production of Resin Microparticles B-40 to B-50>

Aqueous dispersions of resin microparticles B-40 to B-50 were obtained in the same manner as in the production of the resin microparticles B-01, except that the types and amounts of the monomers used in the production of the resin microparticles B-01 were changed to the types and amounts of the monomers from which the following structural units were derived.

-continued
B-42
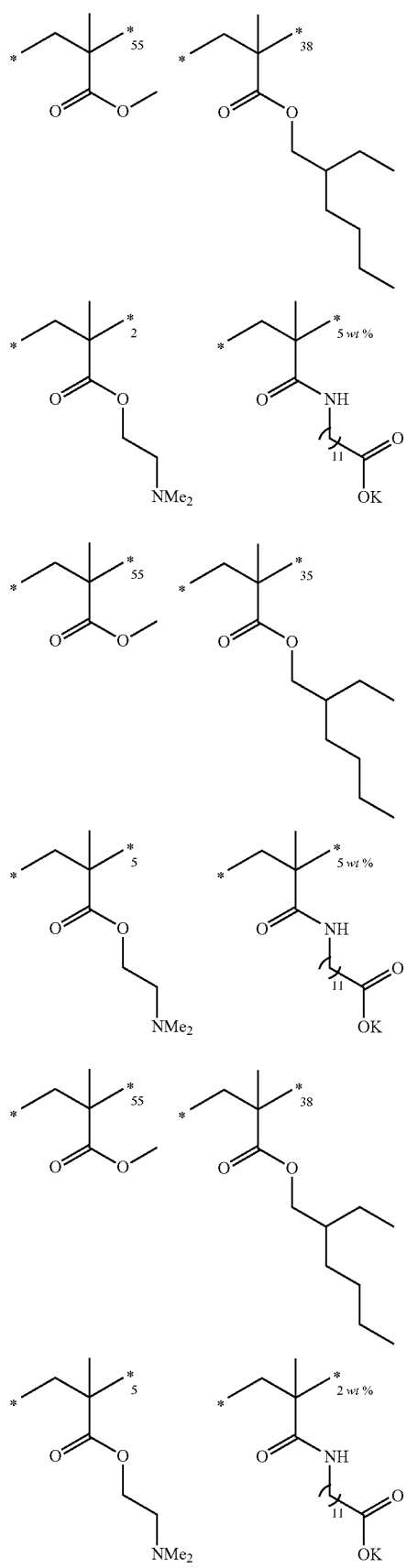
B-43
B-44
-continued
B-45
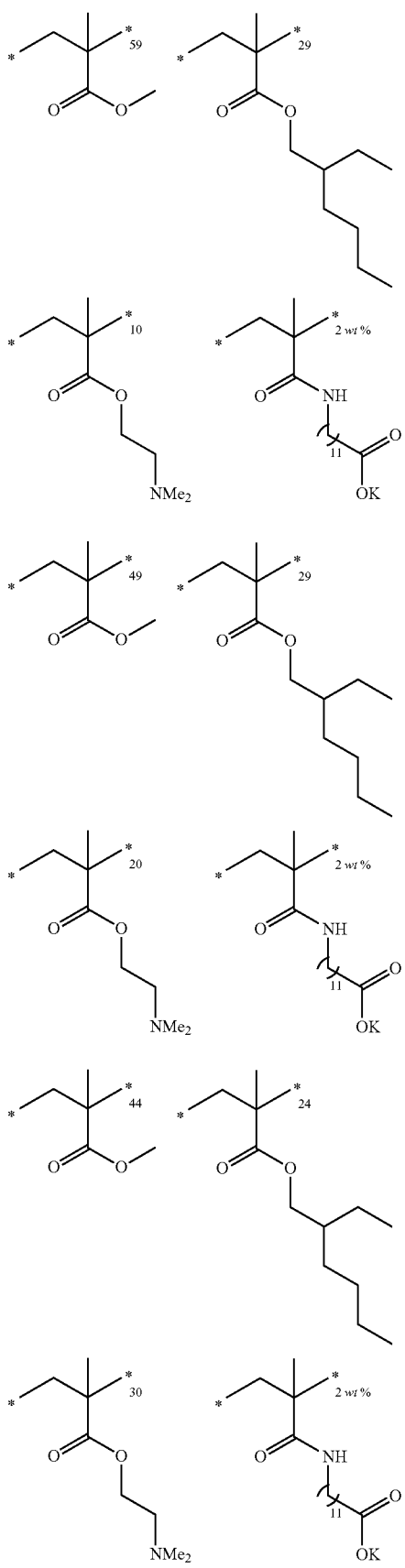
B-46
B-47

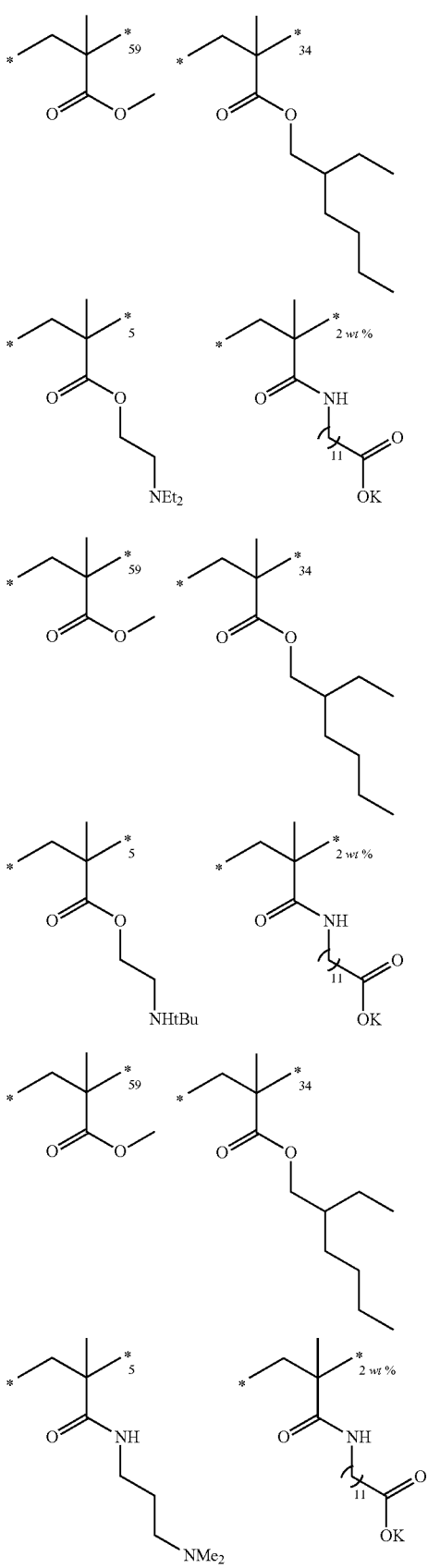

<Production of Resin Microparticles B-51>

An aqueous dispersion of resin microparticles B-51 were obtained in the same manner as in the production of the resin microparticles B-01, except that the types and amounts of the monomers used in the production of the resin microparticles B-01 were changed to the types and amounts of the monomers from which the following structural units were derived.

Here, BLEMMER PME-400 (trade name, manufactured by NOF Corporation, n=9) was used as a monomer having a polyoxyethylene structure.

<Production of Resin Microparticles B-52 to B-62>

Aqueous dispersions of resin microparticles B-52 to B-62 were obtained in the same manner as in the production of the resin microparticles B-51, except that the types and amounts of the monomers used in the production of the resin microparticles B-51 were changed to the types and amounts of the monomers from which the following structural units were derived.

Here, as a monomer having a polyoxyethylene structure, BLEMMER PME-400 (trade name, manufactured by NOF Corporation, n=9) was used in resin microparticles B-52 to B-59; BLEMMER PME-100 (trade name, manufactured by NOF Corporation, n=2) was used in resin microparticles B-60; BLEMMER PME-1000 (trade name, manufactured by NOF Corporation, n=23) was used in resin microparticles B-61; and BLEMMER 70PEP-350B (trade name, manufactured by NOF Corporation, n=5, m=2) was used in resin microparticles B-62. In regard to the monomer having a polyoxyethylene structure, n represents the average of the numbers of repetitions of the polyoxyethylene group, and m represents the average of the numbers of repetitions of the polyoxyalkylene group. n and m in the following structural units also have the same meanings as n and m described above, respectively.

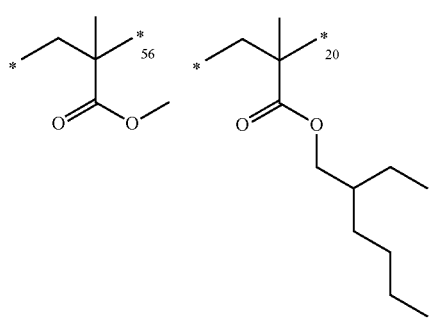
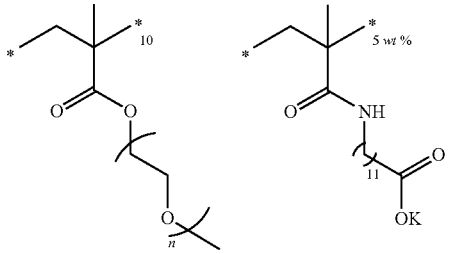
B-52
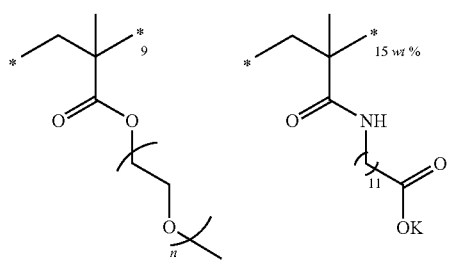
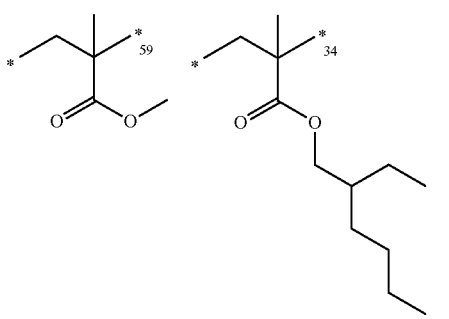
B-55
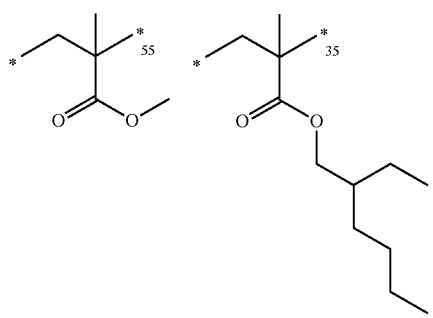
B-53
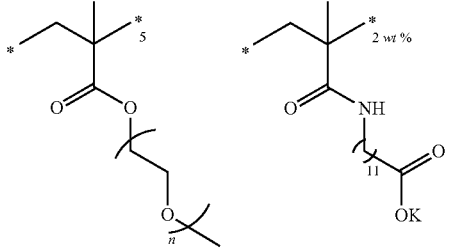
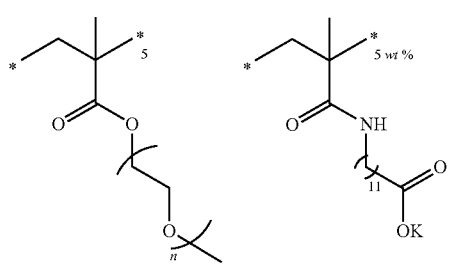
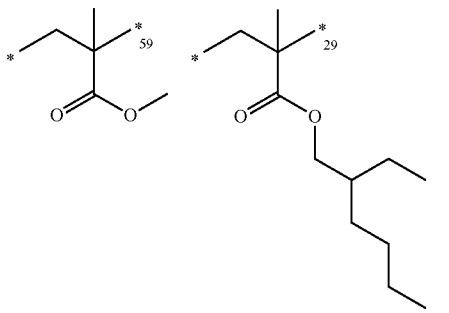
B-56
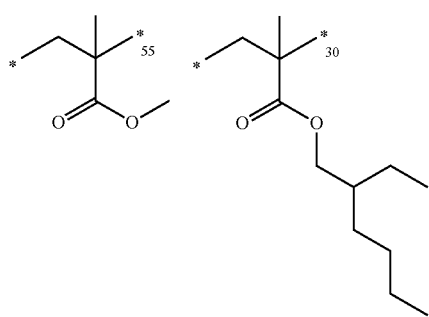
B-54
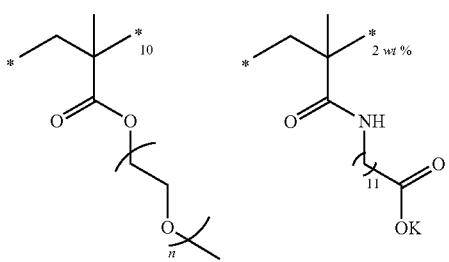

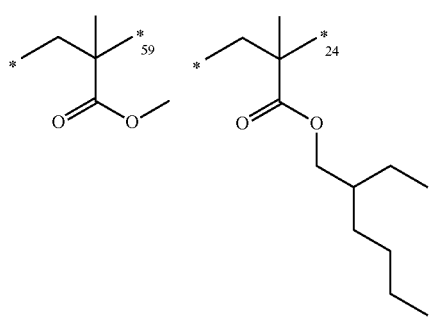
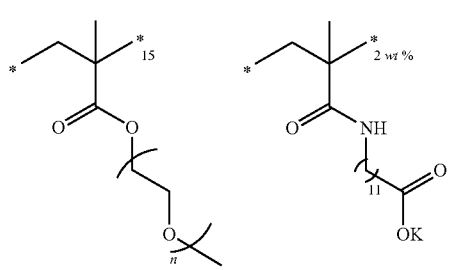
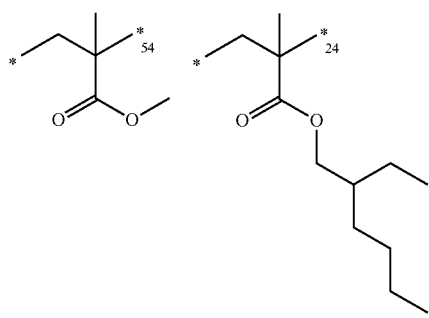
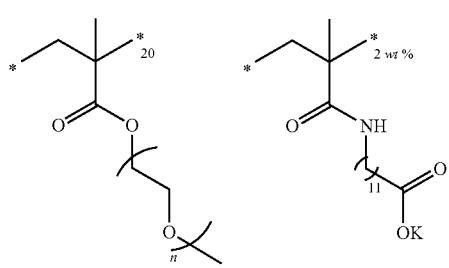
B-57
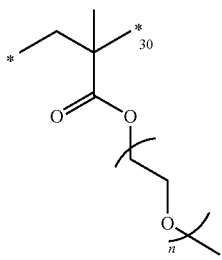
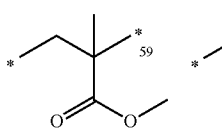
B-58
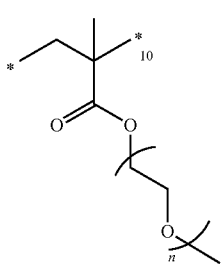
B-59
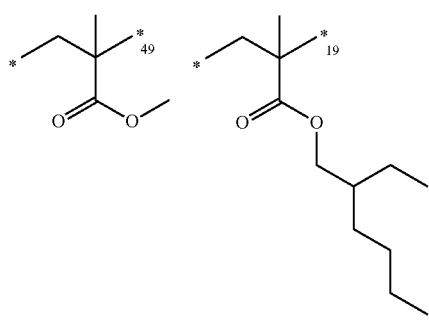
B-60
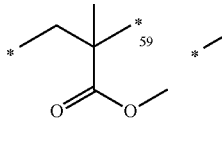
B-61
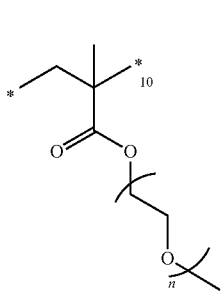

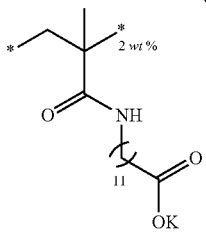

B-62

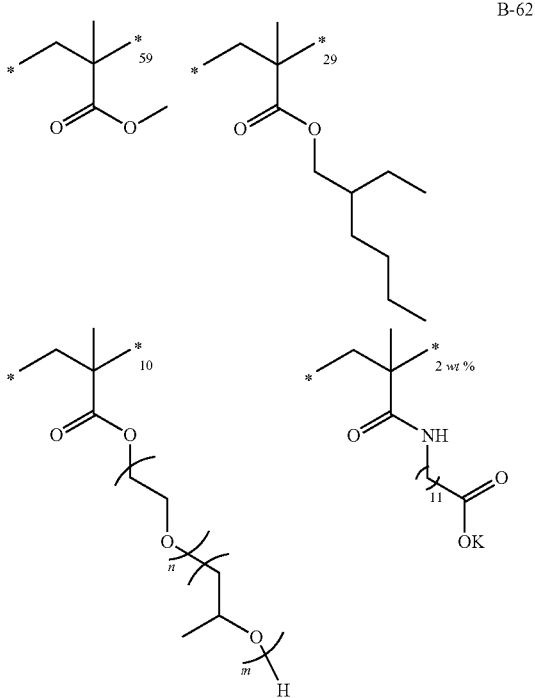

<Production of Resin Microparticles B-63 and B-64>

Aqueous dispersions of resin microparticles B-63 and B-64 were obtained in the same manner as in the production of the resin microparticles B-01, except that the types and amounts of the monomers used in the production of the resin microparticles B-01 were changed to the types and amounts of the monomers from which the following structural units were derived.

Here, as a monomer having a polyoxyethylene structure, BLEMMER PME-400 (trade name, manufactured by NOF Corporation, n=9) was used.

The physical properties of the resin microparticles B-40 to B-64 thus obtained are presented in the following Table 3.

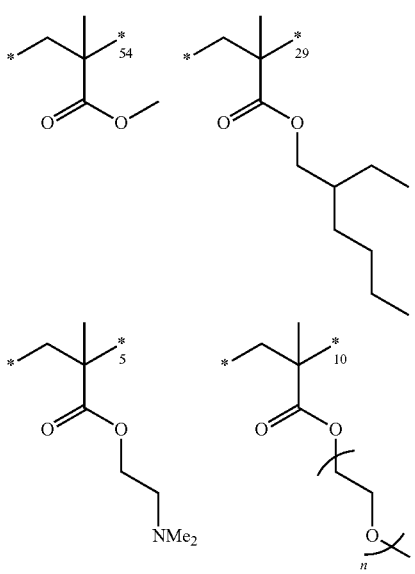

B-63

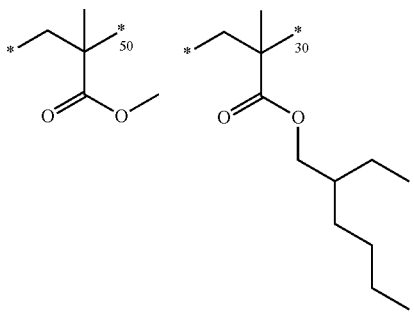

B-64

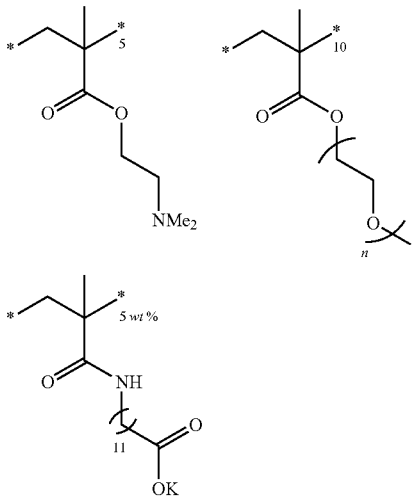

<Production of Resin Microparticles B-65>

Into a 1-liter three-neck flask equipped with a stirrer, a thermometer, a reflux cooling pipe and a nitrogen gas inlet tube, water (330 g), 12-methacrylamidododecanoic acid (3.68 g), and potassium hydrogen carbonate (1.35 g) were introduced, and the temperature was increased to 85° C. under a nitrogen stream. A mixed solution including V-501 (radical polymerization initiator, manufactured by Wako Pure Chemical Industries, Ltd.) (3.43 g), potassium hydrogen carbonate (2.57 g), and water (18 g) was added thereto, and the mixture was stirred for 10 minutes. Next, a monomer solution including methyl methacrylate (124 g), 2-ethylhexyl methacrylate (44 g), and styrene (32.0 g), and an aqueous solution including 12-methacrylamidododecanoic acid (11.04 g), potassium hydrogen carbonate (4.09 g), isopropyl alcohol (38.0 g) and water (210.0 g) were added dropwise to the three-neck flask at a constant speed such that dropwise addition would be completed in 3 hours. A mixed solution including V-501 (1.72 g), potassium hydrogen carbonate (1.28 g), and water (12 g) was further added thereto 1.5 hours after the initiation of dropwise addition of the monomer solution. After completion of the dropwise addition of the monomer solutions, the resulting mixture was stirred for one hour. Subsequently, a mixed solution including V-501 (1.72 g), potassium hydrogen carbonate (1.28 g), and water (12 g) was added to the reaction mixture thus obtained, and the resulting mixture was stirred for another 3 hours. The reaction mixture thus obtained was filtered through a mesh having a mesh size of 50 μm, and thus an aqueous dispersion of resin microparticles B-65 was obtained. The aqueous dispersion of resin microparticles B-65 thus obtained had a pH of 8.5, a concentration of solid contents of 25%, a volume average particle diameter of 20 nm (volume average particle diameter was measured with a MICROTRAC UPA EX-150 (manufactured by Nikkiso Co., Ltd.)), a weight-average molecular weight (Mw) of 110,000, and a Tg of 75° C. The resin microparticles B-65 thus obtained had a residue of V-501 (a polymerization initiator residue having a potassium salt of a carboxyl group, that is, a polymerization initiator residue that does not have a sulfo group) at the terminals of the resin. The physical properties of resin microparticles B-65 thus obtained are presented in the following tables.

B-65

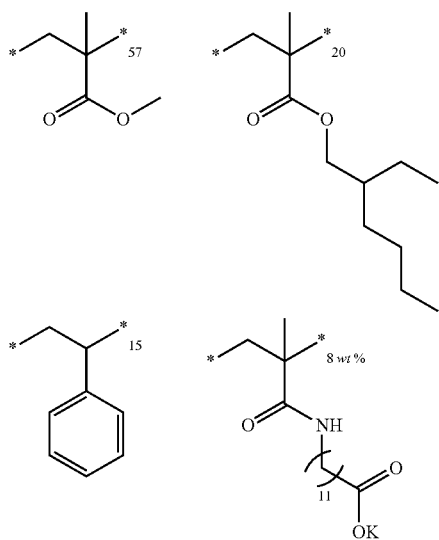

<Production of Resin Microparticles B-66>

An aqueous dispersion of resin microparticles B-66 (particle size 45 nm) was obtained in the same manner as in the production of the resin microparticles B-65, except that the amounts of the monomers used in the production of the resin microparticles B-65 were changed to the amounts of the monomers from which the following structural units were derived. The physical properties of the resin microparticles B-66 thus obtained are presented in the following tables.

B-66

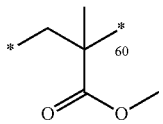 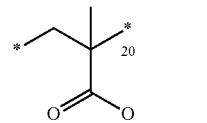

-continued

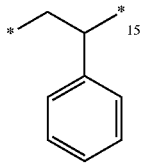 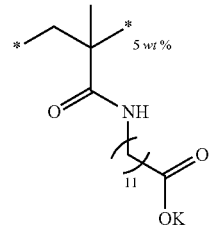

<Production of Resin Microparticles B-67 and B-68>

Aqueous dispersions of resin microparticles B-67 (particle size 52 nm) and B-68 (particle size 110 nm) were obtained in the same manner as in the production of the resin microparticles B-66, except that the amount ratios of the 12-methacrylamidododecanoic acid in the 1-liter three-neck flask equipped with a stirrer, a thermometer, a reflux cooling pipe and a nitrogen gas inlet tube, and the 12-methacrylamidododecanoic acid in the aqueous solution that was added dropwise in the production of the resin microparticles B-66 were changed. The physical properties of the resin microparticles B-67 and B-68 thus obtained are presented in the following tables.

<Production of Resin Microparticles B-69 to B-94>

Aqueous dispersions of resin microparticles B-69 to B-94 were obtained in the same manner as in the production of the resin microparticles B-65, except that the types and amounts of the monomers used in the production of the resin microparticles B-65 were changed to the types and amounts of the monomers from which the following structural units were derived. The physical properties of the resin microparticles B-69 to B-94 thus obtained are presented in the following tables.

B-69

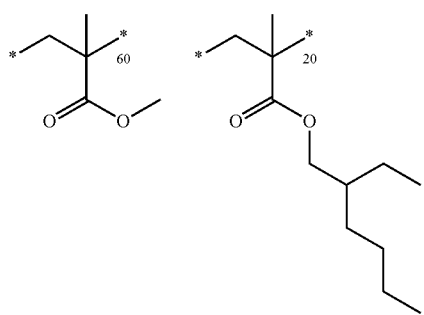
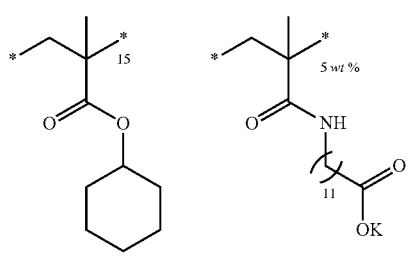
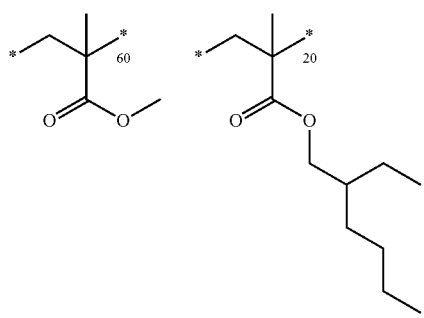
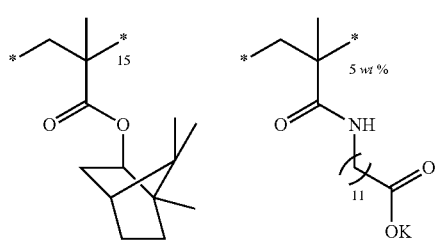
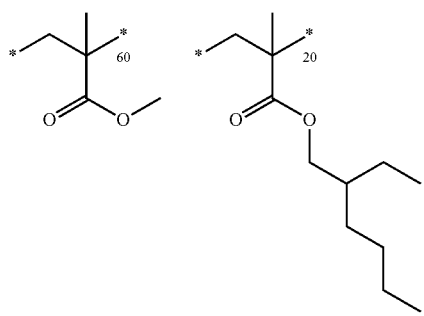
B-70
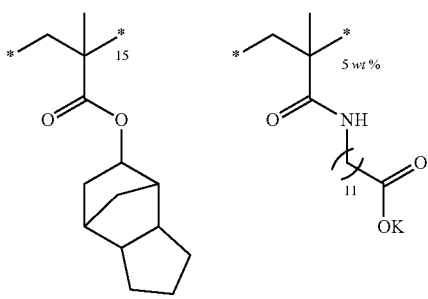
B-71
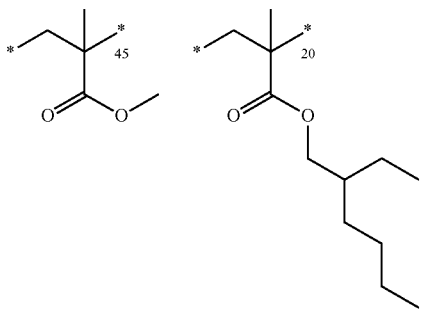
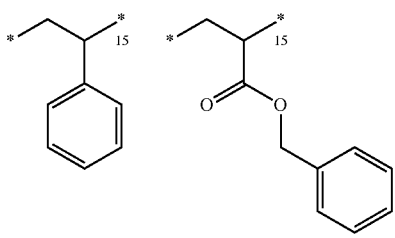
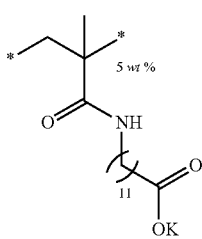
B-72
B-73
B-74
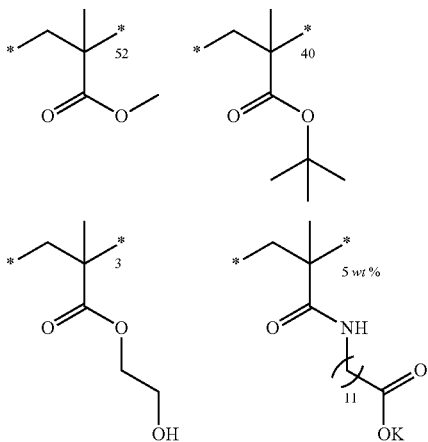

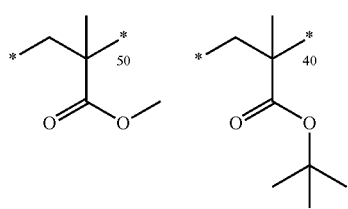
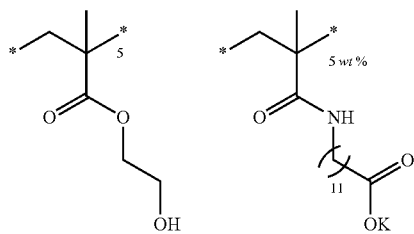
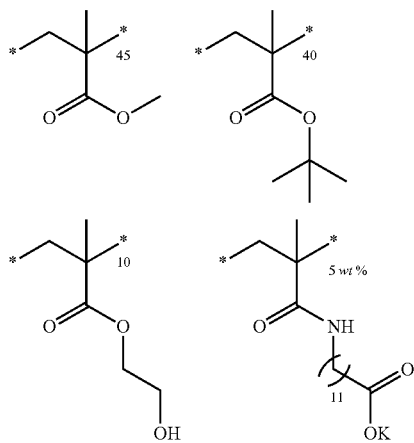
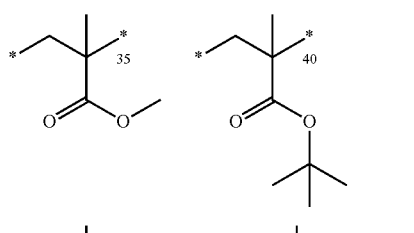
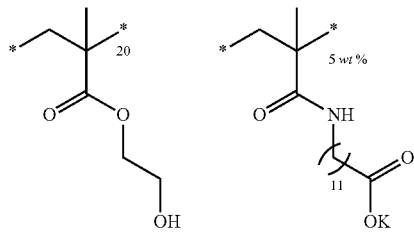
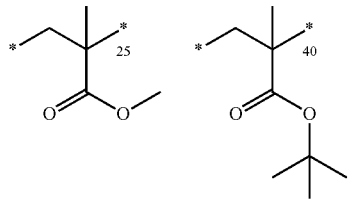
B-75
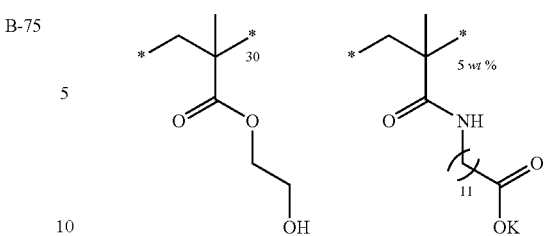
B-76
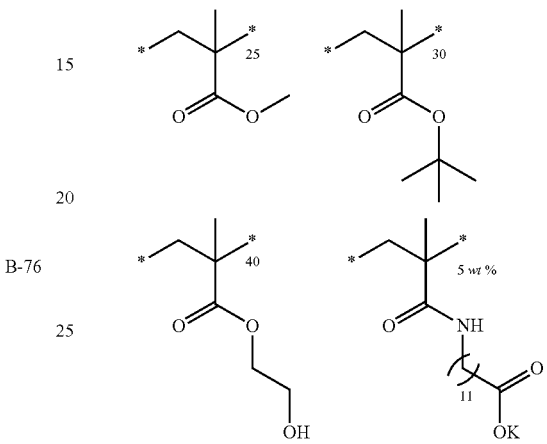
B-77
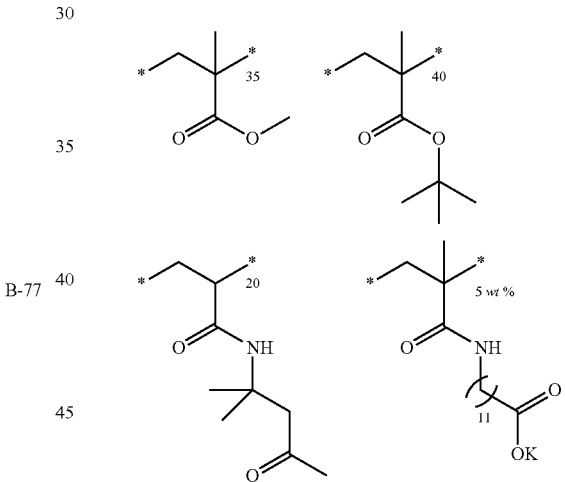
B-78
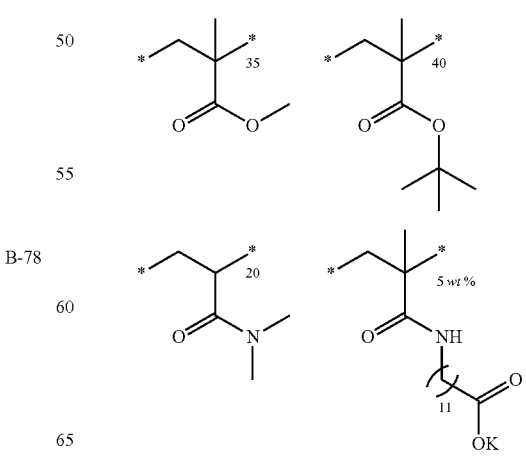

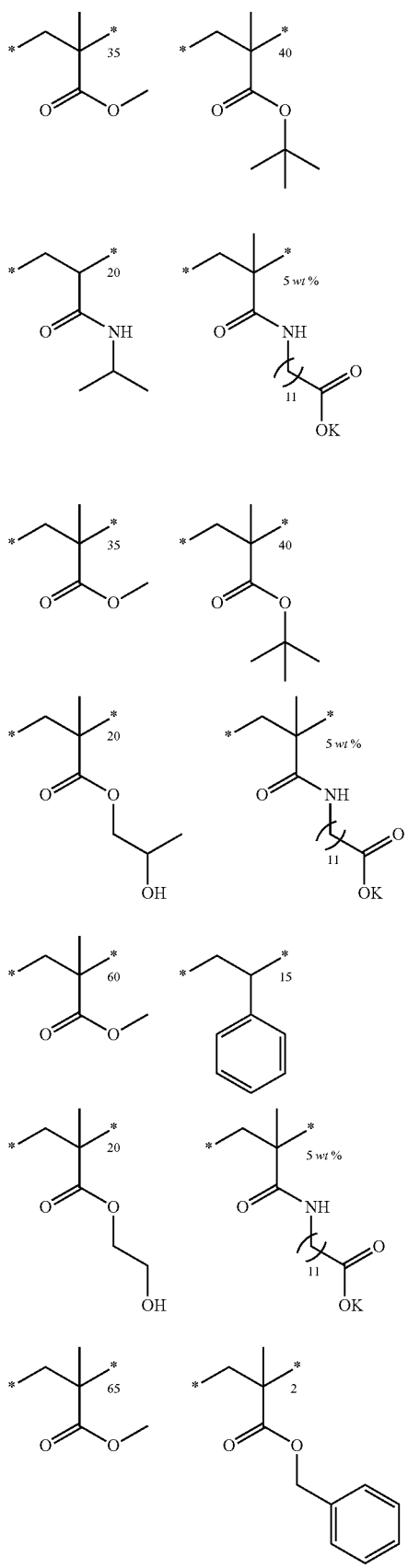

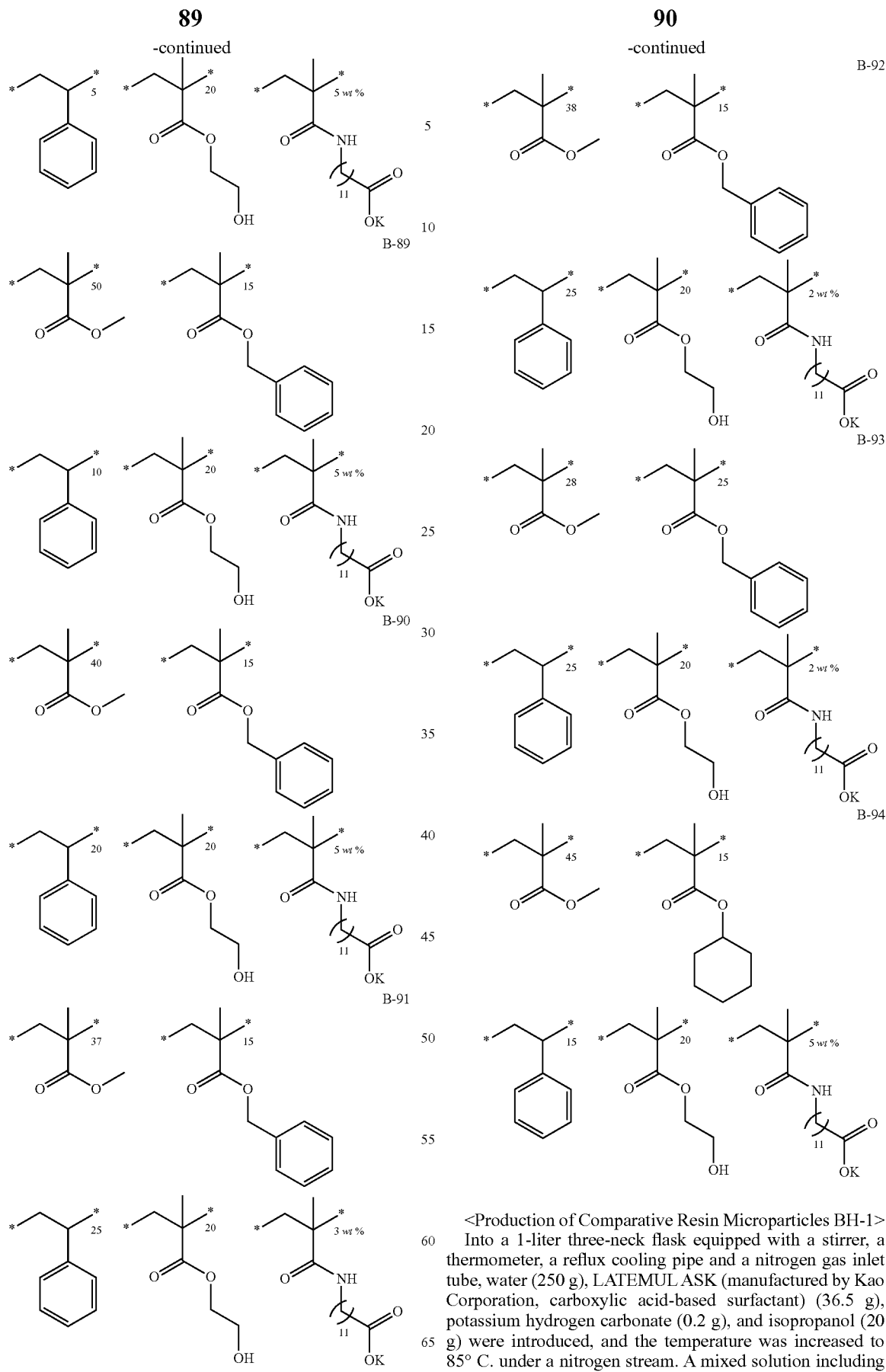

<Production of Comparative Resin Microparticles BH-1>
Into a 1-liter three-neck flask equipped with a stirrer, a thermometer, a reflux cooling pipe and a nitrogen gas inlet tube, water (250 g), LATEMUL ASK (manufactured by Kao Corporation, carboxylic acid-based surfactant) (36.5 g), potassium hydrogen carbonate (0.2 g), and isopropanol (20 g) were introduced, and the temperature was increased to 85° C. under a nitrogen stream. A mixed solution including V-501 (0.57 g), potassium hydrogen carbonate (0.43 g), and water (9 g) was added thereto, and the mixture was stirred for 10 minutes. Next, a monomer solution including methyl methacrylate (60 g) and 2-ethylhexyl methacrylate (40 g) was added dropwise to the three-neck flask at a constant speed such that dropwise addition would be completed in 3 hours. A mixed solution including V-501 (manufactured by Wako Pure Chemical Industries, Ltd.) (0.29 g), potassium hydrogen carbonate (0.21 g), and water (6 g) was further added thereto in two divided portions, namely, immediately after the initiation of dropwise addition of the monomer solution, and 1.5 hours after the initiation of dropwise addition of the monomer solution. After completion of the dropwise addition of the monomer solution, the resulting mixture was stirred for one hour. Subsequently, a mixed solution including V-501 (0.29 g), potassium hydrogen carbonate (0.21 g) and water (6 g) was added to the reaction mixture thus obtained, and the resulting mixture was stirred for another 3 hours. The reaction mixture thus obtained was filtered through a mesh having a mesh size of 50 μm, and thus an aqueous dispersion of comparative resin microparticles BH-1 was obtained. The physical properties of the comparative resin microparticles BH-1 thus obtained are presented in the following tables.

<Production of Comparative Resin Microparticles BH-2>

An aqueous dispersion of comparative resin microparticles BH-2 was obtained in the same manner as in the production of the comparative resin microparticles BH-1, except that in regard to the production of the comparative resin microparticles BH-1, LATEMUL ASK (manufactured by Kao Corporation) (36.5 g) was changed to ELEMINOL RS-3000 (manufactured by Sanyo Chemical Industries, Ltd., reactive sulfuric acid ester-based surfactant) (7.5 g). The physical properties of the comparative resin microparticles BH-2 thus obtained are presented in the following tables.

<Production of Comparative Resin Microparticles BH-3 and BH-4>

Production of comparative resin microparticles BH-3 and BH-4 was attempted in the same manner as in the production of the resin microparticles B-01, except that the types and amounts of the monomers used in the production of the resin microparticles B-01 were changed to the types and amounts of the monomers from which the following structural units were derived. However, large amounts of solid precipitates that seemed to have been produced as a result of aggregation of the resin microparticles, were produced, and thus aqueous dispersions of resin microparticles could not be prepared.

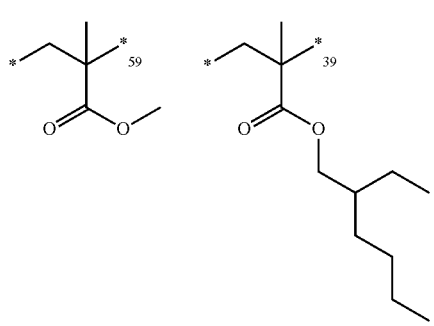

BH-3

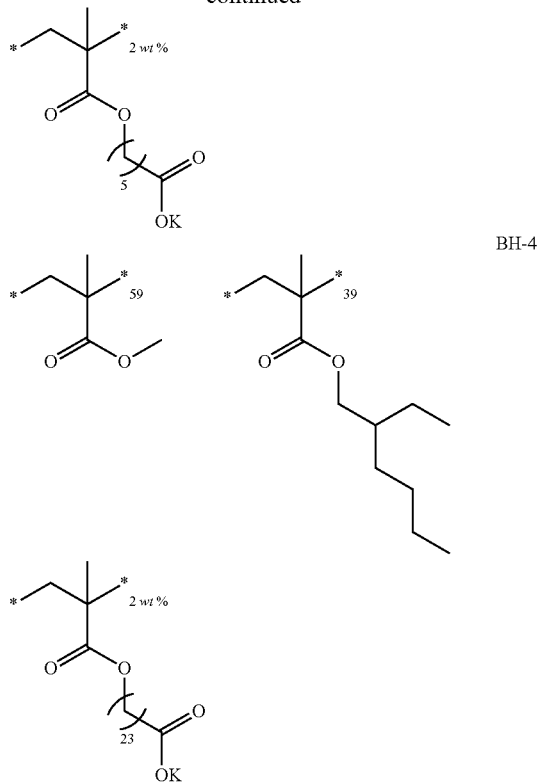

BH-4

EXAMPLES AND COMPARATIVE EXAMPLES

<Production of Aqueous Ink Composition>
(Production of Black Ink K-01)
—Synthesis of Water-Soluble Polymeric Dispersant Q-1—

A monomer supply composition was prepared by mixing methacrylic acid (172 parts), benzyl methacrylate (828 parts), and isopropanol (375 parts). Furthermore, an initiator supply composition was prepared by mixing 2,2-azobis(2-methylbutyronitrile) (22.05 parts) and isopropanol (187.5 parts).

Next, isopropanol (187.5 parts) was heated to 80° C. in a nitrogen atmosphere, and a mixture of the monomer supply composition and the initiator supply composition was added dropwise thereto for 2 hours. After completion of the dropwise addition, the solution thus obtained was maintained at 80° C. for another 4 hours, and then was cooled to 25° C.

After cooling, the solvent was removed under reduced pressure, and thereby a water-soluble polymeric dispersant Q-1 having a weight-average molecular weight of about 30,000 and an acid value of 112 mg KOH/g was obtained.
—Preparation of Black Pigment Dispersion—

0.8 equivalents of the amount of methacrylic acid in the water-soluble polymeric dispersant Q-1 (150 parts) obtained as described above was neutralized using an aqueous solution of potassium hydroxide, and then ion exchange water was added thereto such that the water-soluble polymeric dispersant concentration would be 25%. Thus, an aqueous solution of a water-soluble polymeric dispersant was obtained.

This aqueous solution of the water-soluble polymeric dispersant (124 parts), carbon black MA-100 (black pigment) (48 parts), water (75 parts), and dipropylene glycol (30 parts) were mixed, and the mixture was dispersed with a beads mill (bead diameter 0.1 mmϕ, zirconia beads) until a desired volume average particle diameter was obtained. Thus, a dispersion of polymer-coated black pigment particles having a pigment concentration of 15% (uncrosslinked dispersion) was obtained.

To this uncrosslinked dispersion (136 parts), DENACOL EX-321 (manufactured by Nagase ChemteX Corporation, crosslinking agent) (1.3 parts) and an aqueous solution of boric acid (boric acid concentration: 4% by mass) (14.3 parts) were added, and the mixture was caused to react for 6.5 hours at 50° C. and then cooled to 25° C. Thus, a crosslinked dispersion was obtained. Next, ion exchange water was added to the crosslinked dispersion thus obtained, and ultrafiltration was performed using a stirring type ULTRAHOLDER (manufactured by Advantec AS) and an ultrafiltration filter (manufactured by Advantec AS, fractional molecular weight 50,000, Q0500076E ULTRAFILTER). Purification was performed until the dipropylene glycol concentration in the crosslinked dispersion reached 0.1% by mass or less, and then the crosslinked dispersion was concentrated until the pigment concentration reached 15% by mass. Thus, a black pigment dispersion was obtained. The pigment included in the black pigment dispersion is a polymer-coated pigment (encapsulated pigment) that has the surface coated with a crosslinked polymer produced by crosslinking the water-soluble polymeric dispersant Q-1 with a crosslinking agent.

—Preparation of Magenta Pigment Dispersion—

A magenta pigment dispersion was obtained in the same manner as in the preparation of the black pigment dispersion, except that PIGMENT RED 122 (magenta pigment) was used instead of carbon black MA-100 (black pigment) that was used as a pigment in the preparation of the black pigment dispersion.

—Preparation of Cyan Pigment Dispersion—

A cyan pigment dispersion was obtained in the same manner as in the preparation of the black pigment dispersion, except that PIGMENT BLUE 15:3 (cyan pigment) was used instead of carbon black MA-100 (black pigment) that was used as a pigment in the preparation of the black pigment dispersion.

—Preparation of Black Ink K-01—

An ink was prepared by mixing the black pigment dispersion, the magenta pigment dispersion, the cyan pigment dispersion, an aqueous dispersion of the resin microparticles B-01, and the components indicated in the following tables, at the composition indicated in the following tables (unit: parts by mass (hereinafter, the same)). After the preparation, coarse particles were removed with a 1 μm filter, and thus black ink K-01 as an aqueous ink composition was prepared.

—Preparation of Black Inks K-02 to K-41 and KH-1, KH-2, and KH-4—

Black inks K-02 to K-41, KH-1, KH-2, and KH-4 as aqueous ink compositions were respectively prepared in the same manner as in the case of the black ink K-01, except that the aqueous dispersions of resin microparticles indicated in the following tables were used instead of the aqueous dispersion of the resin microparticles B-01 used in the preparation of black ink K-01, and the component compositions indicated in the following tables were adopted.

The viscosities of the black inks prepared as described above were all in the range of 3 to 15 mPa·s at 30° C. This viscosity was measured with a VISCOMETER TV-22 (manufactured by Toki Sangyo Co., Ltd.).

The surface tension was measured by a platinum plate method using a CBVP-Z manufactured by Kyowa Interface Science Co., Ltd. The surface tension values of the black inks prepared as described above were all in the range of 20 to 60 mN/m.

—Preparation of Black Ink KH-3—

The ink of Example 1 (paragraph <0095>) of JP2014-152204A was prepared and was designated as black ink KH-3.

TABLE 1

| Ink composition No. | Resin microparticles No. | Black pigment dispersion | Magenta pigment dispersion | Cyan pigment dispersion | Resin microparticles | Glycerin | PG | MFTG | GP-250 | OLFINE E1010 | OLFINE E1020 | Ion exchange water |
|---|---|---|---|---|---|---|---|---|---|---|---|---|
| K-01 | B-01 | 15.0 | 2.0 | 2.0 | 8.0 | 3.0 | 5.0 | 2.0 | 5.0 | 0.3 | 1.0 | 56.7 |
| K-02 | B-02 | 15.0 | 2.0 | 2.0 | 8.0 | 3.0 | 5.0 | 2.0 | 5.0 | 0.3 | 1.0 | 56.7 |
| K-03 | B-03 | 15.0 | 2.0 | 2.0 | 8.0 | 3.0 | 5.0 | 2.0 | 5.0 | 0.3 | 1.0 | 56.7 |
| K-04 | B-04 | 15.0 | 2.0 | 2.0 | 8.0 | 3.0 | 5.0 | 2.0 | 5.0 | 0.3 | 1.0 | 56.7 |
| K-05 | B-05 | 15.0 | 2.0 | 2.0 | 8.0 | 3.0 | 5.0 | 2.0 | 5.0 | 0.3 | 1.0 | 56.7 |
| K-06 | B-06 | 15.0 | 2.0 | 2.0 | 8.0 | 3.0 | 5.0 | 2.0 | 5.0 | 0.3 | 1.0 | 56.7 |
| K-07 | B-07 | 15.0 | 2.0 | 2.0 | 8.0 | 3.0 | 5.0 | 2.0 | 5.0 | 0.3 | 1.0 | 56.7 |
| K-08 | B-08 | 15.0 | 2.0 | 2.0 | 8.0 | 3.0 | 5.0 | 2.0 | 5.0 | 0.3 | 1.0 | 56.7 |
| K-09 | B-09 | 15.0 | 2.0 | 2.0 | 8.0 | 3.0 | 5.0 | 2.0 | 5.0 | 0.3 | 1.0 | 56.7 |
| K-10 | B-10 | 15.0 | 2.0 | 2.0 | 8.0 | 3.0 | 5.0 | 2.0 | 5.0 | 0.3 | 1.0 | 56.7 |
| K-11 | B-11 | 15.0 | 2.0 | 2.0 | 8.0 | 3.0 | 5.0 | 2.0 | 5.0 | 0.3 | 1.0 | 56.7 |
| K-12 | B-12 | 15.0 | 2.0 | 2.0 | 8.0 | 3.0 | 5.0 | 2.0 | 5.0 | 0.3 | 1.0 | 56.7 |
| K-13 | B-13 | 15.0 | 2.0 | 2.0 | 8.0 | 3.0 | 5.0 | 2.0 | 5.0 | 0.3 | 1.0 | 56.7 |
| K-14 | B-14 | 15.0 | 2.0 | 2.0 | 8.0 | 3.0 | 5.0 | 2.0 | 5.0 | 0.3 | 1.0 | 56.7 |
| K-15 | B-15 | 15.0 | 2.0 | 2.0 | 8.0 | 3.0 | 5.0 | 2.0 | 5.0 | 0.3 | 1.0 | 56.7 |
| K-16 | B-16 | 15.0 | 2.0 | 2.0 | 8.0 | 3.0 | 5.0 | 2.0 | 5.0 | 0.3 | 1.0 | 56.7 |
| K-17 | B-17 | 15.0 | 2.0 | 2.0 | 8.0 | 3.0 | 5.0 | 2.0 | 5.0 | 0.3 | 1.0 | 56.7 |
| K-18 | B-18 | 15.0 | 2.0 | 2.0 | 8.0 | 3.0 | 5.0 | 2.0 | 5.0 | 0.3 | 1.0 | 56.7 |
| K-19 | B-19 | 15.0 | 2.0 | 2.0 | 8.0 | 3.0 | 5.0 | 2.0 | 5.0 | 0.3 | 1.0 | 56.7 |
| K-20 | B-20 | 15.0 | 2.0 | 2.0 | 8.0 | 3.0 | 5.0 | 2.0 | 5.0 | 0.3 | 1.0 | 56.7 |
| K-21 | B-21 | 15.0 | 2.0 | 2.0 | 8.0 | 3.0 | 5.0 | 2.0 | 5.0 | 0.3 | 1.0 | 56.7 |
| K-22 | B-22 | 15.0 | 2.0 | 2.0 | 8.0 | 3.0 | 5.0 | 2.0 | 5.0 | 0.3 | 1.0 | 56.7 |
| K-23 | B-23 | 15.0 | 2.0 | 2.0 | 8.0 | 3.0 | 5.0 | 2.0 | 5.0 | 0.3 | 1.0 | 56.7 |
| K-24 | B-24 | 15.0 | 2.0 | 2.0 | 8.0 | 3.0 | 5.0 | 2.0 | 5.0 | 0.3 | 1.0 | 56.7 |
| K-25 | B-25 | 15.0 | 2.0 | 2.0 | 8.0 | 3.0 | 5.0 | 2.0 | 5.0 | 0.3 | 1.0 | 56.7 |
| K-26 | B-26 | 15.0 | 2.0 | 2.0 | 8.0 | 3.0 | 5.0 | 2.0 | 5.0 | 0.3 | 1.0 | 56.7 |
| K-27 | B-27 | 15.0 | 2.0 | 2.0 | 8.0 | 3.0 | 5.0 | 2.0 | 5.0 | 0.3 | 1.0 | 56.7 |

TABLE 1-continued

| Ink composition No. | Resin microparticles No. | Black pigment dispersion | Magenta pigment dispersion | Cyan pigment dispersion | Resin microparticles | Glycerin | PG | MFTG | GP-250 | OLFINE E1010 | OLFINE E1020 | Ion exchange water |
|---|---|---|---|---|---|---|---|---|---|---|---|---|
| K-28 | B-28 | 15.0 | 2.0 | 2.0 | 8.0 | 3.0 | 5.0 | 2.0 | 5.0 | 0.3 | 1.0 | 56.7 |
| K-29 | B-29 | 15.0 | 2.0 | 2.0 | 8.0 | 3.0 | 5.0 | 2.0 | 5.0 | 0.3 | 1.0 | 56.7 |
| K-30 | B-30 | 15.0 | 2.0 | 2.0 | 8.0 | 3.0 | 5.0 | 2.0 | 5.0 | 0.3 | 1.0 | 56.7 |
| K-31 | B-31 | 15.0 | 2.0 | 2.0 | 8.0 | 3.0 | 5.0 | 2.0 | 5.0 | 0.3 | 1.0 | 56.7 |
| K-32 | B-32 | 15.0 | 2.0 | 2.0 | 8.0 | 3.0 | 5.0 | 2.0 | 5.0 | 0.3 | 1.0 | 56.7 |
| K-33 | B-33 | 15.0 | 2.0 | 2.0 | 8.0 | 3.0 | 5.0 | 2.0 | 5.0 | 0.3 | 1.0 | 56.7 |
| K-34 | B-34 | 15.0 | 2.0 | 2.0 | 8.0 | 3.0 | 5.0 | 2.0 | 5.0 | 0.3 | 1.0 | 56.7 |
| K-35 | B-35 | 15.0 | 2.0 | 2.0 | 8.0 | 3.0 | 5.0 | 2.0 | 5.0 | 0.3 | 1.0 | 56.7 |
| K-36 | B-36 | 15.0 | 2.0 | 2.0 | 8.0 | 3.0 | 5.0 | 2.0 | 5.0 | 0.3 | 1.0 | 56.7 |
| K-37 | B-37 | 15.0 | 2.0 | 2.0 | 8.0 | 3.0 | 5.0 | 2.0 | 5.0 | 0.3 | 1.0 | 56.7 |
| K-38 | B-38 | 15.0 | 2.0 | 2.0 | 8.0 | 3.0 | 5.0 | 2.0 | 5.0 | 0.3 | 1.0 | 56.7 |
| K-39 | B-39 | 15.0 | 2.0 | 2.0 | 8.0 | 3.0 | 5.0 | 2.0 | 5.0 | 0.3 | 1.0 | 56.7 |
| K-40 | B-03 | 19.5 | 2.6 | 2.6 | 1.0 | 3.0 | 8.0 | 2.0 | 5.0 | 0.3 | 1.0 | 55.0 |
| K-41 | B-03 | 13.5 | 1.8 | 1.8 | 15.0 | 2.0 |  | 4.0 | 3.0 | 0.3 | 1.0 | 57.6 |
| KH-1 | BH-1 | 15.0 | 2.0 | 2.0 | 8.0 | 3.0 | 5.0 | 2.0 | 5.0 | 0.3 | 1.0 | 56.7 |
| KH-2 | BH-2 | 15.0 | 2.0 | 2.0 | 8.0 | 3.0 | 5.0 | 2.0 | 5.0 | 0.3 | 1.0 | 56.7 |
| KH-4 | B-03 | 12.0 | 1.6 | 1.6 | 20.0 | 2.0 | 5.0 | 2.0 | 3.0 | 0.3 | 1.0 | 51.5 |

PG: Propylene glycol (manufactured by Wako Pure Chemical Industries, Ltd.)
MFTG: Tripropylene glycol monomethyl ether (manufactured by Nippon Nyukazai Co., Ltd.)
GP-250: Polyoxypropylene glyceryl ether (manufactured by Sanyo Chemical Industries, Ltd.)
OLFINE E1010: Surfactant (manufactured by Nisshin Chemical Industry Co., Ltd.)
OLFINE E1020: Surfactant (manufactured by Nisshin Chemical Industry Co., Ltd.)

—Preparation of Cyan Inks C-01 to C-31—

Cyan inks C-01 to C-31 as aqueous ink compositions were respectively prepared in the same manner as in the case of black ink K-01, except that the aqueous dispersions of resin microparticles indicated in the following tables were used instead of the aqueous dispersion of resin microparticles B-01 used in the preparation of black ink K-01, and the component compositions indicated in the following tables were adopted.

The viscosities of the cyan inks prepared as described above were all in the range of 3 to 15 mPa·s at 30° C. This viscosity was measured with a VISCOMETER TV-22 (manufactured by Toki Sangyo Co., Ltd.).

The surface tension was measured by a platinum plate method using a CBVP-Z manufactured by Kyowa Interface Science Co., Ltd. The surface tension values of the cyan inks prepared as described above were all in the range of 20 to 60 mN/m.

TABLE 1-2

| Ink composition No. | Resin microparticles No. | Cyan pigment dispersion | Resin microparticles | Glycerin | PG | MFTG | GP-250 | OLFINE E1010 | OLFINE E1020 | Ion exchange water |
|---|---|---|---|---|---|---|---|---|---|---|
| C-01 | B-22 | 23.0 | 8.0 | 3.0 | 7.0 | 2.0 | 5.0 | 0.3 | 1.0 | 50.7 |
| C-02 | B-65 | 23.0 | 8.0 | 3.0 | 7.0 | 2.0 | 5.0 | 0.3 | 1.0 | 50.7 |
| C-03 | B-66 | 23.0 | 8.0 | 3.0 | 7.0 | 2.0 | 5.0 | 0.3 | 1.0 | 50.7 |
| C-04 | B-67 | 23.0 | 8.0 | 3.0 | 7.0 | 2.0 | 5.0 | 0.3 | 1.0 | 50.7 |
| C-05 | B-68 | 23.0 | 8.0 | 3.0 | 7.0 | 2.0 | 5.0 | 0.3 | 1.0 | 50.7 |
| C-06 | B-69 | 23.0 | 8.0 | 3.0 | 7.0 | 2.0 | 5.0 | 0.3 | 1.0 | 50.7 |
| C-07 | B-70 | 23.0 | 8.0 | 3.0 | 7.0 | 2.0 | 5.0 | 0.3 | 1.0 | 50.7 |
| C-08 | B-71 | 23.0 | 8.0 | 3.0 | 7.0 | 2.0 | 5.0 | 0.3 | 1.0 | 50.7 |
| C-09 | B-72 | 23.0 | 8.0 | 3.0 | 7.0 | 2.0 | 5.0 | 0.3 | 1.0 | 50.7 |
| C-10 | B-73 | 23.0 | 8.0 | 3.0 | 7.0 | 2.0 | 5.0 | 0.3 | 1.0 | 50.7 |
| C-11 | B-74 | 23.0 | 8.0 | 3.0 | 7.0 | 2.0 | 5.0 | 0.3 | 1.0 | 50.7 |
| C-12 | B-75 | 23.0 | 8.0 | 3.0 | 7.0 | 2.0 | 5.0 | 0.3 | 1.0 | 50.7 |
| C-13 | B-76 | 23.0 | 8.0 | 3.0 | 7.0 | 2.0 | 5.0 | 0.3 | 1.0 | 50.7 |
| C-14 | B-77 | 23.0 | 8.0 | 3.0 | 7.0 | 2.0 | 5.0 | 0.3 | 1.0 | 50.7 |
| C-15 | B-78 | 23.0 | 8.0 | 3.0 | 7.0 | 2.0 | 5.0 | 0.3 | 1.0 | 50.7 |
| C-16 | B-79 | 23.0 | 8.0 | 3.0 | 7.0 | 2.0 | 5.0 | 0.3 | 1.0 | 50.7 |
| C-17 | B-80 | 23.0 | 8.0 | 3.0 | 7.0 | 2.0 | 5.0 | 0.3 | 1.0 | 50.7 |
| C-18 | B-81 | 23.0 | 8.0 | 3.0 | 7.0 | 2.0 | 5.0 | 0.3 | 1.0 | 50.7 |
| C-19 | B-82 | 23.0 | 8.0 | 3.0 | 7.0 | 2.0 | 5.0 | 0.3 | 1.0 | 50.7 |
| C-20 | B-83 | 23.0 | 8.0 | 3.0 | 7.0 | 2.0 | 5.0 | 0.3 | 1.0 | 50.7 |
| C-21 | B-84 | 23.0 | 8.0 | 3.0 | 7.0 | 2.0 | 5.0 | 0.3 | 1.0 | 50.7 |
| C-22 | B-85 | 23.0 | 8.0 | 3.0 | 7.0 | 2.0 | 5.0 | 0.3 | 1.0 | 50.7 |
| C-23 | B-86 | 23.0 | 8.0 | 3.0 | 7.0 | 2.0 | 5.0 | 0.3 | 1.0 | 50.7 |
| C-24 | B-87 | 23.0 | 8.0 | 3.0 | 7.0 | 2.0 | 5.0 | 0.3 | 1.0 | 50.7 |
| C-25 | B-88 | 23.0 | 8.0 | 3.0 | 7.0 | 2.0 | 5.0 | 0.3 | 1.0 | 50.7 |
| C-26 | B-89 | 23.0 | 8.0 | 3.0 | 7.0 | 2.0 | 5.0 | 0.3 | 1.0 | 50.7 |

TABLE 1-2-continued

| Ink composition No. | Resin microparticles No. | Cyan pigment dispersion | Resin microparticles | Glycerin | PG | MFTG | GP-250 | OLFINE E1010 | OLFINE E1020 | Ion exchange water |
|---|---|---|---|---|---|---|---|---|---|---|
| C-27 | B-90 | 23.0 | 8.0 | 3.0 | 7.0 | 2.0 | 5.0 | 0.3 | 1.0 | 50.7 |
| C-28 | B-91 | 23.0 | 8.0 | 3.0 | 7.0 | 2.0 | 5.0 | 0.3 | 1.0 | 50.7 |
| C-29 | B-92 | 23.0 | 8.0 | 3.0 | 7.0 | 2.0 | 5.0 | 0.3 | 1.0 | 50.7 |
| C-30 | B-93 | 23.0 | 8.0 | 3.0 | 7.0 | 2.0 | 5.0 | 0.3 | 1.0 | 50.7 |
| C-31 | B-94 | 23.0 | 8.0 | 3.0 | 7.0 | 2.0 | 5.0 | 0.3 | 1.0 | 50.7 |

—Preparation of Magenta Inks M-01 to M-31—

Magenta inks M-01 to M-31 as aqueous ink compositions were respectively prepared in the same manner as in the case of black ink K-01, except that the aqueous dispersions of resin microparticles indicated in the following tables were used instead of the aqueous dispersion of resin microparticles B-01 used in the preparation of black ink K-01, and the component compositions indicated in the following tables were adopted.

The viscosities of the magenta inks prepared as described above were all in the range of 3 to 15 mPa·s at 30° C. This viscosity was measured with a VISCOMETER TV-22 (manufactured by Toki Sangyo Co., Ltd.).

The surface tension was measured by a platinum plate method using a CBVP-Z manufactured by Kyowa Interface Science Co., Ltd. The surface tension values of the magenta inks prepared as described above were all in the range of 20 to 60 mN/m.

—Ink Sets of Cyan Ink and Magenta Ink CM-01 to CM-31—

A set of the cyan ink C-01 and the magenta ink M-01 thus prepared was designated as ink set CM-01. Ink sets CM-02 to CM-31 were prepared in the same manner as in the case of the ink set CM-01, by combining corresponding cyan inks and magenta inks. That is, ink set CM-02 was a set of cyan ink C-02 and magenta ink M-02, ink set CM-03 was a set of cyan ink C-03 and magenta ink M-03, and ink set CM-31 was a set of cyan ink C-31 and magenta ink M-31.

<Preparation of Treatment Liquid>

Various components were mixed at the mixing composition described below, and an acid treatment liquid (acid treatment agent) was obtained.

The physical properties of the acid treatment liquid thus obtained were a viscosity of 4.5 mPa·s (25° C.), a surface tension of 41.0 mN/m (25° C.), and pH 0.1 (25° C.).

Here, the viscosity, surface tension and pH were respectively measured using a VISCOMETER TV-22 (manufac-

TABLE 1-3

| Ink composition No. | Resin microparticles No. | Magenta pigment dispersion | Resin microparticles | Glycerin | PG | MFTG | GP-250 | OLFINE E1010 | OLFINE E1020 | Ion exchange water |
|---|---|---|---|---|---|---|---|---|---|---|
| M-01 | B-22 | 36.0 | 6.0 | 3.0 | 3.0 | 2.0 | 3.0 | 0.3 | 1.0 | 45.7 |
| M-02 | B-65 | 36.0 | 6.0 | 3.0 | 3.0 | 2.0 | 3.0 | 0.3 | 1.0 | 45.7 |
| M-03 | B-66 | 36.0 | 6.0 | 3.0 | 3.0 | 2.0 | 3.0 | 0.3 | 1.0 | 45.7 |
| M-04 | B-67 | 36.0 | 6.0 | 3.0 | 3.0 | 2.0 | 3.0 | 0.3 | 1.0 | 45.7 |
| M-05 | B-68 | 36.0 | 6.0 | 3.0 | 3.0 | 2.0 | 3.0 | 0.3 | 1.0 | 45.7 |
| M-06 | B-69 | 36.0 | 6.0 | 3.0 | 3.0 | 2.0 | 3.0 | 0.3 | 1.0 | 45.7 |
| M-07 | B-70 | 36.0 | 6.0 | 3.0 | 3.0 | 2.0 | 3.0 | 0.3 | 1.0 | 45.7 |
| M-08 | B-71 | 36.0 | 6.0 | 3.0 | 3.0 | 2.0 | 3.0 | 0.3 | 1.0 | 45.7 |
| M-09 | B-72 | 36.0 | 6.0 | 3.0 | 3.0 | 2.0 | 3.0 | 0.3 | 1.0 | 45.7 |
| M-10 | B-73 | 36.0 | 6.0 | 3.0 | 3.0 | 2.0 | 3.0 | 0.3 | 1.0 | 45.7 |
| M-11 | B-74 | 36.0 | 6.0 | 3.0 | 3.0 | 2.0 | 3.0 | 0.3 | 1.0 | 45.7 |
| M-12 | B-75 | 36.0 | 6.0 | 3.0 | 3.0 | 2.0 | 3.0 | 0.3 | 1.0 | 45.7 |
| M-13 | B-76 | 36.0 | 6.0 | 3.0 | 3.0 | 2.0 | 3.0 | 0.3 | 1.0 | 45.7 |
| M-14 | B-77 | 36.0 | 6.0 | 3.0 | 3.0 | 2.0 | 3.0 | 0.3 | 1.0 | 45.7 |
| M-15 | B-78 | 36.0 | 6.0 | 3.0 | 3.0 | 2.0 | 3.0 | 0.3 | 1.0 | 45.7 |
| M-16 | B-79 | 36.0 | 6.0 | 3.0 | 3.0 | 2.0 | 3.0 | 0.3 | 1.0 | 45.7 |
| M-17 | B-80 | 36.0 | 6.0 | 3.0 | 3.0 | 2.0 | 3.0 | 0.3 | 1.0 | 45.7 |
| M-18 | B-81 | 36.0 | 6.0 | 3.0 | 3.0 | 2.0 | 3.0 | 0.3 | 1.0 | 45.7 |
| M-19 | B-82 | 36.0 | 6.0 | 3.0 | 3.0 | 2.0 | 3.0 | 0.3 | 1.0 | 45.7 |
| M-20 | B-83 | 36.0 | 6.0 | 3.0 | 3.0 | 2.0 | 3.0 | 0.3 | 1.0 | 45.7 |
| M-21 | B-84 | 36.0 | 6.0 | 3.0 | 3.0 | 2.0 | 3.0 | 0.3 | 1.0 | 45.7 |
| M-22 | B-85 | 36.0 | 6.0 | 3.0 | 3.0 | 2.0 | 3.0 | 0.3 | 1.0 | 45.7 |
| M-23 | B-86 | 36.0 | 6.0 | 3.0 | 3.0 | 2.0 | 3.0 | 0.3 | 1.0 | 45.7 |
| M-24 | B-87 | 36.0 | 6.0 | 3.0 | 3.0 | 2.0 | 3.0 | 0.3 | 1.0 | 45.7 |
| M-25 | B-88 | 36.0 | 6.0 | 3.0 | 3.0 | 2.0 | 3.0 | 0.3 | 1.0 | 45.7 |
| M-26 | B-89 | 36.0 | 6.0 | 3.0 | 3.0 | 2.0 | 3.0 | 0.3 | 1.0 | 45.7 |
| M-27 | B-90 | 36.0 | 6.0 | 3.0 | 3.0 | 2.0 | 3.0 | 0.3 | 1.0 | 45.7 |
| M-28 | B-91 | 36.0 | 6.0 | 3.0 | 3.0 | 2.0 | 3.0 | 0.3 | 1.0 | 45.7 |
| M-29 | B-92 | 36.0 | 6.0 | 3.0 | 3.0 | 2.0 | 3.0 | 0.3 | 1.0 | 45.7 |
| M-30 | B-93 | 36.0 | 6.0 | 3.0 | 3.0 | 2.0 | 3.0 | 0.3 | 1.0 | 45.7 |
| M-31 | B-94 | 36.0 | 6.0 | 3.0 | 3.0 | 2.0 | 3.0 | 0.3 | 1.0 | 45.7 | tured by Toki Sangyo Co., Ltd.), an Automatic Surface Tensiometer CBVP-Z (manufactured by Kyowa Interface Science Co., Ltd.), and a pH meter WM-50EG (manufactured by DKK-Toa Corporation).

| <Composition of treatment liquid> | |
| --- | --- |
| TPGmME (tripropylene glycol monomethyl ether) | 4.8% |
| DEGmBE (diethylene glycol monobutyl ether) | 4.8% |
| Malonic acid | 16.0% |
| Malic acid | 7.8% |
| Propanetricarboxylic acid | 3.5% |
| Phosphoric acid, 85% by mass aqueous solution | 15.0% |
| Anti-foaming agent (TSA-739 (15%) manufactured by Momentive Performance Materials Japan LLC; emulsion type silicone anti-foaming agent) | 0.07% as amount of silicone oil |
| Ion exchange water | amount to make up 100% in total |

TEST EXAMPLE

Tests were performed as described below for the various black inks prepared as described above (hereinafter, may be simply referred to as "ink"). The results are presented in the following Table 2.

<Jetting Stability Test>

Each black ink was jetted out by a line method using a fixed GELJET GX5000 printer head manufactured by Ricoh Co., Ltd., under the jetting conditions of a resolution of 1200×1200 dpi and a jetting amount of 3.5 pL. After it was confirmed that the charged ink composition was jetted out through all of 96 nozzles at the time of initiation of jetting, the ink composition was directly jetted out continuously for 45 minutes. After completion of the continuous jetting for 45 minutes, the number of nozzles that could jet out till the end (number of jetting nozzles after completion of the continuous jetting for 45 minutes) was counted. Using this number of jetting nozzles, the ink jetting ratio was calculated by the following formula, and jetting stability of the ink composition was evaluated based on the evaluation criteria described below. In the present test, grade "B" or a higher grade is acceptable.

Ink jetting ratio (%)=100×(number of jetting nozzles after completion of continuous jetting for 45 minutes)/(total number of nozzles)

—Evaluation Criteria—

A: The ink jetting ratio is 98% or higher.

B: The ink jetting ratio is 95% or higher and lower than 98%.

C: The ink jetting ratio is 90% or higher and lower than 95%.

<Aggregating Properties Test>

OK TOPCOAT (recording medium, manufactured by Oji Paper Co., Ltd.) was fixed onto a stage that moved at a speed of 500 mm/sec, and a treatment liquid was applied thereon with a wire bar coater to an amount of about 1.7 g/m² and then was immediately dried for 2 seconds at 50° C. Subsequently, a solid image having a size of 2 cm×10 cm was printed using each black ink by a line method under the jetting conditions of a resolution of 1200×1200 dpi, a jetting amount of 2.4 pL, and a stage speed of 635 mm/s, with a GELJET GX5000 printer head manufactured by Ricoh Co., Ltd., which was arranged obliquely to the scan direction and fixed. Immediately after printing, the image was mounted on a hot plate at 60° C., with the image-formed surface facing upward, and the image was dried for 10 seconds with hot air at 120° C. using a dryer.

The recording medium having an image formed thereon was observed by visual inspection, and it was examined whether streak unevenness occurred toward the direction of transport of the recording medium. Thus, the degree of occurrence of streak unevenness was evaluated based on the following evaluation criteria.

In a case where the rate of aggregation of an ink is slow, the ink undergoes landing interference with adjacent dots, and streak unevenness attributed to the color (white background) of the recording medium occurs. Therefore, the aggregating properties of the ink (rate of aggregation) can be evaluated by evaluating the streak unevenness. In the present test, grade "B" or a higher grade is acceptable.

—Evaluation Criteria—

A+: The occurrence of streak unevenness is not recognized.

A: One very fine (not recognizable easily) streak unevenness occurred.

B: Two or three very fine (not recognizable easily) streak unevenness occurred.

C: Two or three easily recognizable streak unevenness occurred.

D: Four or more easily recognizable streak unevenness occurred.

<Color Density Test>

OK TOPCOAT (recording medium, manufactured by Oji Paper Co., Ltd.) was fixed on a stage that moved at a speed of 500 mm/sec, and a treatment liquid was applied thereon with a wire bar coater to an amount of about 1.7 g/m² and then was immediately dried for 2 seconds at 50° C. Subsequently, a black-colored solid image was printed using each black ink by a line method under the jetting conditions of a resolution of 1200×1200 dpi, a jetting amount of 2.4 pL, and a stage speed of 635 mm/s, with a GELJET GX5000 printer head manufactured by Ricoh Co., Ltd., which was arranged obliquely to the scan direction and fixed. Immediately after printing, the image was mounted on a hot plate at 60° C., with the image-formed surface facing upward, and the image was dried for 10 seconds with hot air at 120° C. using a dryer.

For the recording medium having an image formed thereon, the density of the solid image section was measured. The color density of the solid image section was measured using a spectrophotometer, SPECTROEYE (manufactured by Sakata Inx Corporation).

The density at a solid image section is such that in a case where the ink dots formed after landing and aggregation are small, the color density tends to be lowered under the influence of the white background of the recording medium. Furthermore, in a case where the rate of aggregation of the ink is slow, the ink undergoes landing interference with adjacent ink dots, the white background of the recording medium is made easily visible, and the color density tends to be lowered. In the present test, grade "B" or a higher grade is acceptable.

—Evaluation Criteria—

A: The color density of the solid image section is higher than 1.7.

B: The color density of the solid image section is higher than 1.5 and 1.7 or lower.

C: The color density of the solid image section is 1.5 or lower.

<Scratch Resistance Test>

TOKUBISHI ART DOUBLE-SIDED N (recording medium, manufactured by Mitsubishi Paper Mills, Ltd.) was fixed onto a stage that moved at a speed of 500 mm/sec, and a treatment liquid was applied thereon with a wire bar coater to an amount of about 1.7 g/m² and then was immediately dried for 2 seconds at 50° C. Subsequently, a black-colored solid image was printed using each black ink by a line method under the jetting conditions of a resolution of 1200×1200 dpi and a jetting amount of 3.5 pL, with a GELJET GX5000 printer head manufactured by Ricoh Co., Ltd., which was arranged obliquely to the scan direction and fixed. Immediately after printing, the image was mounted on a hot plate at 60° C., with the image-formed surface facing upward, and the image was dried for 10 seconds with hot air at 120° C. using a dryer. This was used as a print sample.

Unprinted TOKUBISHI ART DOUBLE-SIDED N (manufactured by Mitsubishi Paper Mills, Ltd.) was wound around a paper weight (weight 470 g, size 15 mm×30 mm×120 mm), and the solid image of the print sample was rubbed in 20 reciprocations. The print sample after rubbing was observed by visual inspection, and the print sample was evaluated based on the following evaluation criteria. The area of contact between the unprinted TOKUBISHI ART that was wound around the paper weight and the solid image of the sample to be evaluated was 150 mm². In the present test, grade "B" or a higher grade is acceptable.

—Evaluation Criteria—

A: Peeling of the image (coloring material) from the printed surface was not recognizable, or peeling of the image (coloring material) from the printed surface was slightly recognized.

B: Peeling of the image (coloring material) from the printed surface was recognized to a larger extent; however, the peeling occurred to an extent acceptable for practical use.

C: Peeling of the image (coloring material) from the printed surface was clearly recognizable, and the peeling was at a level that would cause a problem for practical use.

<Blocking Resistance Test>

TOKUBISHI ART DOUBLE-SIDED N (recording medium, manufactured by Mitsubishi Paper Mills, Ltd.) was fixed onto a stage that moved at a speed of 500 mm/sec, and a treatment liquid was applied thereon with a wire bar coater to an amount of about 1.7 g/m² and then was immediately dried for 2 seconds at 50° C. Subsequently, a black-colored solid image was printed using each black ink by a line method under the jetting conditions of a resolution of 1200×1200 dpi and a jetting amount of 3.5 pL, with a GELJET GX5000 printer head manufactured by Ricoh Co., Ltd., which was arranged obliquely to the scan direction and fixed. Immediately after printing, the image was mounted on a hot plate at 60° C., with the image-formed surface facing upward, and the image was dried for 10 seconds with hot air at 120° C. using a dryer. This was used as a print sample.

The print sample was cut into two sheets each having a size of 3 cm on each of the four sides. Next, the four angles of the two sheets were superposed such that the printed surfaces faced each other. This was placed on a hot plate at 50° C. under the environmental conditions of 60° C. and 50% RH. A flat rubber plate having a size of 2.5 cm×2.5 cm×0.3 cm was placed thereon, with the surface that measured 2.5 cm×2.5 cm being arranged to face the paper side, and a flat plastic plate having a size of 2.5 cm×2.5 cm×0.3 cm was placed thereon, with the surface that measured 2.5 cm×2.5 cm being arranged to face the rubber plate. A container containing 300 g of beads was mounted on the plastic plate and was left to stand for 20 minutes, and then the two sheets of paper that were superposed to face each other were detached. Thus, blocking resistance was evaluated according to the following evaluation criteria. In the present test, grade "B" or a higher grade is acceptable.

—Evaluation Criteria—

A: The paper sheets were spontaneously detached, or although there was resistance upon detaching, there was no color transfer between the print samples.

B: Color transfer between the print samples was recognized to an extent of less than 10% of the area of the printed surface; however, the color transfer occurred at a level without any problem for practical use.

C: Color transfer between the print samples was recognized to a large extent of 10% or more of the area of the printed surface, and the color transfer occurred at a level that would cause a problem for practical use.

In the following Table 2, the content of sulfo groups in the resin of the resin microparticles can be calculated by combining acid-base titration, elemental analysis, infrared spectroscopy (IR), pyrolysis gas chromatography-mass spectrometry (GC-MS), and the like. For example, for the resin microparticles of Example 32, Example 33, and Comparative Example 2, solid-dried samples were quantitatively analyzed by an elemental analysis of sulfur atoms, and under the assumption that the quantitatively analyzed sulfur atoms were all sulfo groups, the content of sulfo groups in the resin was calculated.

TABLE 2

| | | Resin microparticles | | | | | | | Evaluation of ink composition | | | |
|---|---|---|---|---|---|---|---|---|---|---|---|---|
| Ink composition No. | Resin microparticles No. | Total content of structural unit of General Formula (1) and structural unit of General Formula (2) in resin [% by mass] | Presence or absence of sulfo groups in polymerization initiator | Particle size [nm] | Tg [° C.] | Weight-average molecular weight [×10⁴] | Sulfo group content [mmol/g] | Aggregating properties | Color density | Jetting stability | Scratch resistance | Blocking resistance |
| Example 1 | K-1 | B-01 | 0.5 | Absent | 120 | 72 | 30 | 0 | B | B | B | A | A |
| Example 2 | K-2 | B-02 | 1 | Absent | 135 | 71 | 22 | 0 | B | B | A | A | A |
| Example 3 | K-3 | B-03 | 2 | Absent | 121 | 70 | 20 | 0 | A | A | A | A | A |
| Example 4 | K-4 | B-04 | 5 | Absent | 95 | 69 | 22 | 0 | A | A | A | A | A |
| Example 5 | K-5 | B-05 | 10 | Absent | 63 | 52 | 31 | 0 | A | A | A | A | A |
| Example 6 | K-6 | B-06 | 20 | Absent | 55 | 48 | 28 | 0 | A+ | B | A | A | A |
| Example 7 | K-7 | B-07 | 30 | Absent | 40 | 40 | 35 | 0 | A+ | B | B | A | A |
| Example 8 | K-8 | B-08 | 2 | Absent | 119 | 125 | 28 | 0 | A | A | A | B | B |
| Example 9 | K-9 | B-09 | 2 | Absent | 110 | 100 | 25 | 0 | A | A | A | A | A |
| Example 10 | K-10 | B-10 | 2 | Absent | 130 | 20 | 20 | 0 | A | A | A | A | B |

TABLE 2-continued

| Ink composition No. | Resin microparticles No. | Total content of structural unit of General Formula (1) and structural unit of General Formula (2) in resin [% by mass] | Presence or absence of sulfo groups in polymerization initiator | Particle size [nm] | Tg [° C.] | Weight-average molecular weight [×10⁴] | Sulfo group content [mmol/g] | Aggregating properties | Color density | Jetting stability | Scratch resistance | Blocking resistance |
|---|---|---|---|---|---|---|---|---|---|---|---|---|
| Example 11 | K-11 | B-11 | 2 | Absent | 350 | 3 | 60 | 0 | A | A | B | B | B |
| Example 12 | K-12 | B-12 | 2 | Absent | 220 | 40 | 15 | 0 | A | A | A | A | B |
| Example 13 | K-13 | B-13 | 2 | Absent | 165 | 65 | 18 | 0 | A | A | A | A | A |
| Example 14 | K-14 | B-14 | 2 | Absent | 133 | 62 | 23 | 0 | A | A | A | A | A |
| Example 15 | K-15 | B-15 | 2 | Absent | 82 | 85 | 15 | 0 | A | A | A | A | A |
| Example 16 | K-16 | B-16 | 2 | Absent | 120 | 65 | 26 | 0 | A | A | A | A | A |
| Example 17 | K-17 | B-17 | 2 | Absent | 124 | 79 | 12 | 0 | A | A | A | A | A |
| Example 18 | K-18 | B-18 | 2 | Absent | 203 | 50 | 33 | 0 | A | A | A | A | A |
| Example 19 | K-19 | B-19 | 2 | Absent | 225 | 40 | 22 | 0 | A | A | A | A | B |
| Example 20 | K-20 | B-20 | 4 | Absent | 183 | 80 | 28 | 0 | A | A | A | A | A |
| Example 21 | K-21 | B-21 | 4 | Absent | 136 | 65 | 23 | 0 | A | A | A | A | A |
| Example 22 | K-22 | B-22 | 4 | Absent | 78 | 75 | 30 | 0 | A+ | A | A | A | A |
| Example 23 | K-23 | B-23 | 4 | Absent | 86 | 85 | 26 | 0 | A+ | A | A | A | A |
| Example 24 | K-24 | B-24 | 4 | Absent | 162 | 50 | 29 | 0 | A+ | A | A | A | A |
| Example 25 | K-25 | B-25 | 4 | Absent | 250 | 69 | 51 | 0 | A | A | B | A | A |
| Example 26 | K-26 | B-26 | 2 | Absent | 135 | 69 | 26 | 0 | A | A | A | A | A |
| Example 27 | K-27 | B-27 | 4 | Absent | 167 | 71 | 35 | 0 | A | A | B | A | A |
| Example 28 | K-28 | B-28 | 2 | Absent | 360 | 68 | 65 | 0 | B | B | B | A | A |
| Example 29 | K-29 | B-29 | 4 | Absent | 185 | 73 | 32 | 0 | B | A | B | A | A |
| Example 30 | K-30 | B-30 | 4 | Absent | 176 | 72 | 35 | 0 | B | A | B | A | A |
| Example 31 | K-31 | B-31 | 4 | Absent | 260 | 70 | 42 | 0 | B | A | B | B | A |
| Example 32 | K-32 | B-32 | 2 | Absent | 135 | 73 | 23 | 0.14 | B | B | A | A | A |
| Example 33 | K-33 | B-33 | 2 | Present | 82 | 71 | 16 | 0.03 | B | A | A | A | A |
| Example 34 | K-34 | B-34 | 2 | Absent | 60 | 72 | 6 | 0 | B | B | A | B | B |
| Example 35 | K-35 | B-35 | 2 | Absent | 72 | 73 | 8 | 0 | B | A | A | B | B |
| Example 36 | K-36 | B-36 | 2 | Absent | 150 | 72 | 32 | 0 | A | A | B | A | A |
| Example 37 | K-37 | B-37 | 2 | Absent | 86 | 69 | 37 | 0 | A | A | B | A | A |
| Example 38 | K-38 | B-38 | 2 | Absent | 105 | 68 | 26 | 0 | B | A | B | A | A |
| Example 39 | K-39 | B-39 | 2 | Absent | 160 | 67 | 35 | 0 | B | A | B | A | A |
| Example 40 | K-40 | B-03 | 2 | Absent | 121 | 70 | 20 | 0 | B | A | A | B | B |
| Example 41 | K-41 | B-03 | 2 | Absent | 121 | 70 | 20 | 0 | A | B | B | A | A |
| Comparative Example 1 | KH-1 | BH-1 | — | Absent | 63 | 68 | 15 | 0 | C | B | C | B | B |
| Comparative Example 2 | KH-2 | BH-2 | — | Absent | 75 | 73 | 32 | 0.08 | D | C | A | B | B |
| Comparative Example 3 | KH-3 | — | — | — | — | — | — | — | C | B | B | B | C |
| Comparative Example 4 | KH-4 | B-03 | 2 | Absent | 121 | 70 | 20 | 0 | B | C | B | B | B |

As shown in Table 2, the ink compositions of Comparative Examples 1 and 2 (KH-1 and KH-2) that did not contain the resin microparticles defined in the present invention gave inferior results in terms of the aggregating properties. Furthermore, a balance between high color density and satisfactory jetting stability could not be realized.

Regarding the ink composition of Comparative Example 3 (KH-3) that used a copolymer having a structural unit of General Formula (1) as a dispersant for pigment, the dispersant was disposed to cover the pigment surface, and the dispersant did not exist in the form of the resin microparticles used in the invention. In this case, the ink composition gave inferior results in terms of the aggregating properties.

Furthermore, the ink composition of Comparative Example 4 (KH-4) that had a higher content of resin microparticles in the ink composition than the content value defined in the invention, gave inferior results in the evaluation of color density.

In contrast, the aqueous ink compositions of the invention that each contained a particular amount of resin microparticles as defined in the invention, exhibited excellent characteristics in all of the aggregating properties, color density, jetting stability, scratch resistance, and blocking resistance (Examples 1 to 41).

EXAMPLE

<Production of Aqueous Ink Composition>
(Preparation of Black Inks K-42 to K-66)
Black inks K-42 to K-66 as aqueous ink compositions were respectively prepared in the same manner as in the case of black ink K-22, except that the resin microparticles indicated in the following Table 3 were used instead of the resin microparticles B-22 used in the preparation of black ink K-22.

The viscosities of the black inks prepared as described above were all in the range of 3 to 15 mPa·s at 30° C. This viscosity was measured with a VISCOMETER TV-22 (manufactured by Toki Sangyo Co., Ltd.).

The surface tension was measured by a platinum plate method using a CBVP-Z manufactured by Kyowa Interface Science Co., Ltd. The surface tension values of the black inks prepared as described above were all in the range of 20 to 60 mN/m.

TEST EXAMPLE

For the various black inks prepared as described above (hereinafter, may be simply referred to as "ink"), the following various tests were performed in addition to the various tests described above. The results are presented in the following Table 3.

<Jettability (Deflection) Test>

An image was formed on a recording medium ("KASAI PHOTO FINISH PRO", manufactured by Fujifilm Corporation) under the conditions for ink application as described below, without applying a treatment liquid, and the image was dried. One sheet of line image at 75×2400 dpi was formed, and the center value of the lines was measured with a dot analyzer, DA-6000 (trade name, manufactured by Oji Scientific Instruments Co., Ltd.). The standard deviation σ of the amount of shift from this center value was calculated, and jettability (deflection) was evaluated according to the following evaluation criteria. In the present test, grade "C" or a higher grade is acceptable.

<Conditions for Ink Application>

Head: 1,200 dpi (dot per inch)/20-inch width piezo full-line head was used.

Amount of jetted liquid droplets: 2.4 pL

Driving frequency: 12 kHz (recording medium transport speed 500 mm/sec)

—Evaluation Criteria—

A: σ<4 μm

B: 4 μm≤σ<6 μm

C: 6 μm≤σ≤10 μm

<Restorability Upon Standing Test>

An image was formed on a recording medium ("KASAI PHOTO FINISH PRO", manufactured by Fujifilm Corporation) under the conditions for ink application as described below, without applying a treatment liquid, and the image was dried. Subsequently, one sheet of a nozzle check pattern image was formed (the image used herein is referred to as "initial image sample"). Subsequently, the environment for the recording head nozzle section was maintained as an environment at 25° C. and 50% RH, and the image was left to stand for 15 hours. After standing, one sheet of a nozzle check pattern image such as described above was formed again on the same recording medium as that used as described above (the image used herein is referred to as "image sample after standing").

For the image sample after standing thus obtained, fall-out of nozzles (image fall-out) was observed from the nozzle check pattern image using an optical microscope, the jetting ratio was determined, and the presence or absence of non-jetting was evaluated according to the evaluation criteria described below. In the present test, grade "C" or a higher level is acceptable.

Meanwhile, the jetting ratio (%) was determined from the formula: "(Number of jetting nozzles at image sample after standing/number of jetting nozzles at initial image sample)×100".

<Conditions for Ink Application>

Head: 1,200 dpi (dot per inch)/20-inch width piezo full-line head was used.

Amount of jetted liquid droplets: 2.4 pL

Driving frequency: 24 kHz (recording medium transport speed 500 mm/sec)

—Evaluation Criteria—

A: The jetting ratio is 98% or higher.

B: The jetting ratio is 95% or higher and lower than 98%.

C: The jetting ratio is 90% or higher and lower than 95%.

<Scratch Resistance (Condition B) Test>

TOKUBISHI ART DOUBLE-SIDED N (recording medium, manufactured by Mitsubishi Paper Mills, Ltd.) was fixed onto a stage that moved at a speed of 500 mm/sec, and a treatment liquid was applied thereon with a wire bar coater to an amount of about 1.7 g/m$^2$ and then was immediately dried for 2 seconds at 50° C. Subsequently, a black-colored solid image was printed using each black ink by a line method under the jetting conditions of a resolution of 1200×1200 dpi and a jetting amount of 6.0 pL, with a GELJET GX5000 (trade name) printer head manufactured by Ricoh Co., Ltd., which was arranged obliquely to the scan direction and fixed. Immediately after printing, the image was mounted on a hot plate at 60° C., with the image-formed surface facing upward, and the image was dried for 10 seconds with hot air at 120° C. using a dryer. This was used as a print sample.

Unprinted TOKUBISHI ART DOUBLE-SIDED N (manufactured by Mitsubishi Paper Mills, Ltd.) was wound around a paper weight (weight 470 g, size 15 mm×30 mm×120 mm), and the solid image of the print sample was rubbed in 30 reciprocations. The unprinted TOKUBISHI ART DOUBLE-SIDED N paper (hereinafter, also referred to as rubbing paper) after rubbing was observed by visual inspection, and the print sample was evaluated based on the following evaluation criteria. The area of contact between the unprinted TOKUBISHI ART that was wound around the paper weight and the solid image of the sample to be evaluated was 150 mm$^2$. In the present test, grade "C" or a higher grade is acceptable.

—Evaluation Criteria—

A+: Any transfer of the image (coloring material) to the rubbing paper was not recognized.

A: Transfer of the image (coloring material) to the rubbing paper at a rate of less than 5% of the contact area between the rubbing paper and the solid image was recognized.

B: Transfer of the image (coloring material) to the rubbing paper at a rate of 5% or more and less than 10% of the contact area between the rubbing paper and the solid image was recognized.

C: Transfer of the image (coloring material) to the rubbing paper at a rate of 10% or more and less than 20% of the contact area between the rubbing paper and the solid image was recognized.

TABLE 3

| | Ink composition No. | Resin microparticles No. | Content [% by mass] X | YA | YB | Mass ratio X:(YA+YB) | Particle size [nm] | Tg [°C] | Weight-average molecular weight (×10⁴) | Evaluation of ink composition (a) | (b) | (c) | (d) | (e) | (f) | (g) | (h) |
|---|---|---|---|---|---|---|---|---|---|---|---|---|---|---|---|---|---|
| Example 42 | K-22 | B-22 | 4 | — | — | — | 78 | 75 | 30 | A+ | A | A | A | A | C | C | C |
| Example 43 | K-42 | B-40 | 20 | 5 | — | 1:0.3 | 49 | 65 | 18 | A+ | B | A | A | A | B | B | B |
| Example 44 | K-43 | B-41 | 15 | 5 | — | 1:0.3 | 62 | 67 | 22 | A+ | B | A | A | A | B | B | B |
| Example 45 | K-44 | B-42 | 5 | 2 | — | 1:0.4 | 86 | 82 | 33 | A | A | A | A | A | A | B | B |
| Example 46 | K-45 | B-43 | 5 | 5 | — | 1:1 | 102 | 80 | 25 | A | A | A | A | A | A | B | B |
| Example 47 | K-46 | B-44 | 2 | 5 | — | 1:2.5 | 125 | 82 | 23 | A | A | A | A | A | A | B | B |
| Example 48 | K-47 | B-45 | 2 | 10 | — | 1:5 | 130 | 72 | 20 | A | A | A | A | A | A | B | B |
| Example 49 | K-48 | B-46 | 2 | 20 | — | 1:10 | 310 | 64 | 18 | B | A | A | A | A | B | B | B |
| Example 50 | K-49 | B-47 | 2 | 30 | — | 1:15 | 350 | 62 | 15 | B | A | A | A | A | B | C | C |
| Example 51 | K-50 | B-48 | 2 | 5 | — | 1:2.5 | 113 | 80 | 33 | A | A | A | A | A | A | B | B |
| Example 52 | K-51 | B-49 | 2 | 5 | — | 1:2.5 | 120 | 85 | 31 | A | A | A | A | A | A | B | B |
| Example 53 | K-52 | B-50 | 2 | 5 | — | 1:2.5 | 162 | 85 | 35 | A | A | A | A | A | A | B | B |
| Example 54 | K-53 | B-51 | 10 | — | 5 | 1:0.5 | 53 | 50 | 25 | A+ | A | A | A | B | B | B | C |
| Example 55 | K-54 | B-52 | 15 | — | 9 | 1:0.6 | 42 | 52 | 30 | A | A | A | A | A | A | A | A |
| Example 56 | K-55 | B-53 | 5 | — | 5 | 1:1 | 62 | 59 | 35 | A | A | A | A | A | A | A | A |
| Example 57 | K-56 | B-54 | 5 | — | 10 | 1:2 | 55 | 53 | 42 | A | A | A | A | A | A | A | A |
| Example 58 | K-57 | B-55 | 2 | — | 5 | 1:2.5 | 100 | 63 | 28 | A | A | A | A | A | A | A | A |
| Example 59 | K-58 | B-56 | 2 | — | 10 | 1:5 | 89 | 55 | 23 | A | A | A | A | A | A | A | A |
| Example 60 | K-59 | B-57 | 2 | — | 15 | 1:7.5 | 88 | 52 | 22 | A | A | A | A | A | A | A | A |
| Example 61 | K-60 | B-58 | 2 | — | 20 | 1:10 | 85 | 42 | 25 | B | A | A | B | A | A | A | A |
| Example 62 | K-61 | B-59 | 2 | — | 30 | 1:15 | 80 | 30 | 23 | B | A | A | B | B | B | B | C |
| Example 63 | K-62 | B-60 | 2 | — | 10 | 1:5 | 98 | 60 | 35 | A | A | A | A | A | A | B | B |
| Example 64 | K-63 | B-61 | 2 | — | 10 | 1:5 | 88 | 48 | 38 | A | A | A | A | A | A | A | A |
| Example 65 | K-64 | B-62 | 2 | — | 10 | 1:5 | 165 | 53 | 25 | A | A | A | A | A | A | B | B |
| Example 66 | K-65 | B-63 | 2 | 5 | 10 | 1:7.5 | 89 | 50 | 33 | A | A | A | A | A | A | A | A+ |
| Example 67 | K-66 | B-64 | 5 | 5 | 10 | 1:3 | 65 | 48 | 28 | A | A | A | A | A | A | A | A+ |

<Remarks Concerning Table>

X: Total content [% by mass] of the structural units of General Formula (1) and the structural unit of General Formula (2) in the resin YA: Content [% by mass] of the structural unit having an amino group YB: Content [% by mass] of the structural unit having a polyoxyethylene group (a): Aggregating properties
(b): Color density
(c): Jetting stability
(d): Scratch resistance
(e): Blocking resistance
(f): Jettability (deflection)
(g): Restorability upon standing
(h): Scratch resistance (condition B)

As shown in the Table 3, the aqueous ink compositions that used resin microparticles having a structural unit represented by any one of General Formulae (3) to (6) in addition to the structural unit represented by General Formula (1) or (2) (Examples 43 to 67), gave results exhibiting excellent characteristics in all of the aggregating properties, color density, jetting stability, scratch resistance, and blocking resistance, as well as excellent characteristics in all of the jettability (deflection), restorability upon standing, and scratch resistance (condition B).

TEST EXAMPLE

For the various cyan inks C-01 to C-31 prepared as described above, various tests for the aggregating properties (a), color density (b), jetting stability (c), scratch resistance (d), blocking resistance (e), and jettability (deflection, f) were carried out. Furthermore, a test (j) as described below was carried out using an aqueous dispersion of resin microparticles, and a test (i) as described below was carried out using the ink sets MC-01 to MC-31. The results are presented in the following Table 4.

In regard to the tests of (a) to (f), the various tests were carried out by replacing the "black ink" in the tests using black inks with the "cyan ink". Therefore, in the following Table 4, the results of the tests (a) to (f) described in the columns for Ink sets Nos. CM-01 to CM-31 correspond to results obtained using ink compositions Nos. C-01 to C-31, respectively.

<Filterability Test for Aqueous Dispersion of Resin Microparticles (Latex Manufacturing Suitability, Test (j))>

The aqueous dispersions of resin microparticles (concentration of solid contents, 25% by mass) prepared as described above were filtered using a 5 μm filter (manufactured by Millipore Corporation), and filterability was evaluated according to the following evaluation criteria. In the present test, grade "C" or a higher grade is acceptable, and grade "B" or a higher level is preferable.

—Evaluation Criteria—

A+: The amount that could be filtered was 200 mL or more.

A: The amount that could be filtered was 100 mL or more and less than 200 mL.

B: The amount that could be filtered was 50 mL or more and less than 100 mL.

C: The amount that could be filtered was 20 mL or more and less than 50 mL.

<Scratch Resistance (Condition C) Test (Test (i))>

The test was carried out using the ink sets MC-01 to MC-31 prepared as described above.

TOKUBISHI ART DOUBLE-SIDED N (recording medium, manufactured by Mitsubishi Paper Mills, Ltd.) was fixed onto a stage that moved at a speed of 500 mm/sec, and a treatment liquid was applied thereon with a wire bar coater to an amount of about 1.7 g/m² and then was immediately dried for 2 seconds at 50° C. Next, a head having GELJET GX5000 (trade name) printer heads manufactured by Ricoh Co., Ltd., which were arranged obliquely to the scan direction and fixed, arranged therein for two colors was prepared, and the cyan ink and the magenta ink that constituted each ink set was respectively mounted therein. A solid image of each cyan ink was printed by a line method under the conditions of a resolution of 1200×1200 dpi and a jetting amount of 4.0 pL, and a solid image of each magenta ink was printed on this solid image. Immediately after printing, the image was mounted on a hot plate at 60° C., with the image-formed surface facing upward, and the image was dried for 10 seconds with hot air at 120° C. using a dryer. This was used as a print sample.

—Evaluation Criteria—

A+: Any transfer of the image (coloring materials) to the rubbing paper was not recognized.

A: Transfer of the image (coloring materials) to the rubbing paper at a rate of less than 5% of the contact area between the rubbing paper and the solid image was recognized.

B: Transfer of the image (coloring materials) to the rubbing paper at a rate of 5% or more and less than 10% of the contact area between the rubbing paper and the solid image was recognized.

C: Transfer of the image (coloring materials) to the rubbing paper at a rate of 10% or more and less than 20% of the contact area between the rubbing paper and the solid image was recognized.

TABLE 4

| | Ink set No. | Resin microparticles No. | Content [% by mass] X | ZA1 | ZA2 | ZB | Mass ratio X:ZA | X:ZB | Particle size [nm] | Tg [° C.] | Weight-average molecular weight (×10⁴) | Evaluation of ink composition (a) | (b) | (c) | (d) | (e) | (f) | (i) | Latex manufacturing suitability (j) |
|---|---|---|---|---|---|---|---|---|---|---|---|---|---|---|---|---|---|---|---|
| Example 68 | CM-01 | B-22 | 4 | — | — | — | — | — | 78 | 75 | 30 | A+ | A | A | A | A | C | C | C |
| Example 69 | CM-02 | B-65 | 8 | 15 | — | — | 1:1.9 | — | 20 | 75 | 11 | A+ | A | A | A | A | A | C | A |
| Example 70 | CM-03 | B-66 | 5 | 15 | — | — | 1:3 | — | 45 | 76 | 10 | A+ | A | A | A | A | A | C | A |
| Example 71 | CM-04 | B-67 | 5 | 15 | — | — | 1:3 | — | 52 | 78 | 14 | A+ | A | A | A | A | B | C | A |
| Example 72 | CM-05 | B-68 | 5 | 15 | — | — | 1:3 | — | 110 | 79 | 15 | A+ | A | A | A | A | C | C | B |
| Example 73 | CM-06 | B-69 | 5 | — | 15 | — | 1:3 | — | 37 | 68 | 12 | A+ | A | A | A | A | A | C | B |
| Example 74 | CM-07 | B-70 | 5 | — | 15 | — | 1:3 | — | 40 | 72 | 15 | A+ | A | A | A | A | A | C | B |
| Example 75 | CM-08 | B-71 | 5 | — | 15 | — | 1:3 | — | 50 | 90 | 18 | A+ | A | A | A | A | A | C | B |
| Example 76 | CM-09 | B-72 | 5 | — | 15 | — | 1:3 | — | 45 | 92 | 11 | A+ | A | A | A | A | A | C | B |
| Example 77 | CM-10 | B-73 | 5 | 15 | 15 | — | 1:6 | — | 27 | 72 | 15 | A+ | A | A | A | A | A | C | A+ |
| Example 78 | CM-11 | B-74 | 5 | — | — | 3 | — | 1:0.6 | 28 | 115 | 16 | A+ | A | A | A | A | A | B | C |
| Example 79 | CM-12 | B-75 | 5 | — | — | 5 | — | 1:1 | 30 | 113 | 14 | A+ | A | A | A | A | A | A | C |
| Example 80 | CM-13 | B-76 | 5 | — | — | 10 | — | 1:2 | 33 | 110 | 12 | A+ | A | A | A | A | A | A+ | C |
| Example 81 | CM-14 | B-77 | 5 | — | — | 20 | — | 1:4 | 32 | 105 | 20 | A+ | A | A | A | A | A | A+ | C |
| Example 82 | CM-15 | B-78 | 5 | — | — | 30 | — | 1:6 | 44 | 104 | 24 | A+ | A | A | A | A | A | A | C |
| Example 83 | CM-16 | B-79 | 5 | — | — | 40 | — | 1:8 | 46 | 105 | 25 | A+ | A | A | A | B | A | B | C |
| Example 84 | CM-17 | B-80 | 5 | — | — | 20 | — | 1:4 | 15 | 108 | 13 | A+ | A | A | A | A | A | A | B |
| Example 85 | CM-18 | B-81 | 5 | — | — | 20 | — | 1:4 | 33 | 120 | 15 | A+ | A | A | A | A | A | B | C |
| Example 86 | CM-19 | B-82 | 5 | — | — | 20 | — | 1:4 | 35 | 121 | 25 | A+ | A | A | A | A | A | A | C |
| Example 87 | CM-20 | B-83 | 5 | — | — | 20 | — | 1:4 | 32 | 98 | 20 | A+ | A | A | A | A | A | A+ | B |
| Example 88 | CM-21 | B-84 | 5 | 15 | — | 20 | 1:3 | 1:4 | 32 | 105 | 18 | A+ | A | A | A | A | A | A+ | A |
| Example 89 | CM-22 | B-85 | 10 | 3 | 2 | 20 | 1:0.5 | 1:2 | 28 | 123 | 14 | A+ | A | A | A | B | B | A+ | C |
| Example 90 | CM-23 | B-86 | 10 | 5 | 5 | 20 | 1:1 | 1:2 | 27 | 115 | 15 | A+ | A | A | A | B | A | A+ | B |
| Example 91 | CM-24 | B-87 | 10 | 5 | 15 | 20 | 1:2 | 1:2 | 25 | 102 | 11 | A+ | A | A | A | A | A | A+ | B |
| Example 92 | CM-25 | B-88 | 5 | 5 | 15 | 20 | 1:4 | 1:4 | 30 | 105 | 16 | A+ | A | A | A | A | A | A+ | A |
| Example 93 | CM-26 | B-89 | 5 | 10 | 15 | 20 | 1:5 | 1:4 | 27 | 103 | 15 | A+ | A | A | A | A | A | A+ | A+ |
| Example 94 | CM-27 | B-90 | 5 | 20 | 15 | 20 | 1:7 | 1:4 | 35 | 105 | 20 | A+ | A | A | A | A | A | A+ | A+ |
| Example 95 | CM-28 | B-91 | 3 | 25 | 15 | 20 | 1:13 | 1:6.7 | 65 | 108 | 11 | A+ | A | A | A | A | B | A | A+ |
| Example 96 | CM-29 | B-92 | 2 | 25 | 15 | 20 | 1:20 | 1:10 | 80 | 105 | 12 | A+ | A | A | A | B | B | A | A+ |
| Example 97 | CM-30 | B-93 | 2 | 25 | 25 | 20 | 1:25 | 1:10 | 75 | 95 | 10 | A+ | A | A | A | B | B | B | A+ |
| Example 98 | CM-31 | B-94 | 5 | 15 | 15 | 20 | 1:6 | 1:4 | 26 | 105 | 16 | A+ | A | A | A | A | A | A+ | A+ |

Unprinted TOKUBISHI ART DOUBLE-SIDED N (manufactured by Mitsubishi Paper Mills, Ltd.) was wound around a paper weight (weight 470 g, size 15 mm×30 mm×120 mm), and the solid image of the print sample was rubbed in 30 reciprocations. The unprinted TOKUBISHI ART DOUBLE-SIDED N paper (hereinafter, also referred to as rubbing paper) after rubbing was observed by visual inspection, and the print sample was evaluated based on the following evaluation criteria. The area of contact between the unprinted TOKUBISHI ART that was wound around the paper weight and the solid image of the sample to be evaluated was 150 mm². In the present test, grade "C" or a higher grade is acceptable, and grade "B" or a higher grade is preferable.

<Remarks Concerning Table>

X: Total content [% by mass] of the structural units of General Formula (1) and the structural unit of General Formula (2) in the resin ZA1: Content [% by mass] of the structural unit derived from styrene ZA2: Content [% by mass] of the structural unit derived from a vinyl compound or a vinylidene compound other than styrene, each compound having an aromatic ring or an aliphatic ring ZA: Total content [% by mass] of the structural units derived from a vinyl compound or a vinylidene compound, each compound having an aromatic ring or an aliphatic ring ZB: Content [% by mass] of the structural unit derived from a monomer having an I/O value of 1.0 or more and less than 3.5

(a): Aggregating properties
(b): Color density
(c): Jetting stability
(d): Scratch resistance
(e): Blocking resistance
(f): Jettability (deflection)
(i): Scratch resistance (condition C)
(j): Latex (resin microparticles) manufacturing suitability (filterability of aqueous dispersion of resin microparticles)

As shown in the Table 4, in the aqueous ink compositions that used resin microparticles having a structural unit derived from a vinyl compound or a vinylidene compound, each compound having an aromatic ring or an aliphatic ring, in addition to the structural unit represented by General Formula (1) or (2) (Examples 69 to 77), results exhibiting excellent characteristics in all of the aggregating properties, color density, jetting stability, scratch resistance, blocking resistance, and jettability (deflection), as well as excellent characteristics in the latex manufacturing suitability, were obtained. Furthermore, in the aqueous ink compositions that used resin microparticles having a structural unit derived from a monomer having an I/O value of 1.0 or more and less than 3.5 in addition to the structural unit represented by General Formula (1) or (2) (Examples 78 to 87), results exhibiting excellent characteristics in all of the aggregating properties, color density, jetting stability, scratch resistance, blocking resistance, and jettability (deflection), as well as excellent characteristics in the scratch resistance (condition C), were obtained. Furthermore, in the aqueous ink compositions that used resin microparticles having both a structural unit derived from a vinyl compound or a vinylidene compound, each compound having an aromatic ring or an aliphatic ring, and a structural unit derived from a monomer having an I/O value of 1.0 or more and less than 3.5, in addition to the structural unit represented by General Formula (1) or (2) (Examples 88 to 98), results exhibiting excellent characteristics in all of the aggregating properties, color density, jetting stability, scratch resistance, blocking resistance, and jettability (deflection), as well as satisfactory scratch resistance (condition C) and latex manufacturing suitability, were obtained.

What is claimed is:

1. An aqueous ink composition at least comprising:
an aqueous medium; and
resin microparticles composed of a resin,
wherein the resin has a structural unit represented by General Formula (1) or (2), and
the content of the resin microparticles in the aqueous ink composition is 1% to 15% by mass,

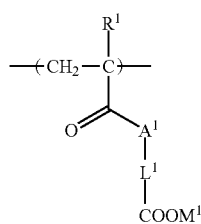

General Formula (1)

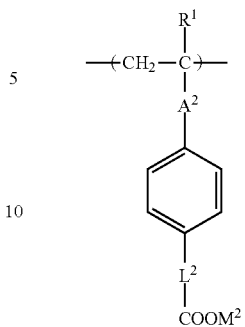

General Formula (2)

in General Formula (1), $R^1$ represents a hydrogen atom or an alkyl group having 1 to 4 carbon atoms;

$A^1$ represents —O— or —$NR^3$—;

$R^3$ represents a hydrogen atom or an alkyl group having 1 to 4 carbon atoms;

$L^1$ represents an alkylene group having 6 to 22 carbon atoms; and $M^1$ represents a hydrogen atom, an alkali metal ion, or an ammonium ion, and in General Formula (2), $R^2$ has the same meaning as $R^1$;

$A^2$ represents a single bond, —COO—, or —CONH—;

$L^2$ represents a divalent linking group having 6 to 23 carbon atoms; and $M^2$ has the same meaning as $M^1$.

2. The aqueous ink composition according to claim 1, wherein the total content of the structural units represented by General Formula (1) or (2) in the resin is 1% to 20% by mass.

3. The aqueous ink composition according to claim 1, wherein the resin contains the structural unit represented by General Formula (1).

4. The aqueous ink composition according to claim 1, wherein the resin contains a structural unit derived from a vinyl compound or a vinylidene compound, each compound having an aromatic ring or an aliphatic ring.

5. The aqueous ink composition according to claim 4, wherein the total content of the structural units derived from a vinyl compound or a vinylidene compound, each compound having an aromatic ring or an aliphatic ring, in the resin is 5% to 50% by mass.

6. The aqueous ink composition according to claim 4, wherein in a case in which the total content of the structural units represented by General Formula (1) or (2) in the resin is designated as X % by mass, and the total content of the structural units derived from a vinyl compound or a vinylidene compound, each compound having an aromatic ring or an aliphatic ring, is designated as ZA % by mass, the ratio of X to ZA is such that X:ZA=1:0.5 to 25.

7. The aqueous ink composition according to claim 4, wherein the structural unit derived from a vinyl compound or a vinylidene compound, each compound having an aromatic ring or an aliphatic ring, is represented by any one of General Formulae (A) to (E),

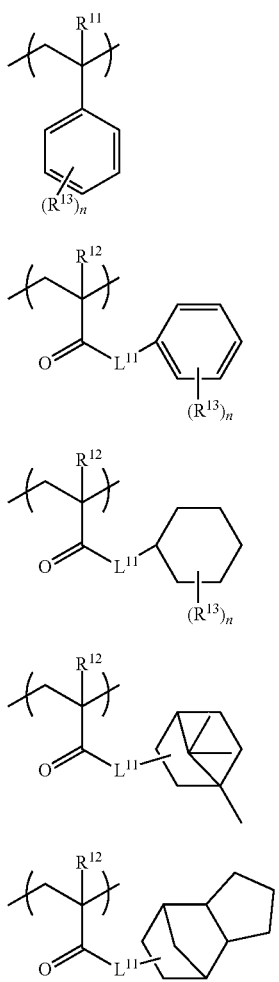

General Formula (A)

General Formula (B)

General Formula (C)

General Formula (D)

General Formula (E)

in General Formulae (A) to (E), $R^{11}$ and $R^{12}$ each independently represent a methyl group or a hydrogen atom;

$R^{13}$'s each independently represent a chain-like or branched alkyl group having 1 to 10 carbon atoms;

n represents an integer from 0 to 5; and $L^{11}$ represents a single bond, a linear, branched or cyclic alkylene group having 1 to 18 carbon atoms, an arylene group having 6 to 18 carbon atoms, —O—, —NH—, —S—, —C(=O)—, or a divalent linking group formed by linking two or more of these.

8. The aqueous ink composition according to claim 1, wherein the resin contains a structural unit derived from a monomer having an I/O value in the organic conceptual diagram of 1.0 or more and less than 3.5.

9. The aqueous ink composition according to claim 8, wherein the total content of the structural units derived from a monomer having an I/O value in the organic conceptual diagram of 1.0 or more and less than 3.5 in the resin is 1% to 40% by mass.

10. The aqueous ink composition according to claim 8, wherein in a case in which the total content of the structural units represented by General Formula (1) or (2) in the resin is designated as X % by mass, and the total content of the structural units derived from a monomer having an I/O value in the organic conceptual diagram of 1.0 or more and less than 3.5 is designated as ZB % by mass, the ratio of X to ZB is such that X:ZB=1:0.4 to 10.

11. The aqueous ink composition according to claim 1, wherein the content of a sulfo group or a salt thereof in the resin is 0.13 mmol/g or less.

12. The aqueous ink composition according to claim 1, wherein in General Formula (1), $A^1$ represents —$NR^3$—.

13. The aqueous ink composition according to claim 1, wherein the resin has a polymerization initiator residue that does not have a sulfo group or a salt thereof at the terminals.

14. The aqueous ink composition according to claim 1, wherein the weight-average molecular weight of the resin is 80,000 or more.

15. The aqueous ink composition according to claim 1, which is used for an inkjet recording method.

16. The aqueous ink composition according to claim 1, further comprising:
a pigment.

17. An ink set comprising:
the aqueous ink composition according to claim 16; and
a treatment agent for aggregating the aqueous ink composition.

18. An image forming method using the aqueous ink composition according to claim 16.

19. An image forming method, comprising:
applying a treatment agent for aggregating the aqueous ink composition according to claim 16 onto a recording medium; and
applying the aqueous ink composition according to claim 16 onto the recording medium after applying the treatment agent, and thereby forming an image.

20. Resin microparticles comprising:
a resin having a structural unit represented by General Formula (1) or General Formula (2),

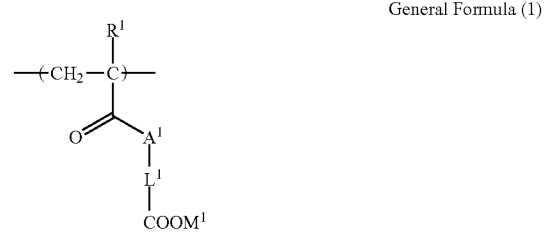

General Formula (1)

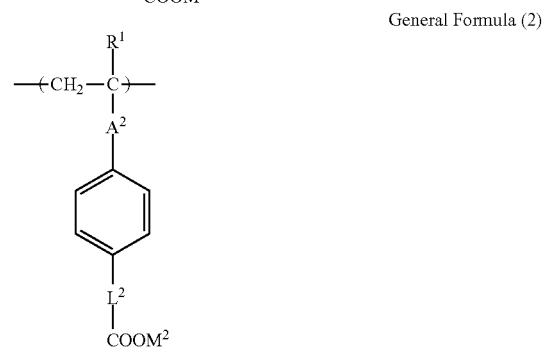

General Formula (2)

in General Formula (1), $R^1$ represents a hydrogen atom or an alkyl group having 1 to 4 carbon atoms;

$A^1$ represents —O— or —$NR^3$—;

$R^3$ represents a hydrogen atom or an alkyl group having 1 to 4 carbon atoms;

$L^1$ represents an alkylene group having 6 to 22 carbon atoms; and $M^1$ represents a hydrogen atom, an alkali metal ion, or an ammonium ion, and in General Formula (2), $R^2$ has the same meaning as $R^1$;

$A^2$ represents a single bond, —COO—, or —CONH—;

$L^2$ represents a divalent linking group having 6 to 23 carbon atoms; and $M^2$ has the same meaning as $M^1$.

\* \* \* \* \*